US007877305B2

(12) United States Patent
Gross et al.

(10) Patent No.: US 7,877,305 B2
(45) Date of Patent: Jan. 25, 2011

(54) SYSTEM AND METHOD FOR AUTOMATICALLY MONITORING THE PERFORMANCE OF A CONTRACTOR IN THE MANAGEMENT OF AN INSURANCE CLAIM

(75) Inventors: Paul Gross, London, OH (US); Ed N. Jones, Crawford, TX (US)

(73) Assignee: Code Blue, LLC, Eau Claire, WI (US)

( * ) Notice: Subject to any disclaimer, the term of this patent is extended or adjusted under 35 U.S.C. 154(b) by 963 days.

(21) Appl. No.: 11/713,271

(22) Filed: Mar. 1, 2007

(65) Prior Publication Data

US 2007/0226029 A1 Sep. 27, 2007

(51) Int. Cl.
G06Q 40/00 (2006.01)
G06F 9/46 (2006.01)

(52) U.S. Cl. ............................................. 705/35; 705/9

(58) Field of Classification Search .............. 705/35–42
See application file for complete search history.

(56) References Cited

U.S. PATENT DOCUMENTS

| 5,377,098 | A | 12/1994 | Sakai |  |
|---|---|---|---|---|
| 5,504,674 | A | 4/1996 | Chen et al. |  |
| 5,950,169 | A | 9/1999 | Borghesi et al. |  |
| 6,182,041 | B1* | 1/2001 | Li et al. ...................... | 704/260 |
| 6,810,383 | B1 | 10/2004 | Loveland |  |
| 6,873,958 | B2 | 3/2005 | Artinger |  |
| 7,013,284 | B2 | 3/2006 | Guyan et al. |  |
| 7,173,538 | B2 | 2/2007 | Pedraza et al. |  |
| 2002/0007289 | A1* | 1/2002 | Malin et al. ..................... | 705/4 |
| 2002/0055861 | A1 | 5/2002 | King et al. |  |
| 2002/0065687 | A1 | 5/2002 | Onoue |  |
| 2002/0087381 | A1* | 7/2002 | Freeman et al. ................. | 705/9 |
| 2002/0194274 | A1* | 12/2002 | Kroeger ...................... | 709/205 |

(Continued)

FOREIGN PATENT DOCUMENTS

JP 2001-265965 A 9/2001

(Continued)

OTHER PUBLICATIONS

Slepcevic, Steve, "Helping owners with insurance claims", RSI, Sep. 2003, p. 41.*

(Continued)

*Primary Examiner*—Ella Colbert
*Assistant Examiner*—Mohammad Z Shaikh
(74) *Attorney, Agent, or Firm*—Stinson Morrison Hecker LLP

(57) ABSTRACT

In an exemplary embodiment, a server system stores a plurality of textual scripts in a database server in association with a plurality of contractor actions. Each of the textual scripts comprises an alert notifying the contractor of an obligation to perform the associated contractor action. The server system generates a plurality of deadlines by which the contractor is required to perform the contractor actions, and provides a user interface that allows a user to submit a plurality of notices of completion for the contractor actions. If a particular notice of completion is not submitted by the deadline for the contractor action, the server system selects the textual script associated with the contractor action, converts the textual script to a voice message, and initiates transmission of the voice message to the contractor via a telephone network.

68 Claims, 35 Drawing Sheets

U.S. PATENT DOCUMENTS

| | | |
|---|---|---|
| 2003/0028404 A1* | 2/2003 | Herron et al. ............... 705/4 |
| 2003/0145124 A1 | 7/2003 | Guyan et al. |
| 2003/0154111 A1 | 8/2003 | Dutra et al. |
| 2003/0225587 A1 | 12/2003 | Mueller |
| 2004/0167787 A1 | 8/2004 | Lynch et al. |
| 2004/0190586 A1 | 9/2004 | Lee et al. |
| 2005/0171819 A1 | 8/2005 | Keaton et al. |
| 2005/0204914 A1 | 9/2005 | Boutall |
| 2005/0251427 A1 | 11/2005 | Dorai et al. |
| 2005/0285748 A1 | 12/2005 | Pedraza et al. |
| 2006/0010025 A1 | 1/2006 | Sattler et al. |
| 2007/0016514 A1* | 1/2007 | Al-Abdulqader et al. ...... 705/37 |
| 2007/0061774 A1* | 3/2007 | Chan et al. ............... 717/101 |
| 2007/0225863 A1 | 9/2007 | Gross |
| 2007/0226016 A1 | 9/2007 | Gross |
| 2007/0226017 A1 | 9/2007 | Gross |
| 2007/0226018 A1 | 9/2007 | Gross |
| 2007/0226072 A1 | 9/2007 | Gross |
| 2008/0040075 A1 | 2/2008 | Fillmann |

FOREIGN PATENT DOCUMENTS

| | | |
|---|---|---|
| WO | WO 04/001643 A1 | 12/2003 |

OTHER PUBLICATIONS

Feldman, William, "Solutions for service and project management", Contractor, Newton: Apr. 2005. vol. 52, Iss. 4; p. 40, 2 pgs.*
Moskowitz, Keith, M, "Building Bridges Helps Construction Insurers", National Underwriter. P & C. Erlanger: Oct. 4, 2004. vol. 108, Iss. 37: p. 22, 2 pgs.*
U.S. Appl. No. 11/713,364, filed Mar. 1, 2007, Gross et al.
U.S. Appl. No. 11/713,385, filed Mar. 1, 2007, Gross et al.
U.S. Appl. No. 11/713,387, filed Mar. 1, 2007, Gross et al.
U.S. Appl. No. 11/713,432, filed Mar. 1, 2007, Gross et al.
U.S. Appl. No. 11/713,386, filed Mar. 1, 2007, Gross et al.
Marsh's Risk Consulting: Claims Accounting and Preparation Services; http://www.marshriskconsulting.com/st/PSEV_C_361_SC_389392_NR_302.htm; May 12, 2006.
Accenture Insurance Services: Property & Casualty Claims Services; http://www.acenture.com/Global/Services/By_Subject/Business_Process_Outsourcing/Ac; May 12, 2006.

* cited by examiner

FIG. 4

Claim Info

Claim Menu

- New Search
- ◆ Claim Info
- Claim Details
- Claim Dates
- Claim Contact List
- Building Info
- Select Contractor
- Contractor Contact
- Claim Forms
- Water-Room Dimensions
- Water-Equipment Validation
- Water-Equipment History
- Water-Daily Humidity
- Water-Moisture Map
- Water-Flooring Diagrams
- Photos & Docs
- Notes
- Survey << prev | Reset | Save | next >>

Clients: Scientific Insurance
Client Contact:
HSG Control #: 45001005
Claim #: 1234567890

Create New Client
Create Associate Claim
Show Associate Claims

Policy #: SC12345678
Effective Date: February 28, 2006
Expiration Date: February 28, 2007

Policy Information

Building Limit: $330,000
Contents Limit: $100,000

Policy holder | | | Loss Address | | Same As Policyholder
--- | --- | --- | --- | --- | ---
Prefix | Mr. | Sufix | Prefix | Mr. | Sufix
First Name | John | | First Name | John |
Last Name | Smith | | Last Name | Smith |
Company | | | Company | |
Reference | Smith, John | | Reference | Smith, John |
Address1 | 1234 Easy Street | | Address1 | 1234 Easy Street |
Address2 | | | Address2 | |
P.O. box | | | P.O. box | |
City | Anywhere | | City | Anywhere |
County | Anywhere | | County | Anywhere |
State | Wisconsin | | State | Wisconsin |
Country | USA | | Country | USA |
ZIP | 54701 | | ZIP | 54701 |
Primary | (123)456-7890 | Ext. | Primary | (123)456-7890 | Ext.

Claim Menu

New Search
Claim Info
Claim Details
Claim Dates
Claim Contact List
◇ Building Info
Select Contractor
Contractor Contact
Claim Forms
Water-Room Dimensions
Water-Equipment Validation
Water-Equipment History
Water-Daily Humidity
Water-Moisture Map
Water-Flooring Diagrams
Photos & Docs
Notes
Survey

Building Info

<< prev    Reset    Save    next >>

Reference: 45001005, 1234567890, Smith, John

| | |
|---|---|
| Building Style | Two Story House |
| Year Built | 1986 |
| Square Feet | 2500 |
| Siding | Aluminum Siding |
| Roofing | Asphalt Shingles |
| Year Roof Installed | 2002 |
| Basement | Finished |
| Garage | Two-Car |
| Out Building | Shed |
| Owner Notes | just refinished basement |

Claim Menu

New Search
Claim Info
Claim Details
Claim Dates
Claim Contact List
Building Info
Select Contractor
◇ Contractor Contact
Claim Forms
Water—Room Dimensions
Water—Equipment Validation
Water—Equipment History
Water—Daily Humidity
Water—Moisture Map
Water—Flooring Diagrams
Photos & Docs
Notes
Survey

Contractor Contacts

<< prev | Reset | Save | next >>

Reference: 45001005, 12345667890, Smith, John test account PS Restoration (t est)
1234 main st, Eau Claire, Wisconsin, USA, Phone-(715)864-4634, Fax-(866)743-0641, Contact- phillip smith - phillip.smith@hsgcodeblue.com Primary Contact: Phillip (Office Manager) Phone: 7158644634 Pager: Email: pzasmith2272@gmail.com Description: dont call b4 noon!

Secondary Contact: Dar Dar (Project Manager) Phone: 7158644634 SMS Pager: Email: pzasmith2272@hotmail.com Description: dont speak english too well!

Existing Contacts

Contract or Contact: phillip smith [▼] Add

New Contact

Type: Accounting [▼]
Name:
Phone:
Add

| Contact Type | Contact | Phone Number | | |
|---|---|---|---|---|
| Accounting | Jim Bowie | (123)444-5555 | Edit | Delete |
| Lead Technician | Sam Houston | (123)555-6666 | Edit | Delete |
| Office Manager | Betsy Ross | (123)777-8999 | Edit | Delete |
| Project Manager | Davy Crockett | (123)999-8888 | Edit | Delete |

File Edit View Favorites Tools Help

Back · | Search Favorites |

Address: http://www.codebluerestoration.com/Claims/Psychrometrics_DataSheet.aspx

Claim Menu

New Search
Claim Info
Claim Details
Claim Dates
Claim Contact List
Building Info
Select Contractor
Contractor Contact
Claim Forms
⇨ Water—Room Dimensions
Water—Equipment Validation
Water—Equipment History
Water—Daily Humidity
Water—Moisture Map
Water—Flooring Diagrams
Photos & Docs
Notes
Survey

Room Dimensions

<< prev | Reset | Save | next >>

Reference: 45001005, 1234567890, Smith, John

Category: 1
Data Affected: February 05, 2007        Date Started: February 06, 2007
Time Affected: 3:00 AM                  Time Started: 1:30 PM

Room Dimensions

Drying Chamber: Main
Class: 1
Room: 0
Width: 0
Length: 0
Height: 0
Linear Feet Wall: 16
One airmover every ___ linear feet

[ Add ]

Total Linear Feet: 272
Total Square Feet: 1195
Total Cubic Feet: 9568

| Drying Chamb. | Class | Room name | Width | Length | Height | Air L. | Linear Feet Wall | SqFt | Cubic Feet | | |
|---|---|---|---|---|---|---|---|---|---|---|---|
| Basement 3 | | Basement | 14 | 28 | 8 | 12 | 84 | 392 | 3136 | Edit | Delete |
| Main 2 | | kitchen | 12 | 20 | 8 | 12 | 64 | 240 | 1920 | Edit | Delete |
| Main 2 | | bathroom | 6 | 10 | 8 | 12 | 32 | 60 | 480 | Edit | Delete |
| Main 2 | | Family Room | 18 | 28 | 8 | 12 | 92 | 504 | 4032 | Edit | Delete |

Claim Menu

- New Search
- Claim Info
- Claim Details
- Claim Dates
- Claim Contact List
- Building Info
- Select Contractor
- Contractor Contact
- Claim Forms
- Water-Room Dimensions
- Water-Equipment Validation
- ⇨ Water-Equipment History
- Water-Daily Humidity
- Water-Moisture Map
- Water-Flooring Diagrams
- Photos & Docs
- Notes
- Survey

Equipment History

[<< prev] [Reset] [Save] [next >>]

Reference: 45001005, 1234567890, Smith, John

| Equipment Name | Type | Count | AHAM | Dehu Type | Room |
|---|---|---|---|---|---|
| Drying Chamber: Basement | | | | | |
| February 06, 2007 | | | | | |
| Dry Air Atlantic | Dehu | 1 | 140 | LGR | |
| Abatement Technologies Abatement PAS1200 | Airmover | 1 | | | Basement |
| Dry Air Clean Force | Airmover | 6 | | | Basement |
| February 07, 2007 | | | | | |
| Dry Air Atlantic | Dehu | 1 | 140 | LGR | |
| Abatement Technologies Abatement PAS1200 | Airmover | 1 | | | Basement |
| Dry Air Clean Force | Airmover | 6 | | | Basement |
| February 08, 2007 | | | | | |
| Dry Air Atlantic | Dehu | 1 | 140 | LGR | |
| Abatement Technologies Abatement PAS1200 | Airmover | 1 | | | Basement |
| Dry Air Clean Force | Airmover | 6 | | | Basement |
| February 09, 2007 | | | | | |
| Dry Air Atlantic | Dehu | 1 | 140 | LGR | |
| Abatement Technologies Abatement PAS1200 | Airmover | 1 | | | Basement |
| Dry Air Clean Force | Airmover | 6 | | | Basement |
| Drying Chamber: Main | | | | | |
| February 06, 2007 | | | | | |
| Phoenix 200 Max | Dehu | 1 | 133 | LGR | |
| Dri-eaz Ace #F259 | Airmover | 8 | | | Family Room |
| Dry Air Force 9 | Airmover | 6 | | | Kitchen |

*FIG. 15*

Daily Humidity

Claim Menu:
- New Search
- Claim Info
- Claim Details
- Claim Dates
- Claim Contact List
- Building Info
- Select Contractor
- Contractor Contact
- Claim Forms
- Water–Room Dimensions
- Water–Equipment Validation
- Water–Equipment History
- ➪ Water–Daily Humidity
- Water–Moisture Map
- Water–Flooring Diagrams
- Photos & Docs
- Notes
- Survey Reference: 45001005, 12345667890, Smith, John Drying Chamber: Basement
Inspection Date: February 16, 2007
Inspection Time: 12:00 AM
Inspection Location: Dehumidifier1
Temperature: 0
Relative Humidity (%): 0
GPP: 0
GD: 0

| Inspection Date and Time | Inspection Location | Temp. | RH | GPP | GD | | |
|---|---|---|---|---|---|---|---|
| 2/9/2007 2: 00:00 PM | Dehumidifier1 | 112 15 | | 61.95 | 58.64 | Edit | Delete |
| 2/7/2007 4: 00:00 PM | Dehumidifier1 | 115 11 | | 49.35 | 22.57 | Edit | Delete |
| 2/8/2007 10: 00:00 AM | Dehumidifier1 | 113 11 | | 46.59 | 19.84 | Edit | Delete |
| 2/9/2007 5: 00:00 PM | Dehumidifier1 | 99 11 | | 30.76 | 9.76 | Edit | Delete |
| 2/6/2007 2: 00:00 PM | HVAC | 75 75 | | 89.37 | 21.22 | Edit | Delete |
| 2/7/2007 4: 00:00 PM | HVAC | 62 58 | | 48.61 | 23.31 | Edit | Delete |
| 2/8/2007 10: 00:00 AM | HVAC | 58 55 | | 39.89 | 26.34 | Edit | Delete |
| 2/9/2007 5: 00:00 PM | HVAC | 54 53 | | 33.2 | 7.92 | Edit | Delete |
| 2/6/2007 2: 00:00 PM | Inside(Wet) | 78 B | 2 | 120.59 | 0 | Edit | Delete |
| 2/7/2007 4: 00:00 PM | Inside(Wet) | 83 4 | 2 | 71.92 | 0 | Edit | Delete |
| 2/8/2007 10: 00:00 AM | Inside(Wet) | 82 4 | 0 | 66.23 | 0 | Edit | Delete |
| 2/9/2007 5: 00:00 PM | Inside(Wet) | 77 2 | 9 | 40.52 | 0 | Edit | Delete |
| 2/6/2007 2: 00:00 PM | Outside | 15 4 | 0 | 4.78 | 0 | Edit | Delete |
| 2/7/2007 4: 00:00 PM | Outside | 20 4 | 5 | 6.85 | 0 | Edit | Delete |

FIG. 16a

Claim Menu

- New Search
- Claim Info
- Claim Details
- Claim Dates
- Claim Contact List
- Building Info
- Select Contractor
- Contractor Contact
- Claim Forms
- Water–Room Dimensions
- Water–Equipment Validation
- Water–Equipment History
- Water–Daily Humidity
- ⇨ Water–Moisture Map
- Water–Flooring Diagrams
- Photos & Docs
- Notes
- Survey

Moisture Map

<< prev    Reset    Save    next >>

Reference: 45001005, 1234567890, Smith, John

Inspection Date: February 16, 2007
Room: kitchen
Affected Location: Carpet
Affected Type: Subfloor
Reading: 0
Target:

Add

| Inspection Date | Room | Aff. Material | Type | Reading | Target | | |
|---|---|---|---|---|---|---|---|
| February 06, 2007 | Basement | Ceiling | Conventional Wood Framing | 22 | 15 | Edit | Delete |
| February 07, 2007 | Basement | Ceiling | Conventional Wood Framing | 20 | 15 | Edit | Delete |
| February 08, 2007 | Basement | Ceiling | Conventional Wood Framing | 17 | 15 | Edit | Delete |
| February 09, 2007 | Basement | Ceiling | Conventional Wood Framing | 15 | 15 | Edit | Delete |
| February 06, 2007 | Basement | Subfloor | Concrete | 100 | 85 | Edit | Delete |
| February 07, 2007 | Basement | Subfloor | Concrete | 85 | 85 | Edit | Delete |
| February 06, 2007 | Basement | Wall1 | Drywall | 7 | 0.5 | Edit | Delete |
| February 07, 2007 | Basement | Wall1 | Drywall | 4 | 0.5 | Edit | Delete |
| February 08, 2007 | Basement | Wall1 | Drywall | 1 | 0.5 | Edit | Delete |
| February 09, 2007 | Basement | Wall1 | Drywall | 0.5 | 0.5 | Edit | Delete |
| February 06, 2007 | Basement | Wall1 Sill | Conventional Wood Framing | 21 | 15 | Edit | Delete |
| February 07, 2007 | Basement | Wall1 Sill | Conventional Wood Framing | 20 | 15 | Edit | Delete |

Preloss Conditions Certificate

Claim Menu

- New Search
- Claim Info
- Claim Details
- Claim Dates
- Claim Contact List
- Building Info
- Select Contractor
- Contractor Contact
- Claim Forms
- Water-Room Dimensions
- Water-Equipment Validation
- Water-Equipment History
- Water-Daily Humidity
- Water-Moisture Map
- Water-Flooring Diagrams
- ▷ Photos & Docs
- Notes
- Survey

Photos & Docs

<< prev | Reset | Save | next >>

Reference: 45001005, 1234567890, Smith, John

Upload Photos & Docs

File Type: Certification Document
Description:
File: [ Browse... ] [ Add ]
☐ Confidential ☑ File can be viewed by:
☑ Contractor
☑ Client
☑ Policyholder

| Date | Type | Description | File | Thumb | Contractor | Client | Policyholder | | |
|---|---|---|---|---|---|---|---|---|---|
| 02/11/2007 03:37 PM | Certification Document | shows moisture wicking up into drywall in living room | THERMAL IMAGING PHOTO | Thumb-nail View | ☑ | ☑ | ☑ | Edit | Delete |
| 02/11/2007 03:38 PM | Certification Document | Type of air mover used | AXIAL AIR MOVER.JPG | Thumb-nail View | ☑ | ☑ | ☑ | Edit | Delete |
| 02/11/2007 03:38 PM | Certification Document | Type of dehumidifier used | LGR DEHUMIDIFIER.JPG | Thumb-nail View | ☑ | ☑ | ☑ | Edit | Delete |
| 02/11/2007 03:39 PM | Certification Document | Mold Contamination in wall cavity | BLACK MOLD.JPG | Thumb-nail View | ☑ | ☑ | ☑ | Edit | Delete |
| 02/11/2007 03:40 PM | Certification Document | Visible Microbial Growth | BLACK MOLD 2.JPG | Thumb-nail View | ☑ | ☑ | ☑ | Edit | Delete |
| 02/11/2007 03:41 PM | Certification Document | Drying Chamber under negative pressure | CONTAINMENT LARGE.JPG | Thumb-nail View | ☑ | ☑ | ☑ | Edit | Delete |
| 02/11/2007 03:42 PM | Certification Document | Containment Set-up | CONTAINMENT MEDIUM.JPG | Thumb-nail View | ☑ | ☑ | ☑ | Edit | Delete |

Survey

Claim Menu
- New Search
- Claim Info
- Claim Details
- Claim Dates
- Claim Contact List
- Building Info
- Select Contractor
- Contractor Contact
- Claim Forms
- Water–Room Dimensions
- Water–Equipment Validation
- Water–Equipment History
- Water–Daily Humidity
- Water–Moisture Map
- Water–Flooring Diagrams
- Photos & Docs
- Notes
- ⇨ Survey

[ << prev ]  [ Reset ]  [ Save ]  [ next >> ]

Reference 45000665, 135808, Assured Software

Claim Survey

5. How satisfied were you with the work performance of the contractors technicians?
   - a. Extremely Satisfied
   - b. Very Satisfied
   - c. Satisfied
   - d. Unlikely
   - e. Very Unlikely 6. How likely would you be to recommend this restoration claims process to a friend or relative?
   - a. Extremely Likely
   - b. Very Likely
   - c. Likely
   - d. Unlikely
   - e. Very Unlikely 7. Any other comments you would like to make about your experience?

*FIG. 21b*

Survey

[<< prev] [Reset] [Save] [next >>]

Reference: 45001005, 1234567890, Smith, John

Claim Survey

1. How satisfied were you with the way CodeBlue managed your claim?
   ANSWER: a. Extremely Satisfied 2. How satisfied were you with the response time of the Contractor's technicians?
   ANSWER: a. Extremely Satisfied 3. How satisfied were you with the professionalism of the Contractor's technicians?
   ANSWER: b. Very Satisfied 4. How satisfied were you with the way the Contractor kept you informed of the mitigation process?
   ANSWER: a. Extremely Satisfied 5. How satisfied were you with the work performance of the contractor's technicians?
   ANSWER: a. Extremely Satisfied 6. How likely would you be to recommend this restoration claims process to a friend or relative?
   ANSWER: a. Extremely Likely 7. Any other comments you would like to make about your experience?

Claim Menu

- New Search
- Claim Info
- Claim Details
- Claim Dates
- Claim Contact List
- Building Info
- Select Contractor
- Contractor Contact
- Claim Forms
- Water-Room Dimensions
- Water-Equipment Validation
- Water-Equipment History
- Water-Daily Humidity
- Water-Moisture Map
- Water-Flooring Diagrams
- Photos & Docs
- Notes
- ⇨ Survey

FIG. 21c

Insurance Carrier Submission Form

CODE BLUE

To make an assignment for salvage you may send this sheet by fax to (123) 345-7890 or e-mail to CBSalvageclaims@HSGCodeBlue.com

Claim Information

| | |
|---|---|
| Claim Number | |
| Date of Loss | |
| Insured Name | |
| Claim District | |
| Adjuster | |
| Adjuster Phone# | |
| Salvage Availability Date | |

Salvage Pickup Instructions

| Pickup from Insured | | Pickup from Contractor | |
|---|---|---|---|
| Contact Name | | Contact Name | |
| Address | | Address | |
| City/ST/ZIP | | City/ST/ZIP | |
| Home Phone | | Business Phone | |
| Cell Phone | | Cell Phone | |
| Work Phone | | Other Phone | |

INSTRUCTIONS:

| Item Description | Quantity | Replacement Cost Value | Actual Cash Value | Original Purchase Price? | Comments/Special Instructions | Attach Photo |
|---|---|---|---|---|---|---|
| | | | | | | Photo 1 ☒ Photo 2 ☒ Photo 3 ☒ Photo 4 ☒ Photo 5 ☒ |
| | | | | | | |
| | | | | | | |
| | | | | | | |
| | | | | | | |
| | | | | | | |
| | | | | | | |

*FIG. 24*

Code Blue Salvage

☐ Home | ☐ Submit A Claim | ☐ Tools          ☐ Logout (User@harmonsolutionsgroup.com)

Claim Information          Search Claim # [    ▼]

Policy Holder

First Name* [Test]          Last Name* [Order]
Claim #* [555555]          Policy #* [111111]
Insurance Company* [Auto Owners Insurance ▼]

Salvage Items Detail          Search Salvage Item [    ▼] [Add Product]

Product Name* [Country Style Bedroom Set]          Product Model # [          ]
Description* [Country Style Bedroom set includes: Headboard and Footboard, 2 Nightstands, 1 5-]          Category 1* [Home & Garden ▼]
          Category 2* [Furniture ▼]
Manufacturer [Marshall Fields Home Store]          Mfg's Web Site [          ]
Available Date [05/11/2006] 📅          Product Condition* [Fair ▼]
Product Quantity [1]          Weight (Each-lbs) [275]

Product Image (*.bmp, *.gif, *.jpg, *.png-max file size: 4MB)
Image Description [          ]
Search Image [          ] [Browse] [Add Image]

[Submit]

SYSTEM AND METHOD FOR AUTOMATICALLY MONITORING THE PERFORMANCE OF A CONTRACTOR IN THE MANAGEMENT OF AN INSURANCE CLAIM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the property insurance industry, water loss claims have traditionally posed significant problems for insurance carriers. For example, it is common for contractors to unnecessarily demolish and replace damaged structural materials (e.g., flooring and drywall), which has greatly affected the severity of water loss claims. This is caused in part by the fact that some contractors do not arrive at the job site in a timely fashion to begin mitigation of the water damage. Also, some contractors are not qualified and do not realize that the damaged structural materials may be restored rather than replaced. Even when contractors elect to restore damaged structural materials, they frequently do not use the appropriate type or quantity of restoration equipment and, as a result, the insurance carrier may pay an excessive amount to the contractor for the restoration services. In addition, if the damaged structural materials are not sufficiently dried and restored, mold can be a problem both for the claimant (from a health standpoint) and for the insurance carrier (from a liability standpoint). Another problem is that some insurance adjusters are not adequately trained to monitor the restoration process and/or are simply overloaded with water loss claims. As a result, there are large volumes of water loss claims that are not properly evaluated and are paid out simply to close the claims. Yet another problem is that a substantial amount of money is paid to claimants for the replacement of contents affected by water damage with little or no salvage value received for the damaged contents.

BRIEF DESCRIPTION OF THE DRAWINGS

Figure 4:
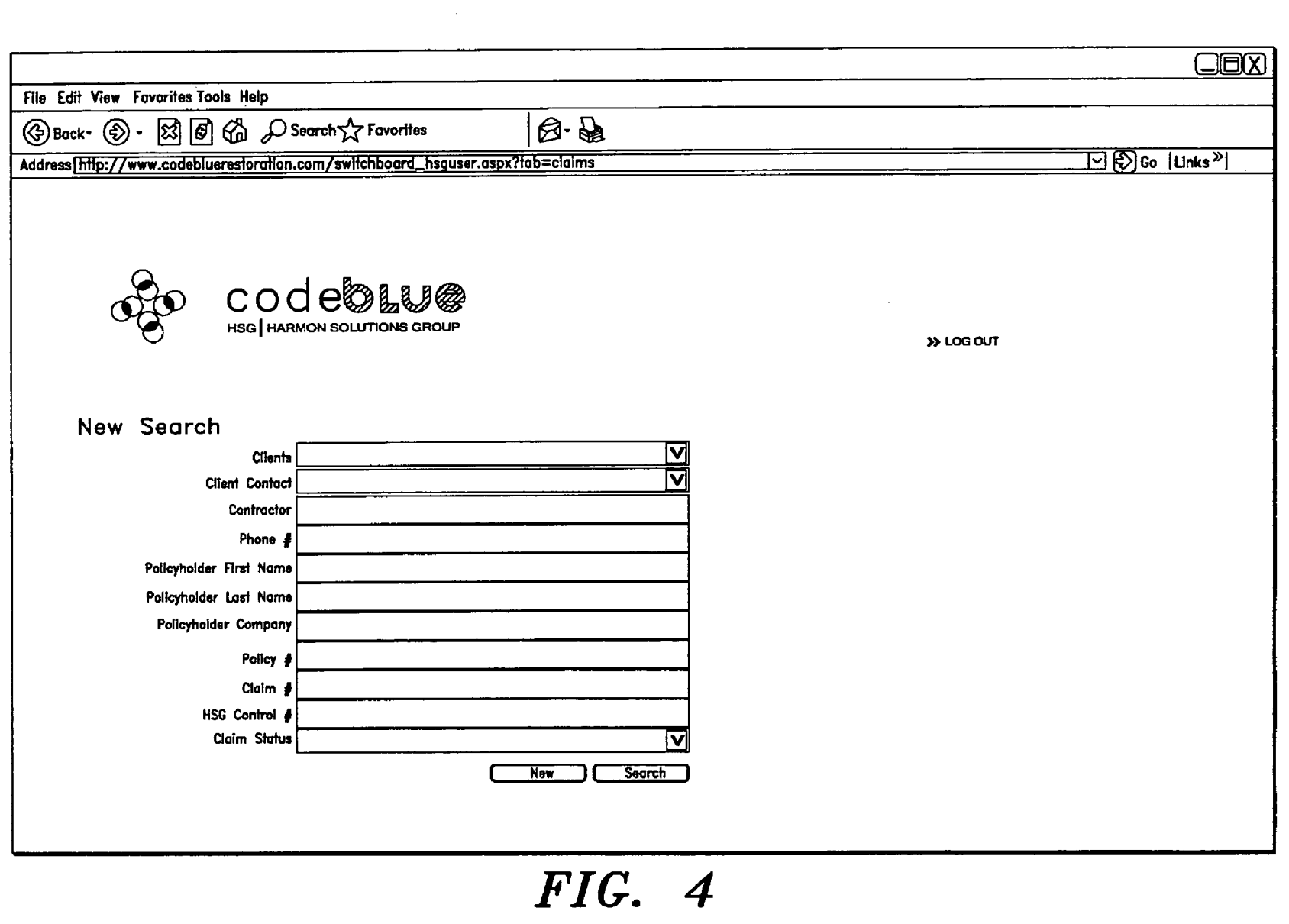

FIG. 4 shows a "screen capture" depiction of a "New Search" page for the claims administration web site of FIG. 2.

FIG. 5 shows a "screen capture" depiction of a "Claim Info" page for the claims administration web site of FIG. 2.

FIG. 6 shows a "screen capture" depiction of a "Claim Details" page for the claims administration web site of FIG. 2.

FIG. 7 shows a "screen capture" depiction of a "Claim Dates" page for the claims administration web site of FIG. 2.

Figure 8:
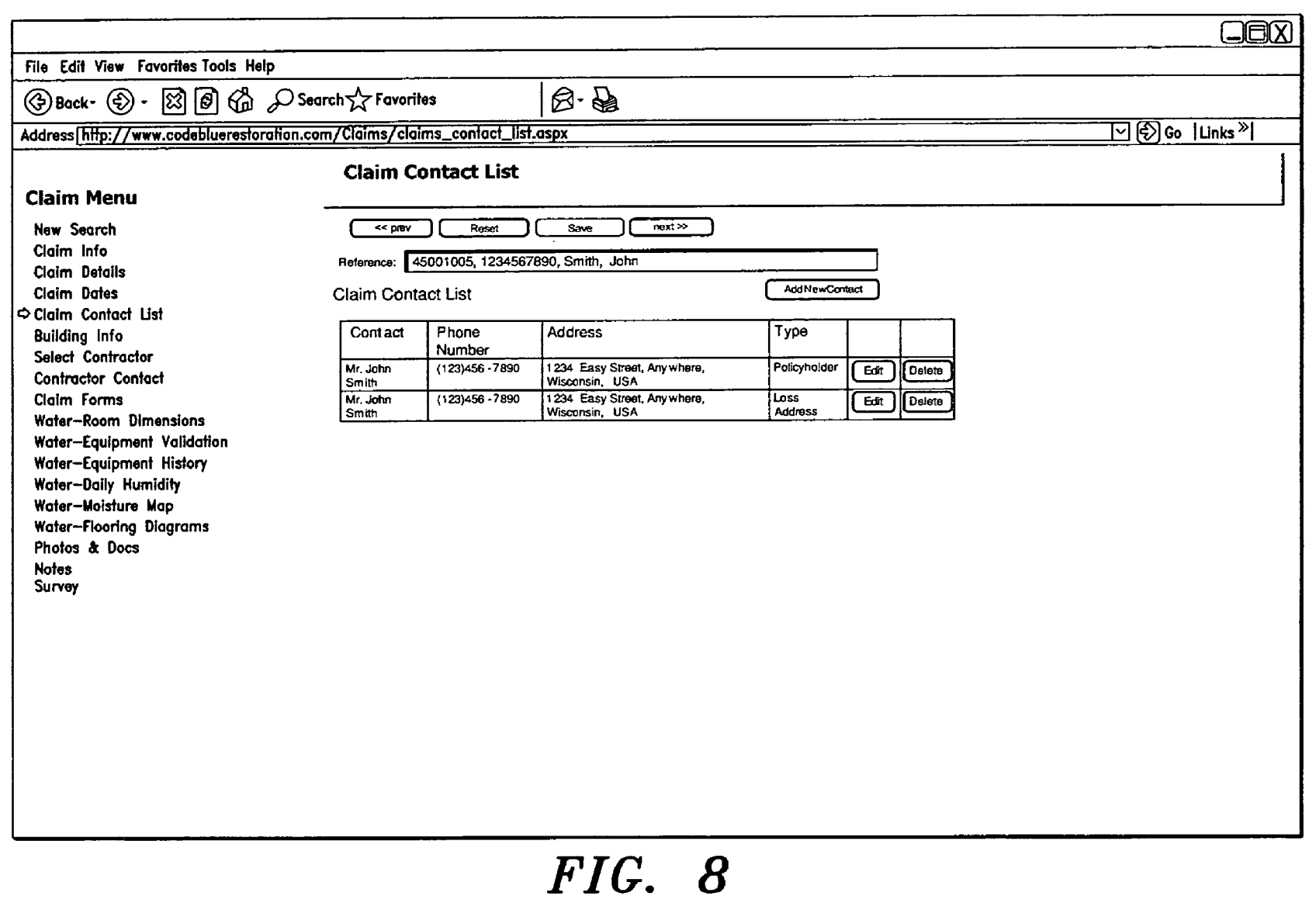

FIG. 8 shows a "screen capture" depiction of a "Claim Contact List" page for the claims administration web site of FIG. 2.

FIG. 9 shows a "screen capture" depiction of a "Building Info" page for the claims administration web site of FIG. 2.

Figure 10A:
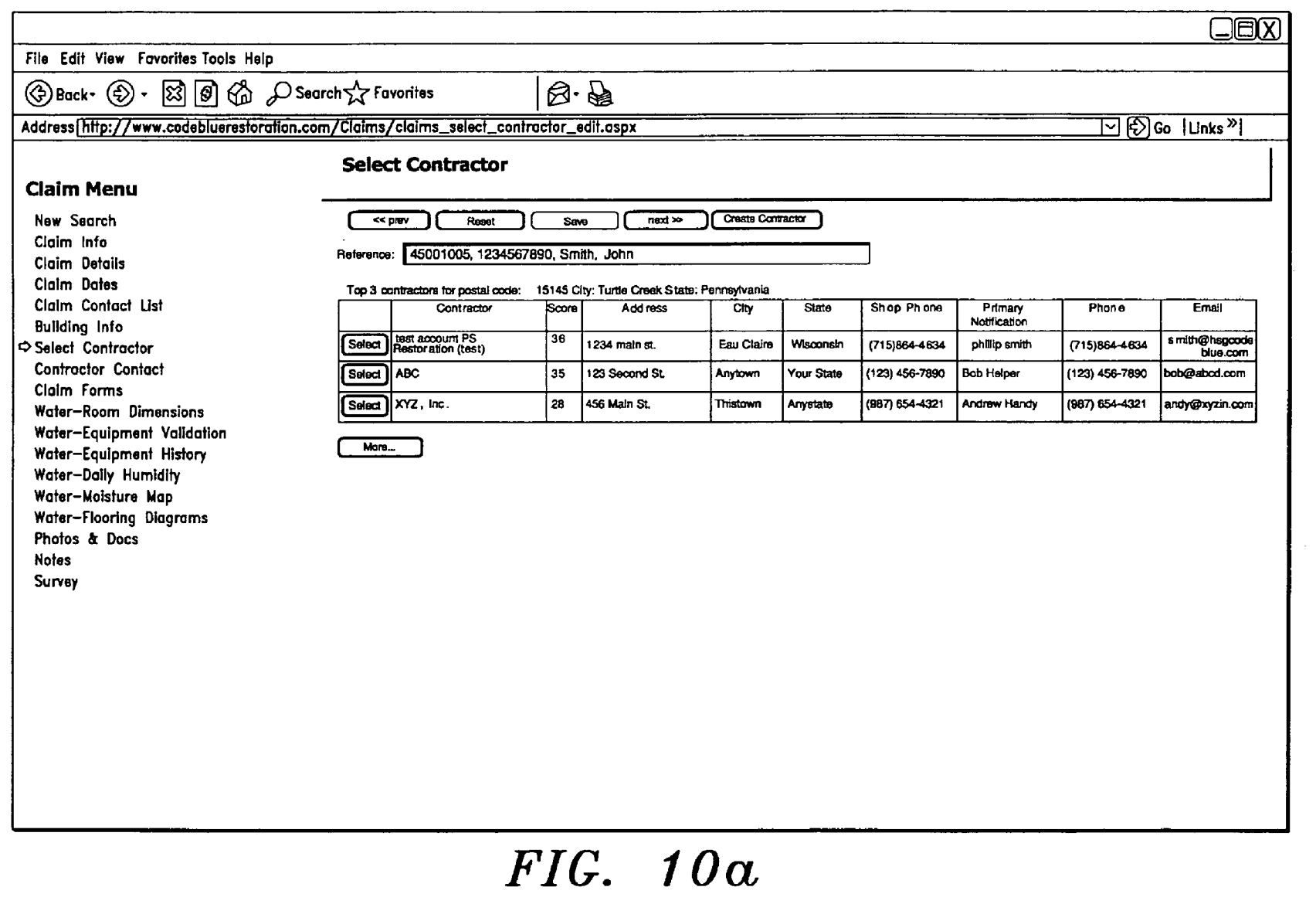
Figure 10B:
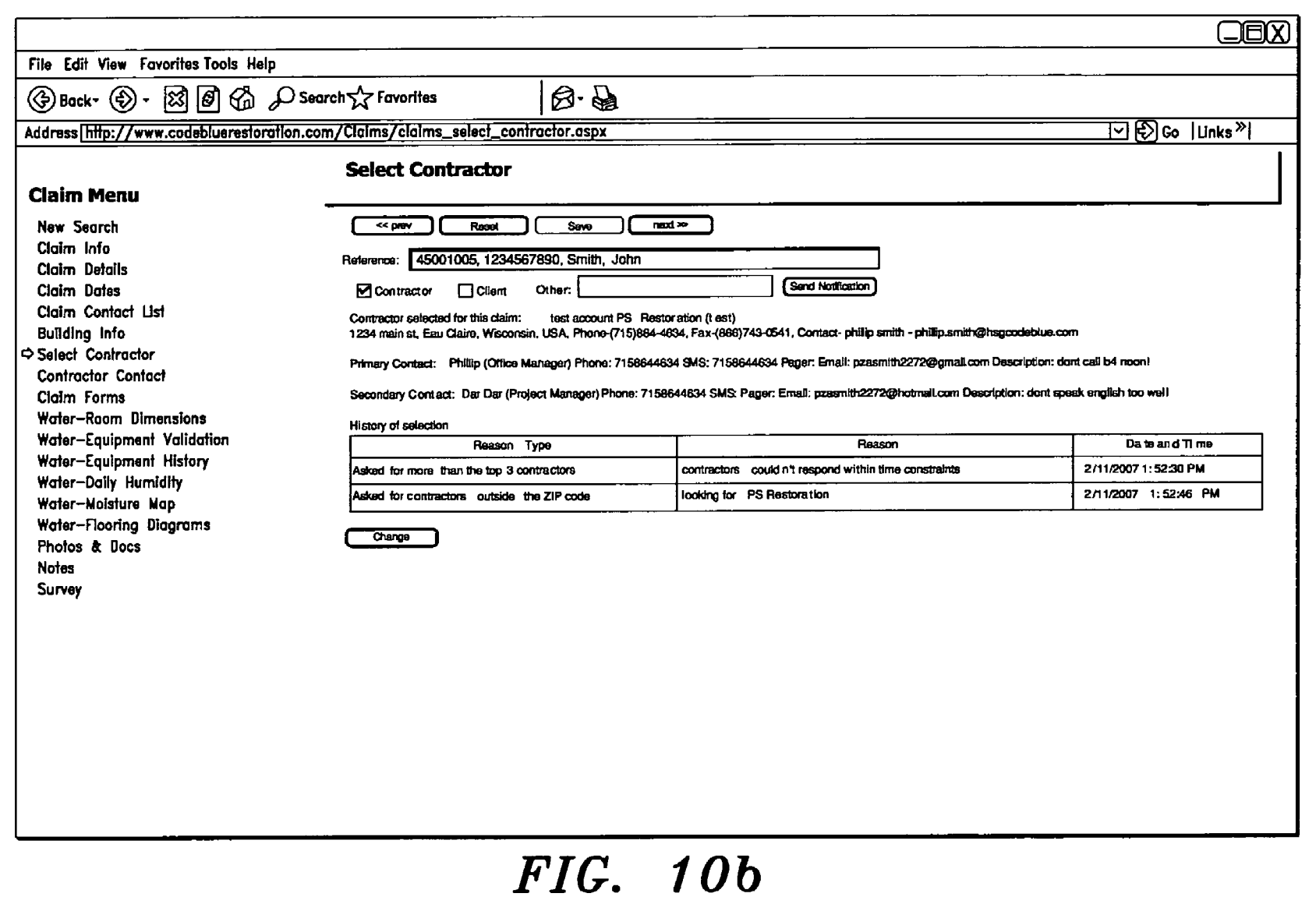

FIGS. 10A and 10B show "screen capture" depictions of a "Select Contractor" page for the claims administration web site of FIG. 2.

FIG. 11 shows a "screen capture" depiction of a "Contractor Contacts" page for the claims administration web site of FIG. 2.

FIG. 12 shows a "screen capture" depiction of a "Claim Forms" page for the claims administration web site of FIG. 2.

FIG. 13 shows a "screen capture" depiction of a "Room Dimensions" page for the claims administration web site of FIG. 2.

FIG. 14 shows a "screen capture" depiction of a "Equipment Validation" page for the claims administration web site of FIG. 2.

FIG. 15 shows a "screen capture" depiction of an "Equipment History" page for the claims administration web site of FIG. 2.

FIGS. 16A, 16B, 16C and 16D show "screen capture" depictions of a "Daily Humidity" page for the claims administration web site of FIG. 2.

FIG. 17 shows a "screen capture" depiction of a "Moisture Map" page for the claims administration web site of FIG. 2.

Figure 18:
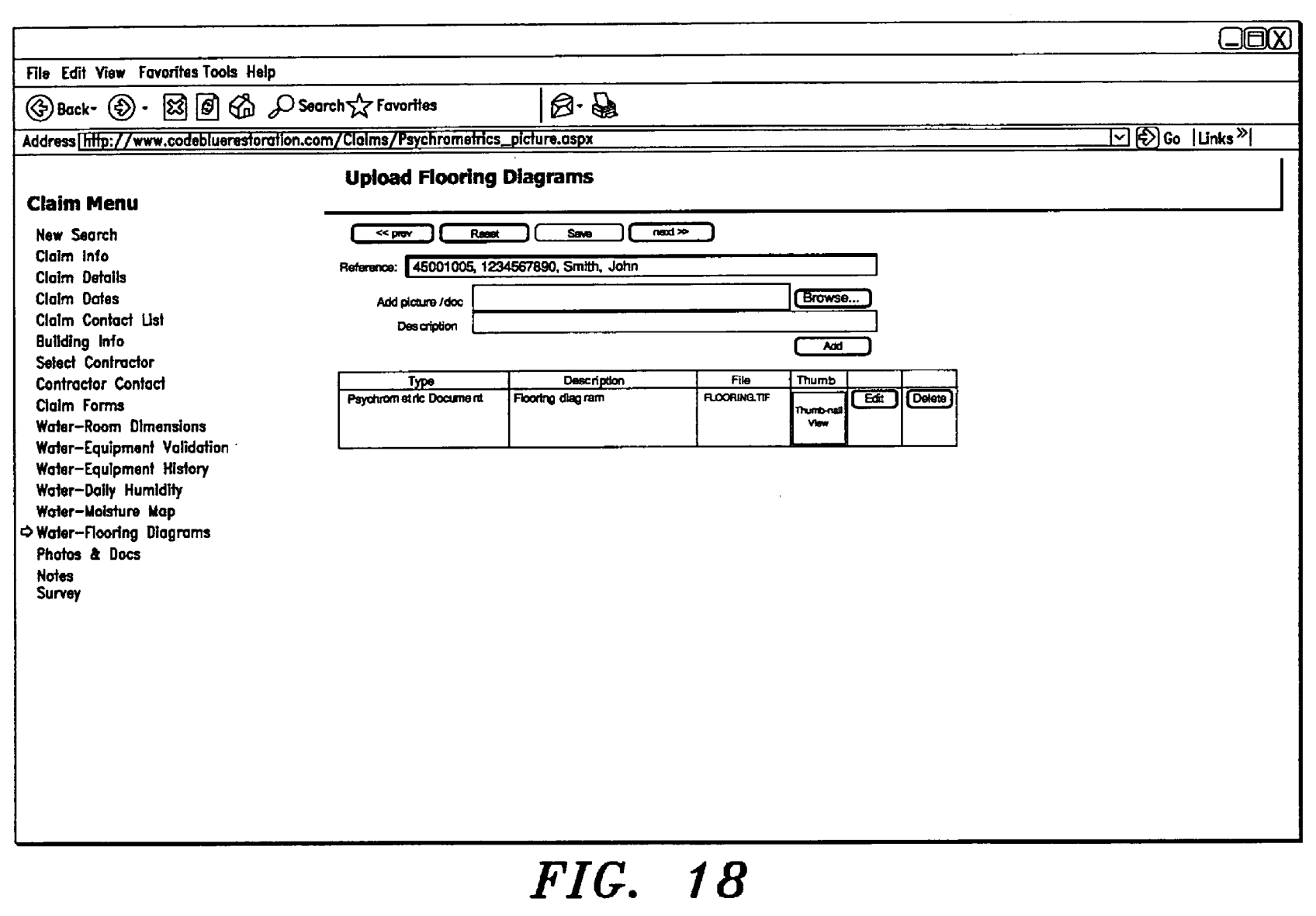

FIG. 18 shows a "screen capture" depiction of a "Flooring Diagrams" page for the claims administration web site of FIG. 2.

FIG. 19 shows a "screen capture" depiction of a "Photos & Docs" page for the claims administration web site of FIG. 2.

Figure 20:
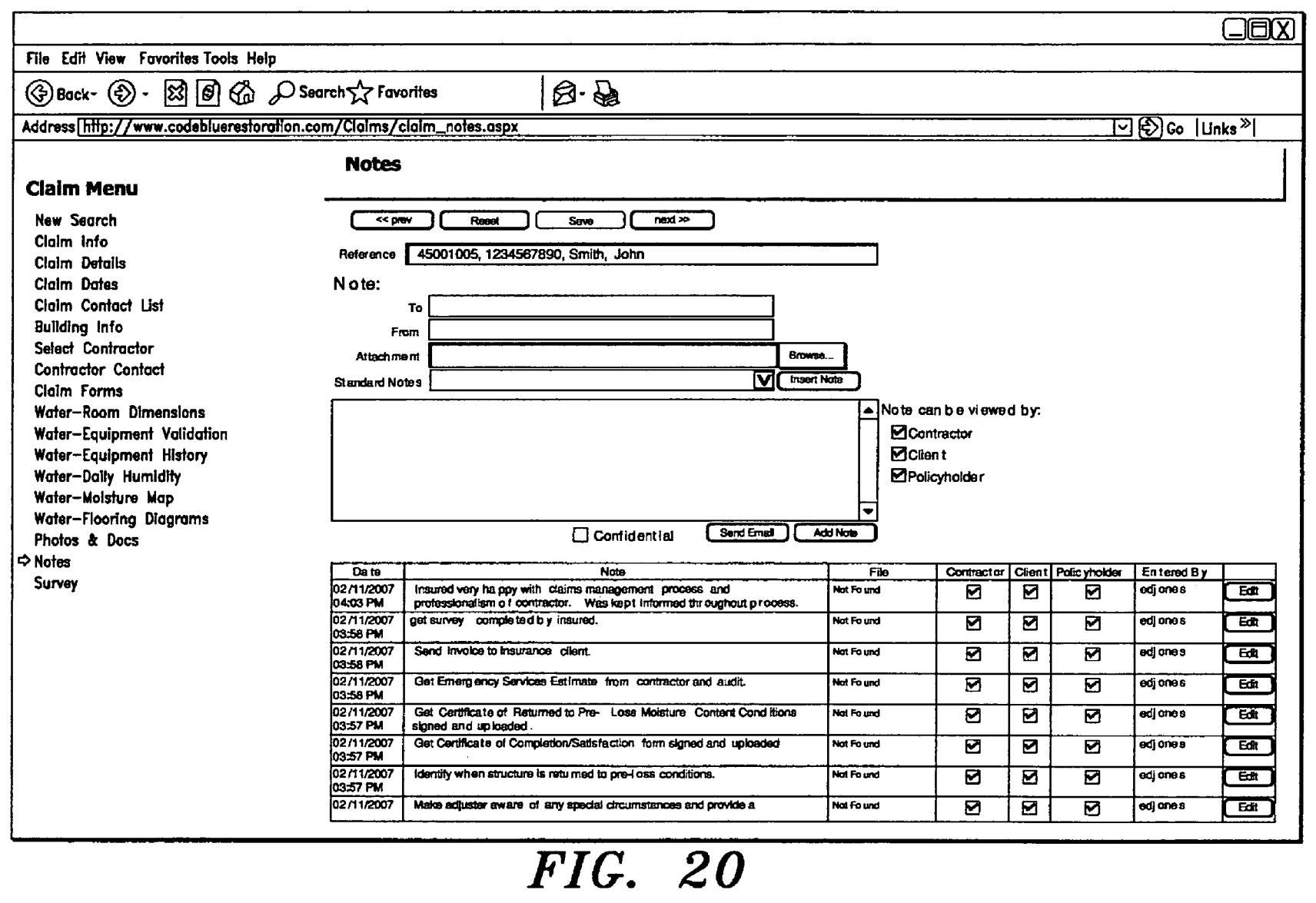

FIG. 20 shows a "screen capture" depiction of a "Notes" page for the claims administration web site of FIG. 2.

Figure 21A:
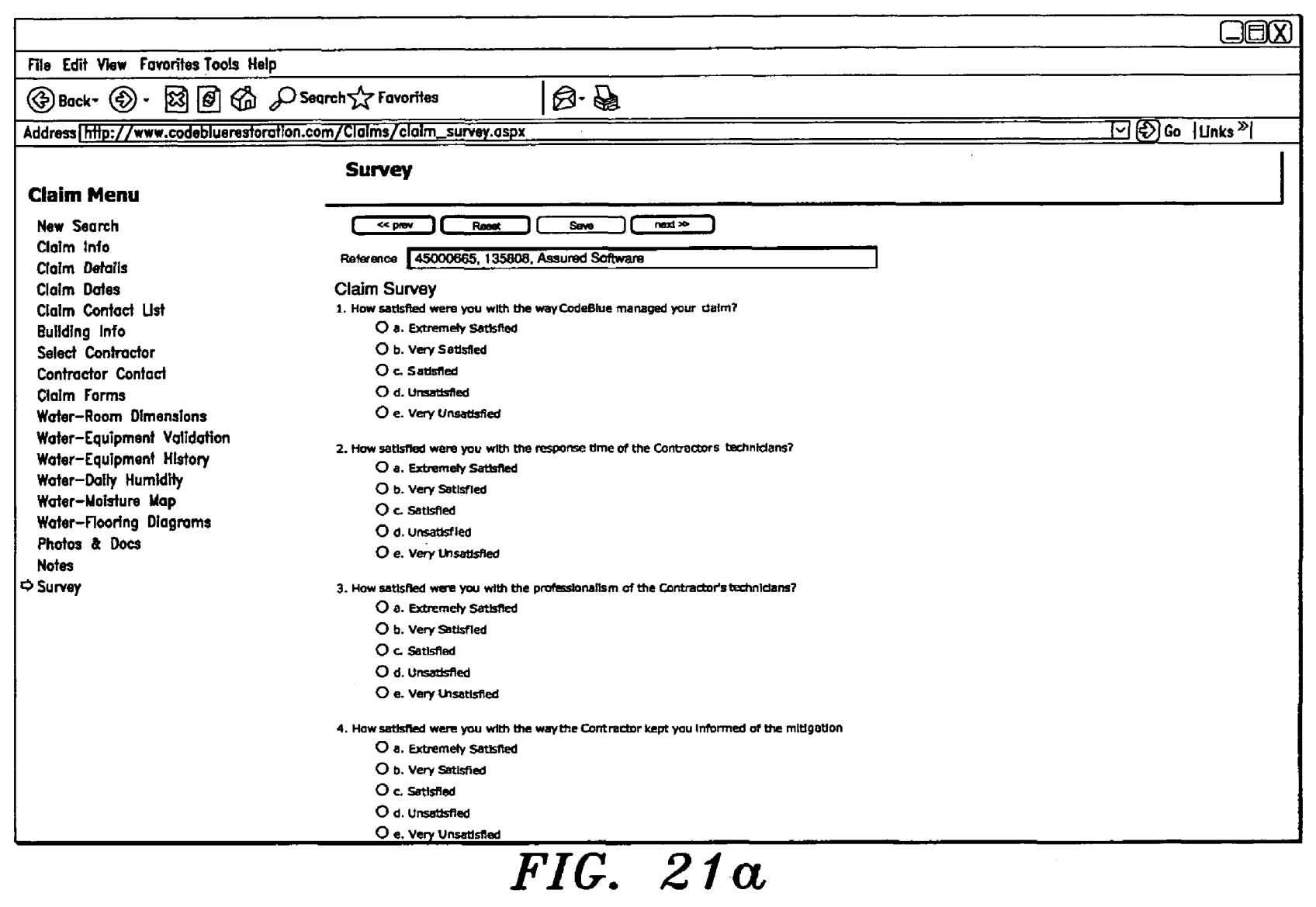

FIGS. 21A-21B show "screen capture" depictions of a "Survey" page for the claims administration web site of FIG. 2.

FIG. 24 shows an "Insurance Submission Form" for recording detailed information on salvage items for subsequent entry into the salvage management web site shown in FIG. 22.

FIG. 26 shows a "screen capture" depiction of a "Claim Information" page for the salvage management web site shown in FIG. 22.

FIG. 28 shows a "Contractor Assignment Form" for recording detailed information on salvage items for subsequent entry into the salvage management web site shown in FIG. 22.

DETAILED DESCRIPTION OF AN EXEMPLARY EMBODIMENT OF THE INVENTION

The present invention is directed to a system and method for processing and monitoring insurance claims and/or managing the sale of items salvaged from insured properties. While the invention will be described in detail below with reference to an exemplary embodiment, it should be understood that the invention is not limited to the specific system configurations or methodologies of this embodiment. For example, although the exemplary embodiment is described primarily in the context of a residential property insurance claim stemming from water damage to the insured property, the invention could be used in connection with other types of property (such as commercial property) or involving other types of losses (such as fire and smoke damage, wind damage, and impact damage). In addition, although the exemplary embodiment is described as embodying several different inventive features, one skilled in the art will appreciate that any one of these features could be implemented without the others in accordance with the invention.

System Configuration of Claims Administration Web Site

Figure 1:
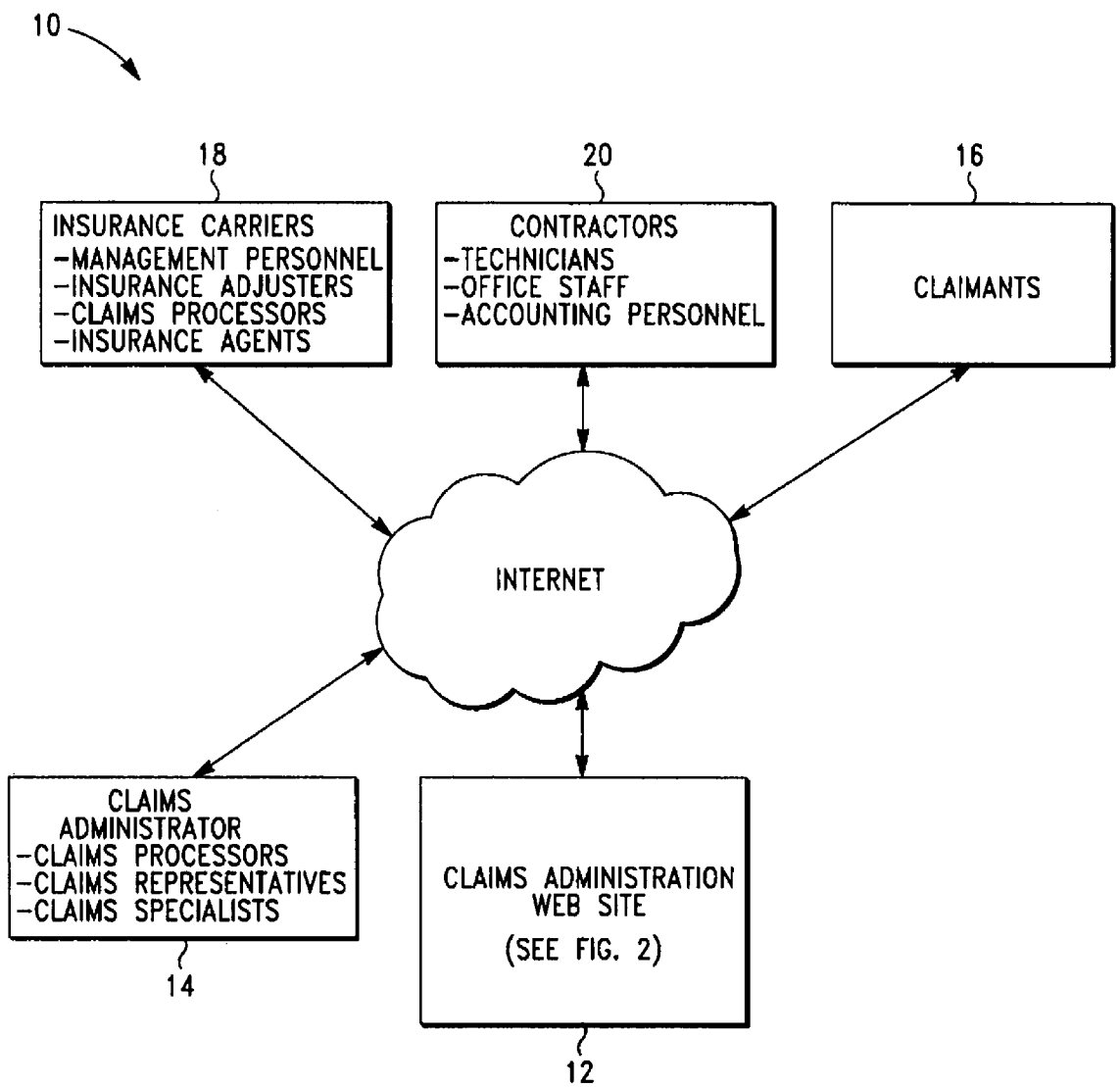
FIG. 1 shows a block diagram of an exemplary system for processing and monitoring insurance claims in accordance with the present invention.

Referring to FIG. 1, an exemplary system for processing and monitoring insurance claims in accordance with the present invention is shown generally as reference numeral 10. The system 10 includes a claims administration web site 12 that implements the basic World Wide Web standards for the coding and transmission of hypertextural documents. These standards currently include HTML (hypertext mark up language) and HTTP (hypertext transfer protocol). The site 12 is operated by a claims administrator 14 that is responsible for processing and monitoring insurance claims. The site 12 is accessible by a plurality of different users via the Internet, although other communication networks known in the art could also be used. It will be seen that the site 12 provides a "one stop shop" for users to access comprehensive claim files on hundreds or thousands of insurance claims.

Users of the claims administration web site 12 generally include the claims administrator 14 (i.e., the operator of the site), a plurality of claimants 16 (i.e., the owners or occupiers of insured properties), a plurality of insurance carriers 18 (i.e., the issuers of insurance policies), and a plurality of contractors 20 (i.e., vendors and/or shops responsible for performing all or part of the restoration services at the insured properties). Each of these users may include a plurality of individual users. For example, the claims administrator 14 may include claims processors, claims representatives, and claims specialists. An insurance carrier 18 may include insurance adjusters, insurance agents, claims processors, and management personnel. A contractor 20 may include technicians, office staff and accounting personnel. These users are exemplary of the users involved in the processing and monitoring of a typical insurance claim. Of course, it should be understood that a particular insurance claim may not involve all of these users or may involve users other than those depicted in FIG. 1.

Figure 2:
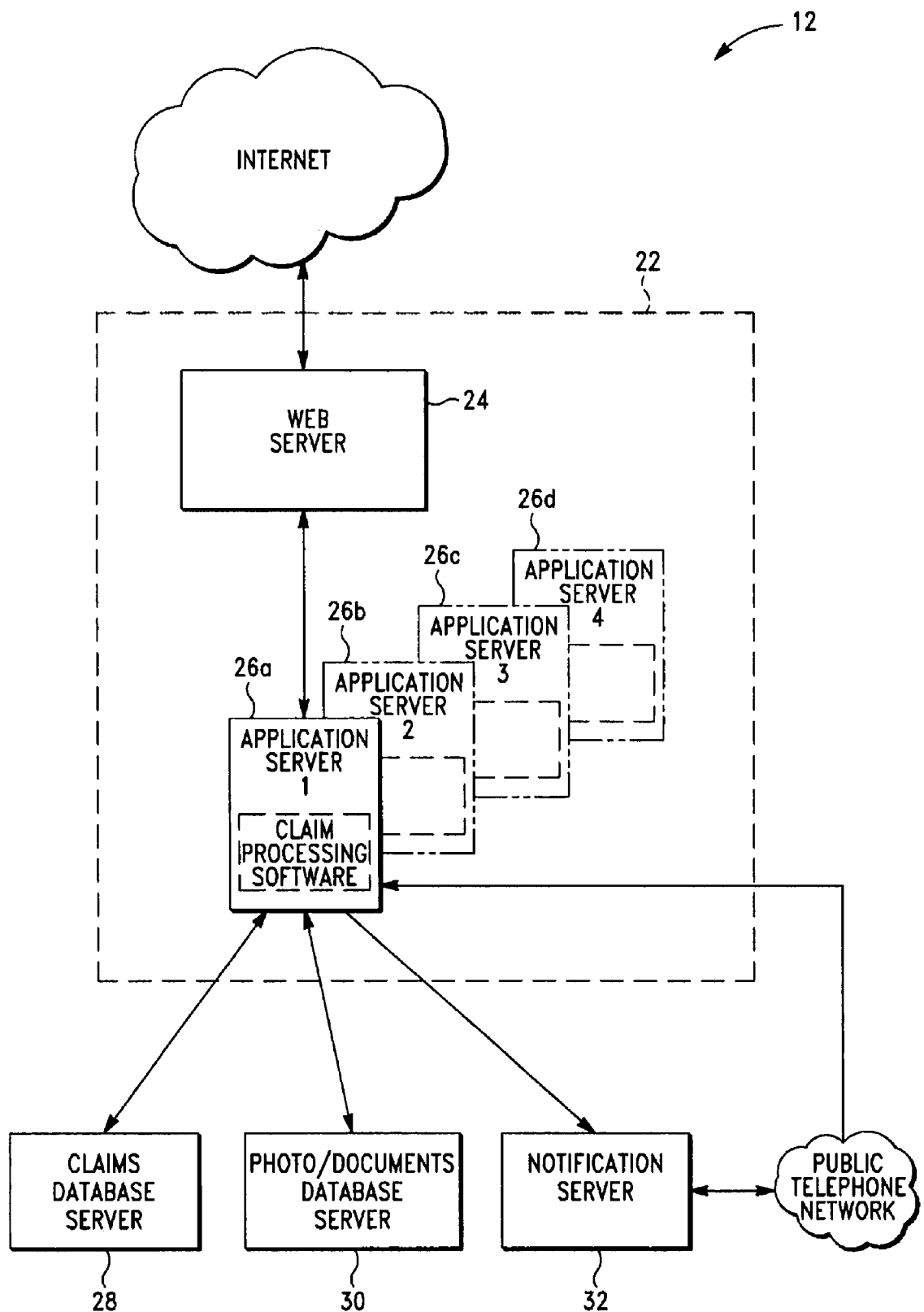
FIG. 2 shows a block diagram of the claims administration web site of FIG. 1.

FIG. 2 shows an exemplary embodiment of the claims administration web site 12. The site 12 includes a server system 22 comprising a web server 24 coupled to four application servers 26a, 26b, 26c, 26d. The web server 24 is connected to the Internet and includes a user interface that presents various web pages to the users, and, includes functionality for the users to submit claim data into various data input fields displayed on the web pages (which will be described in greater detail below). The web server also acts as a load balancer to distribute user traffic among the application servers 26a, 26b, 26c, 26d. While four application servers are depicted in FIG. 2, it should be understood that more or fewer application servers may be implemented depending on the number of users accessing the site 12.

Each of the application servers 26a, 26b, 26c, 26d runs a claim processing software application (shown in phantom lines) that provides various insurance claim processing and monitoring capabilities to the users. In this embodiment, the claim processing software application comprises a single computer program written in the Visual Studio C#.net programming language. Of course, a suite of computer programs and/or other programming languages could also be used. One skilled in the art will appreciate that users are able to utilize the capabilities of the claim processing software application via the user interface of the web server 24.

Each of the application servers 26a, 26b, 26c, 26d is coupled to a claims database server 28, which stores claim data for a plurality of insurance claims. Preferably, the claim data for each insurance claim is stored in the claims database server 28 in association with a claim identifier that is unique to that insurance claim. A variety of different types of claim data may be stored for each insurance claim, including data related to the claimant, data related to the insurance carrier, data related to the insurance policy, data related to the contractor assigned to the insurance claim, data related to the insured property, data related to the damage incurred at the insured property, and data related to the restoration of any damaged property (which may comprise damaged structural materials and/or damaged contents). It should be understood that the server system 22 controls the storage of the various claim data in the claims database server 28.

Each of the application servers 26a, 26b, 26c, 26d is also coupled to a photos/documents database server 30, which stores additional claim data for a plurality of insurance claims. Specifically, the photos/documents database server 30 stores a variety of photographs and documents related to the insured property, the damage incurred at the insured property, and the restoration of any damaged property (which again may comprise damaged structural materials and/or damaged contents). Preferably, the photographs and documents for each insurance claim are stored in the photos/documents database server 30 in association with a claim identifier that is unique to that insurance claim. It should be understood that the server system 22 controls the storage of the photographs and documents in the photos/documents database server 30.

In this embodiment, the photographs and documents are stored separately in the photos/documents database server 30 (rather than being stored with the other claim data in the claims database server 28) in order to allow for the storage of the photographs and documents in a higher-capacity storage medium, and, to permit faster access to the other claim data stored in the claims database server 28. Of course, one skilled in the art will appreciate that all claim data could be stored in a single database server or could be stored in more than two database servers.

It should be noted that the claims database server 28 also stores data related to various users of the site, including insurance carriers and contractors available to perform restoration services. Preferably, contractors are required to submit detailed information about their services and capabilities in order to become a member of the "restoration contractor network." All of this detailed information is stored in the claims database server 28 and is used to select the appropriate contractor for a particular insurance claim, as will be described in greater detail below.

Each of the application servers 26a, 26b, 26c, 26d is also coupled to a notification server 32. The notification server 32 runs a software application that receives a .wav file and a telephone number from one of the application servers and automatically dials the telephone number through an interface with the public telephone network. The software application monitors the status of the call and plays the .wav file when the call is answered so as to transmit a voice message to the recipient. Preferably, the application server generates the .wav file by retrieving a desired textual script from the claims database server 28 (which stores a plurality of textual scripts) and converting the textual script to the .wav file. In this manner, the application server functions as a text-to-speech generator. It will be seen that this feature is used in connection with the transmission of automated reminder messages to contractors as part of the management of the insurance claims.

In this embodiment, the web server 24, the application servers 26a, 26b, 26c, 26d, the claims database server 28, the photos/documents database server 30, and the notification server 32 are all co-located in the same geographic location. It should be understood, however, that one or more of these servers could be located in a different geographic location with appropriate connections to the other servers.

Referring still to FIG. 2, the claims administration site 12 is preferably a secure web site wherein each user is assigned a user identifier (e.g., a user name) and password upon registration with the site 12. The user identifier and password for each of the users is stored in the claims database server 28 and defines the claim data and/or web pages that may be accessed by the user. For example, a claims specialist at the claims administrator may have full access to all of the claim data and web pages, while a claimant may have restricted access to only portions of the claim data and/or web pages. Access rights may be granted or restricted based on claim data, web pages, or a combination of both. For example, a claimant may be granted access to a particular web page, but not have rights to view all of the claim data available for display on that web page. By contrast, a claims specialist at the claims administrator may be able view all of the claim data on that same web page.

To gain access to the claims administration site 12, a user accesses a login-in page presented by the server system 22 and enters a user identifier and password into appropriate data input fields displayed on the log-in page. The server system 22 authenticates the user identifier and password (i.e., verifies that the user identifier and password are stored in the claims database server 28) and determines the access rights for the user. The user is then able to access various web pages of the site 12 in accordance with the access rights for that user.

FIGS. 4-21 show "screen capture" depictions of the various web pages of the claims administration site 12. As can be seen, each of these web pages displays a variety of data input fields, selection buttons, hyperlinks and various textual information. For example, the "New Search" page shown in FIG. 4 includes a plurality of data input fields labeled "Client," "Client Contact," "Contractor," "Phone #," "Policyholder First Name," "Policyholder Last Name," "Policyholder Company," "Policy #," "Claim #," "HSG Control #," and "Claim Status," as well as two selection buttons labeled "New" and "Search." In the case of an existing claim, a user enters data into one or more of the data input fields and selects the "Search" button. The claims matching the search criteria are displayed in a list format so that the user may select a particular claim and access the web pages shown in FIGS. 5-21. At this point, the user may simply view one or more of these web pages, or, may submit additional claim data via the data input fields displayed on these web pages (depending on the user's access rights). In the case of a new claim, a user selects the "New" button whereby the user proceeds to submit various claim data via the data input fields displayed on the web pages shown in FIGS. 5-21.

The web pages shown in FIGS. 5-21 display claim data relating to a particular insurance claim (wherein the data may be submitted by one user or a plurality of users). As can be seen, each of these web pages displays a columnar list along the left-hand side of the page titled "Claim Menu." The "Claim Menu" list includes hyperlinks to all of the web pages, namely, "Claim Info," "Claim Details," "Claim Dates," "Claim Contact List," "Building Info," "Select Contractor," "Contractor Contacts," "Claim Forms," "Water-Room Dimensions," "Water-Equipment Validation," "Water-Equipment History," "Water-Daily Humidity," "Water-Moisture Map," "Water-Flooring Diagrams," "Photos & Docs," "Notes" and "Survey." A selection of any of these hyperlinks causes the corresponding web page to be displayed, thus allowing a user to easily navigate between the various web pages of the site. An arrow icon indicates the web page that is currently being displayed.

It can be seen that each of the web pages shown in FIGS. 5-21 displays four selection buttons labeled "<<prev," "Reset," "Save," and "next>>" along the top of the page (just below the title of the page). The "<<prev" and "next>>" buttons allow navigation to the previous and next web pages in the "Claim Menu" list. A selection of the "Reset" button clears all of the data entered in the data input fields for that particular web page. A selection of the "Save" button saves all the data entered in the data input fields for that particular web page. The "Reset" and "Save" buttons may be inaccessible (or greyed-out) when the user does not have access rights that permit these actions. Other data input fields and selection buttons displayed on these web pages will be described below.

It should be understood that the web pages shown in FIGS. 4-21 are merely examples of the type of web pages that may be used to implement the various features of the invention. Other web pages could be used that display the claim data in a different format and/or that display different types of claim data. For example, in an extreme case, all of the claim data could be displayed on a single web page. As such, throughout the following description (including in the claims), the terms "web pages" and "web page" are used interchangeably to refer to either a single web page or a plurality of web pages that collectively display a variety of different types of claim data.

Methodology of Processing and Monitoring Insurance Claims

An exemplary method for processing and monitoring insurance claims in accordance with the present invention will now be described with reference to blocks 110 to 154 of the process flow diagram shown in FIGS. 3A and 3B. In conjunction with the process flow diagram of FIGS. 3A and 3B, reference will be made to the various web pages depicted in FIGS. 5-21. It should be noted that various "sample" claim data has been entered into the data input fields of these web pages in order to illustrate the processing and monitoring of an insurance claim in accordance with the exemplary embodiment. However, as discussed above, the invention is not limited to the exemplary embodiment (let alone the "sample" claim data of the exemplary embodiment). As such, it should be understood that the "sample" claim data does not in any way limit the scope of the present invention.

Receive First Notice of Loss

Figure 3A:
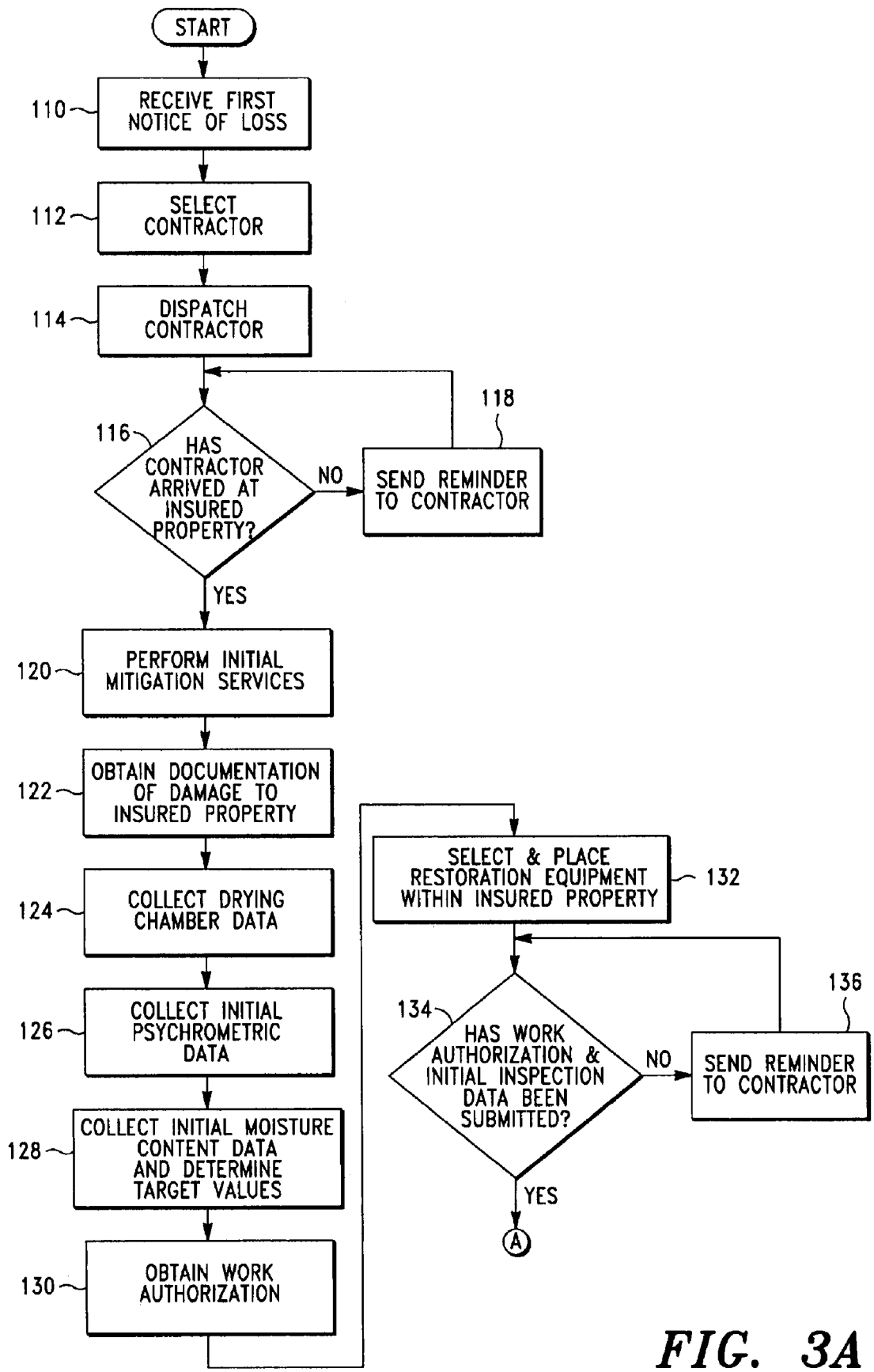
FIGS. 3A and 3B show a process flow diagram of an exemplary method for processing and monitoring insurance claims in accordance with the present invention.

Referring to FIG. 3A, at block 10, a claimant reports damage or loss at an insured property as a "first notice of loss." The claims administrator may receive the first notice of loss in a number of different ways. Preferably, when the claimant calls a claims reporting telephone number provided by the insurance carrier, the call is routed directly to the claims administrator, or, is routed directly to the insurance carrier whereby the call is automatically and transparently transferred to the claims administrator. In either case, the claims administrator answers the call with "Insurance Carrier" such that the claimant is unaware that a party other than the insurance carrier is receiving the first notice of loss. Other ways in which the claims administrator may receive the first notice of loss will be described below.

In the exemplary embodiment, upon answering the call from the claimant, the claims administrator begins entry of the new claim by accessing the "New Search" page (FIG. 4) of the claims administration web site 12. The claims administrator selects the "New" button at the bottom of the "New Search" page (FIG. 4) whereby the "Claim Info" page (FIG. 5) is displayed.

The "Claim Info" page includes various data input fields that must be completed by the claims administrator. For example, the "Clients" field includes a drop-down menu from which the claims administrator selects the insurance carrier responsible for insuring the damaged property. The insurance carrier options in the drop-down menu are pre-populated based on client (i.e., insurance carrier) information stored in the claims database server 28. The claims administrator may receive the insurance carrier information from the claimant, or, this information may be known based on the telephone number used by the claimant to report the loss. The "Client Contact" field includes a drop-down menu from which the claims administrator selects the names and telephone numbers of contact people at the selected insurance carrier. The contact options in the drop-down menu are pre-populated based on contact information stored in the claims database server 28 in association with the selected insurance carrier. The claims administrator selects the contact at the insurance carrier who is responsible for the new claim. The "HSG Control #" field and the "Claim #" field are claim identifiers assigned by the claims administrator and insurance carrier, respectively, to identify and monitor the new claim. The information in the "HSG Control #" field is automatically generated upon saving the new claim data to the claims database server 28. The information in the "Claim #" field is typically entered by the insurance carrier at a later time.

The "Claim Info" page also includes a "Policy Information" heading under which appears data input fields for "Building Limit," "Contents Limit," "Policy #," "Effective Date," and "Expiration Date." In the "Policy #" field, the claims administrator enters the claimant's insurance policy number for the damaged property. The "Building Limit" and "Contents Limit" fields allow entry of the insurance policy's limits on coverage for the structure and contents, respectively, of the damaged property. The "Effective Date" and "Expiration Date" fields allow entry of the insurance policy's effective and expiration dates. The information in the latter four fields is typically entered by the insurance carrier at a later time.

The "Claim Info" page also includes data input fields under a "Policyholder" heading in which the claims administrator enters personal and contact information (e.g., name, address, telephone number) for the policyholder (i.e., claimant). The page also includes data input fields under a "Loss Address" heading in which the claims administrator enters personal and contact information (e.g., name, address, telephone number) for the resident of the damaged property. In a typical case in which the "Loss Address" information is the same as the "Policyholder" information, the claims administrator may select the "Same As Policyholder" button whereby the "Loss Address" fields are automatically populated with the information entered into the "Policyholder" fields.

The "Claim Info" page also includes three selection buttons located in the upper right portion of the page, namely, the "Create New Client" button, the "Create Associate Claim" button, and the "Show Associate Claim" button. The "Create New Client" button allows the claims administrator to add a new client (i.e., insurance carrier) to the claims database server 28, the "Create Associate Claim" button allows the claims administrator to identify the current claim as being associated with another existing claim in the claims database server 28, and the "Show Associate Claim" button allows the claims administrator to display any other claims in the claims database server 28 that are already associated with the current claim.

Figure 6:
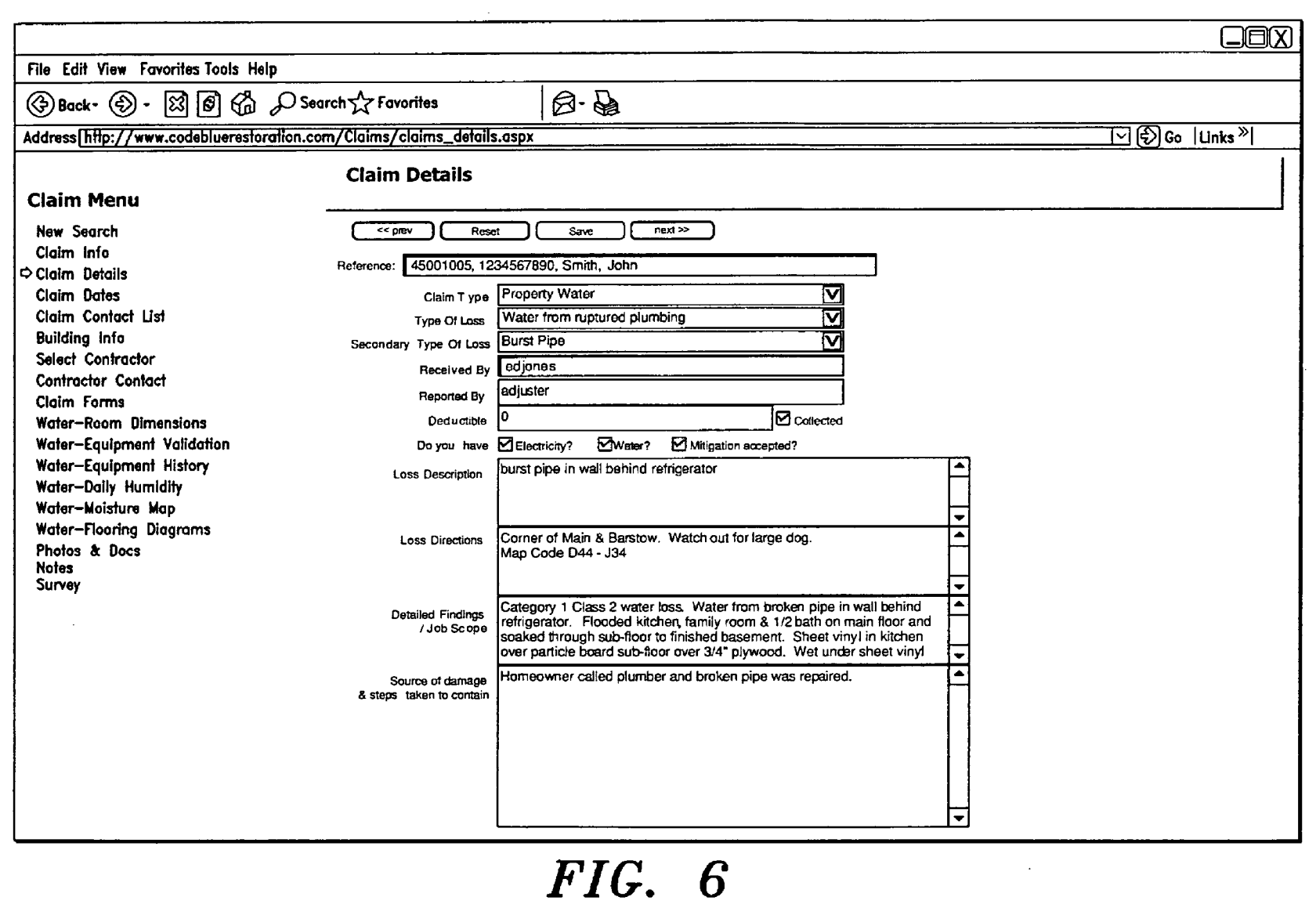

Upon completion of data entry on the "Claim Info" page, the claims administrator selects the "Save" button whereby the data is stored in the claims database server 28. The claims administrator then selects the "next>>" button to navigate to the "Claim Details" page (FIG. 6). It should be noted that the "Claim Details" page, as well as all subsequent pages described below, includes a read-only "Reference" field that displays the claims administrator's claim identifier, the insurance carrier's claim identifier, and the name of the policyholder. This "Reference" field provides an easy reference for a user to confirm that the page relates to a particular claim.

The "Claim Details" page includes data input fields for "Claim Type," "Type of Loss," "Secondary Type of Loss," "Received By," "Reported By," "Deductible," "Loss Description," "Loss Directions," "Detailed Findings/Job Scope," "Source of Damage and Steps Taken to Contain," "Selected Contractor," "Primary Contact," and "Secondary Contact," as well as checkbox input fields for "Electricity," "Water," "Mitigation Accepted," and "Collected."

The "Claim Type" field includes a drop-down menu from which the claims administrator selects the type of claim. In this embodiment, the claim type options in the drop-down menu are "Property Fire," "Property Power Outage," "Property Vandalism," "Property Vehicle Impact," "Property Water," "Property Weight of Ice or Snow," and "Property Wind." In this sample claim, the claims administrator selects the "Property Water" option.

Based on the selected claim type, the drop-down menu for the "Type of Loss" field is populated with various types of losses corresponding to the selected claim type. For example, with a claim type of "Property Water," the drop-down menu for the "Type of Loss" field is populated with "Frozen Pipes," "Furnace Malfunction," "Hail," "Heavy Load," "Hurricane," "Ice Dam," "Miscellaneous," "Mold," "Occupant Accidental Fire," "Occupant Left Water Running," "Sewage Backup," "Skunk Odor," "Structural Collapse," "Toilet Backup/Category 2," "Toilet Backup/Sewage/Category 3," "Toilet Tank Break Category 1," "Tornado," "Tub or Shower Backup Category 2," "Vandalism," "Vehicle Impact," "Water Entering From Basement Walls," "Water Entering From Roof," "Water Entering From Sump," "Water Entering From Wall," "Water Entering From Window," "Water From Miscellaneous," "Water From Ruptured Plumbing," "Water From Sprinkler System," "Water From Undefined Sources," and "Wind Storm." In this sample claim, the claims administrator selects the "Water from ruptured plumbing" option.

Based on the selected type of loss, the drop-down menu for the "Secondary Type of Loss" field is populated with various types of secondary losses corresponding to the selected type of loss. For example, with a type of loss of "Water from ruptured plumbing," the drop-down menu for the "Secondary Type of Loss" field is populated with "Broken Hardware (Faucets, etc.)," "Burst Pipe," "Ceiling," "City Sewer Backup," "Clothes Washer Overflow or Leak," "Dishwasher Overflow or Leak," "Entering Through Wall," "Entering Through Window," "Flood," "Humidity," "Leakage," "Refrigerator Icemaker Sink Drain Leak," "Sprinkler System," "Tub or Toilet Overflow," "Undefined Sources," and "Water Entered Through Window or Door Seal" (although other options could be added as desired). In this sample claim, the claims administrator selects the "Burst Pipe" option.

The "Received By" field indicates the name of the person at the claims administrator (or other person) entering the details of the claim. The "Reported By" field indicates the name or other identification of the person reporting the claim. Typically, the "Reported By" field would identify the claimant. However, as will be described in more detail below, in some cases the claim may be reported by the insurance carrier in which case the "Reported By" field would identify the insurance carrier.

The "Deductible" field and associated "Collected" checkbox allow entry of the claimant's insurance policy deductible amount and an indication as to whether that deductible has been collected from the claimant. This information is typically entered by the insurance carrier at a later time.

The "Electricity" and "Water" checkboxes allow an indication as to whether the insured property has working electrical and water service available. The "Loss Description," "Loss Directions," and "Source of damage & steps taken to contain" fields allow entry of the claimant's description of the damage to the insured property, directions to the insured property, and steps already taken to control or repair the damage to the insured property, respectively. The "Mitigation accepted?" checkbox allows an indication as to whether the claimant has agreed to allow a contractor to perform initial mitigation steps to prevent further damage to the insured property.

The "Detailed Findings/Job Scope" field allows entry of detailed findings of the cause and extent of the damage to the insured property. The information entered into this field is typically not received from the claimant, but is entered by a contractor after arrival at the insured property or by the claims processor based on input from the contractor.

Upon completion of data entry on the "Claim Details" page, the claims administrator selects the "Save" button whereby the data is stored in the claims database server 28. The claims administrator then navigates to the "Building Info" page (FIG. 9).

The "Building Info" page includes data input fields labeled "Building Style," "Year Built," "Square Feet," "Siding," "Roofing," "Year Roof Installed," "Basement," "Garage," "Outbuilding," and "Owner Notes." If the claimant has information for the "Year Built," "Square Feet," "Year Roof Installed," and "Owner Notes" fields, the claims processor enters this information into the appropriate fields. The remaining data input fields include drop-down menus that are automatically populated with typical options for each of those fields. The claims administrator selects the appropriate option for those fields from the drop-down menus. Of course, if the claimant does not have all (or any) of the information for the data input fields on the "Building Info" page, the information may be entered later by either the claims administrator, the contractor (who may enter the information after arriving at the insured property), or the insurance carrier (who may enter the information based on records related to the insured property).

Figure 7:
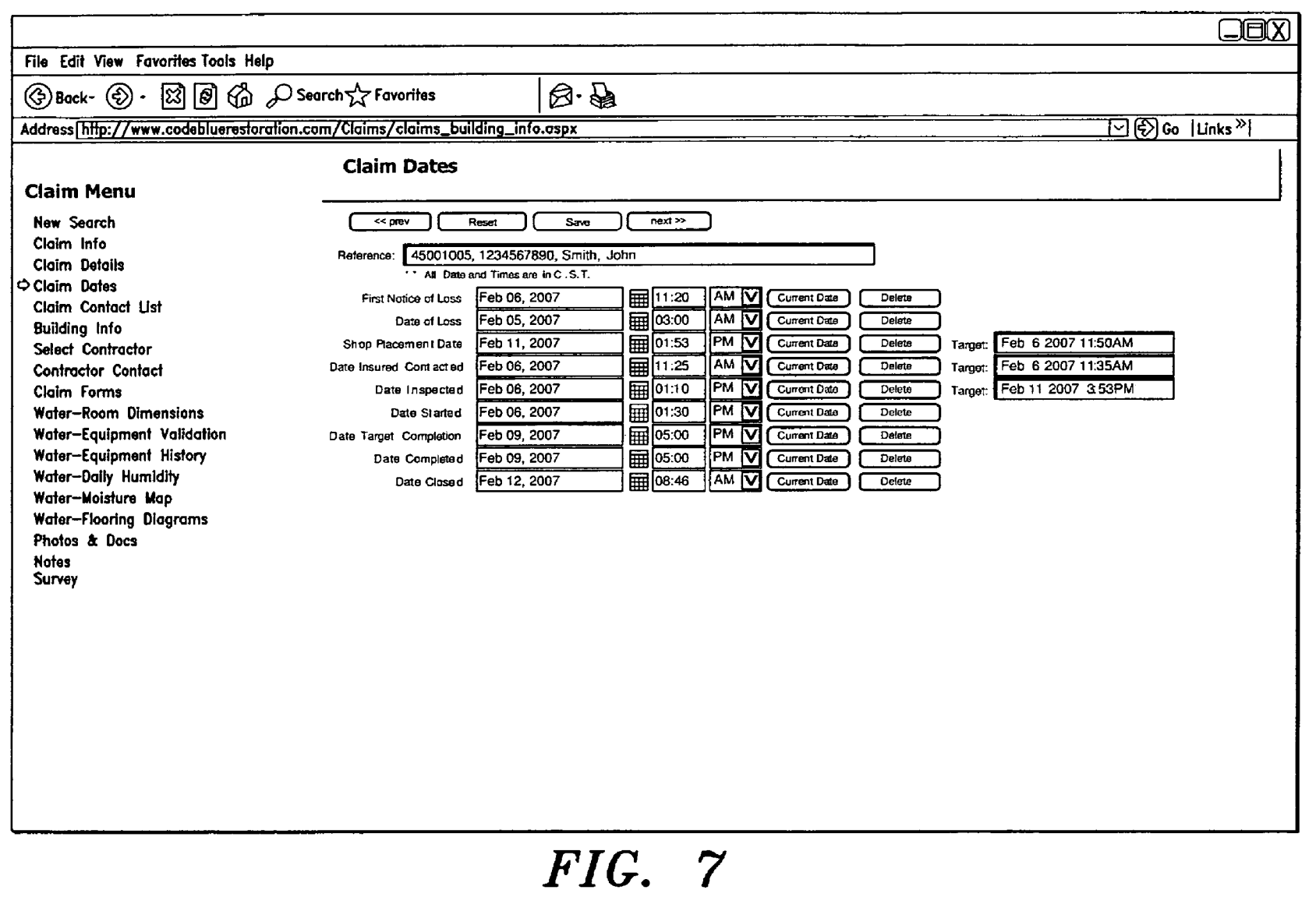

Upon completion of data entry on the "Building Info" page, the claims administrator selects the "Save" button whereby the data is stored in the claims database server 28. The claims administrator then navigates to the "Claim Dates" page (FIG. 7).

The "Claim Dates" page includes data input fields labeled "First Notice of Loss," "Date of Loss," "Shop Placement Date," "Date Insured Contacted," "Date Inspected," "Date Started," "Date Target Completion," "Date Completed," and "Date Closed." Each of these data input fields allows entry of a date and a time. Preferably, a pop-up calendar is provided for easy entry of the desired date. Adjacent to each date/time data input field are selection buttons labeled "Current Date" and "Delete." Selection of the "Current Date" button causes the current date and time to be entered into the date/time data input fields. Selection of the "Delete" button causes the date/time data input fields to be cleared.

The date and time for some of the data input fields on the "Claim Dates" page will be entered by the claims administrator during the call with the claimant. For example, the "First Notice of Loss" field allows entry of the date and time that the claims administrator receives and enters the claim data. The "Date of Loss" field allows entry of the date and time that the loss occurred, which is typically provided by the claimant and may be a "best estimate" as to the actual time and date that the loss occurred. The "Date Insured Contacted" field allows entry of the date and time that the claims administrator contacts (e.g., telephones) the claimant. In the case where the claimant's call is routed to the claims administrator, this field will reflect a date and time that is substantially the same as the "First Notice of Loss" date and time. In other cases, as will be described in greater detail below, the claims administrator may receive the first notice of loss through other means and then contact the claimant at a later date and time.

The date and time for other data input fields on the "Claim Dates" page will be entered at a later time by either the claims administrator or a contractor assigned to the claim (as discussed in greater detail below). For example, the "Shop Placement Date" field allows entry of the date and time that a contractor is dispatched to the insured property. The "Date Inspected" field allows entry of the date and time that the contractor arrives at the insured property. The "Date Started" field allows entry of the date and time that the contractor begins restoration services at the insured property. The "Date Completed" field allows entry of the date and time that the restoration of the damaged property is determined to be complete. The "Date Closed" field allows entry of the date and time that the claim is considered closed (based on the receipt of all required documentation from the insurance carrier, the contractor and the claimant, and the transmission of all required documentation to the insurance carrier, the contractor, and the claimant).

The "Claim Dates" page also includes three read-only fields titled "Target" next to the "Shop Placement Date" field, the "Date Insured Contacted" field, and the "Date Inspected" field. The dates and times in these "Target" fields are automatically calculated (as will be described below) and represent the desired dates and times by which the associated action should be completed. For example, the "Target" date and time for the "Shop Placement Date" field is calculated as thirty minutes from the date and time entered in the "First Notice of Loss" field. This target sets a goal of dispatching a contractor to the insured property (i.e., the "shop placement") within thirty minutes from receipt of the first notice of loss. The "Target" date and time for the "Date Insured Contacted" field is calculated as fifteen minutes from the date and time entered in the "First Notice of Loss" field. This target accounts for cases in which the first notice of loss is not received directly from the claimant (as will be described below). In those cases, the goal is to have the claims administrator contact the claimant within fifteen minutes of receipt of the first notice of loss. The "Target" date and time for the "Date Inspected" field is calculated as two hours from the date and time entered in the "Shop Placement Date" field. This sets a goal for the contractor to arrive at the insured property within two hours from the time of dispatch.

The "Claim Contact List" page (FIG. 8) displays a contact list of various parties involved in the claim process. In this embodiment, the contact list is automatically populated with data entered into the "Policyholder" and "Loss Address" fields of the "Claim Info" page (FIG. 5). The "Edit" and "Delete" buttons allow a user to edit or delete a party from the contact list. In addition, the "Add New Contact" button allows a user to enter additional parties to the contact list as desired.

As discussed above, the claims administrator may not receive the first notice of loss directly from the claimant. For example, the claimant may call a claims reporting telephone number provided by the insurance carrier whereby the call is routed to a call-answering service contracted by the insurance carrier. The routing of the call to the call-answering service may or may not be transparent to the claimant and, thus, the claimant may be aware that the first notice of loss is being received by someone other than the insurance carrier. A claims processor at the call-answering service collects initial claim information from the claimant and, in accordance with guidelines provided by the insurance carrier, assesses whether the claimed loss is covered by the claimant's insurance policy. If so, the claims processor at the call-answering service initiates a "warm transfer" of the call to the claims administrator (i.e., the claimant's call is forwarded to the claims administrator without the claimant having to hang-up and call back). The claims administrator then collects information from the claimant and enters the information into the appropriate web pages (as described above) to complete the first notice of loss.

As another example, a claimant may call the insurance carrier directly whereby the call is answered by a claims processor at the insurance carrier. The claims processor at the insurance carrier collects initial claim information from the claimant, and then calls the claims administrator and provides that information for entry into the web pages (as described above). Alternatively, the insurance carrier may provide the initial claim information to the claims administrator via e-mail or other type of communication system. As yet another example, the insurance carrier may connect to the claims administration web site 12 through the Internet and directly enter the initial claim information into the web pages (as described above).

As yet a further example, a claimant may call, e-mail, or otherwise notify the insurance carrier of a loss to the insured property. The insurance carrier then notifies the claims administrator of the claimed loss, and the claims administrator calls the claimant to collect and enter the initial claim information into the web pages (as described above). Finally, the insurance carrier may receive initial claim information from the claimant and enter the information into an insurance carrier database. The claims administrator then retrieves the information from the insurance carrier database, either directly or using a screen-scraper to collect the information from a computer screen, and transfers that information to the appropriate data input fields of the web pages (as described above).

Select Contractor

Referring to FIG. 3A, at block 112, the claims administrator selects a contractor to perform restoration services at the insured property. In the exemplary embodiment, with the claimant still on the telephone, the claims administrator navigates to the "Select Contractor" page (as shown on FIG. 10A), which displays a list of the top three contractors in the claims database server 28 who are available to provide restoration services within the zip code of the insured property, as entered on the "Claim Info" page (FIG. 5). To obtain the "top three" list, each of these contractors is evaluated in accordance with a plurality of weighted factors.

Some of these factors relate to the contractor's capabilities regardless of past performance, including: (1) the contractor's ability to provide certified technicians to perform the restoration services; (2) the contractor's ability to use preferred restoration equipment and measurement equipment; and (3) the experience level of the technicians performing the restoration services. Other factors relate to the past performance of the contractor in providing restoration services at other insured properties, including: (1) information received on the contractor from claimant surveys; (2) the average time to arrive at the insured property from the time of dispatch; (3) the availability of the contractor at the time of assignment; (4) the completeness of the contractor's daily documentation (e.g., temperature readings, humidity readings, moisture content readings, etc.); (5) the timeliness of the contractor's submission of documentation; (6) the average time to bill after completion of the restoration services; (7) the average number of days to complete the restoration services; and (8) the average total expense of past invoices. Of course, one skilled in the art will appreciate that other factors could also be considered in accordance with the invention. Based on this evaluation, the contractors are ranked and the top three contractors are listed on the "Select Contractor" page.

Next, the claims administrator contacts the first-listed contractor to determine whether the contractor is able to perform the restoration services. If the first-listed contractor cannot be reached or is not able to perform the restoration services, the claims administrator contacts the second-listed contractor and then the third-listed contractor until a contractor is reached who agrees to perform the restoration services. If none of the listed contractors can be reached or agree to perform the restoration services, the claims administrator selects the "More" button whereby additional contractors are displayed on the "Select Contractor" page. When a contractor is reached who agrees to perform the restoration services, the claims administrator selects the "Select" button for that contractor whereby the selected contractor is associated with that particular claim in the claims database server 28.

Alternatively, if the claimant has a preferred contractor, the claims administrator may select that particular contractor to perform the restoration services (or enter information on that particular contractor into the claims database server 28 if not yet entered). Likewise, an insurance carrier may have its own network of contractors or may provide the claims administrator with a list of preferred contractors. In that case, the claims administrator may select a contractor from that insurance carrier's list for assignment to the claim.

Upon selection of a contractor, contact information for the contractor is retrieved from the claims database server 28 and populated into the "Select Contractor" page (as shown on FIG. 10B) and the "Contractor Contacts" page (FIG. 11). The "Select Contractor" page is also populated with a history of the selection of the contractor. The "Contractor Contacts" page also includes an "Add" button that allows a user to add additional contact information for the selected contractor whereby the added contact information will be stored in the claims database server 28.

Dispatch Contractor

Referring to FIG. 3A, at block 114, the claims administrator dispatches the selected contractor to the insured property. In the exemplary embodiment, with the claimant still on the telephone, the claims administrator establishes a three-way telephone conference between the claims administrator, the claimant and the contractor. The claimant and the contractor, facilitated by the claims administrator, exchange further information about the origin of loss and the damage to the insured property. Based on the additional information received during this three-way telephone conference, the claims administrator may enter additional information into the "Claim Info" page (FIG. 5) and/or the "Claim Details" page (FIG. 6). Preferably, the claimant and the contractor also reach an agreement as to when the contractor will arrive at the insured property. Most preferably, the contractor agrees to arrive at the insured property within two hours. While still on the phone with the claimant, the claims administrator preferably provides the claimant with a telephone number and contractor arrival code that may be used by the claimant to report the contractor's arrival at the insured property. Upon dispatching the contractor to the insured property, the claims administrator navigates to the "Claim Dates" page (FIG. 7) and enters the date and time that the contractor was dispatched to the insured property in the "Shop Placement Date" field.

As described above, in some cases the claims administrator may not receive the first notice of loss directly from the claimant. In those cases, upon receiving the first notice of loss, the claims administrator preferably calls the claimant and proceeds to select and dispatch a contractor to the insured property (as described above). If the claimant cannot be reached, the claims administrator will preferably select and dispatch a contractor to the insured property in order to mitigate damage to the insured property.

Monitoring Contractor's Arrival at Insured Property

Referring to FIG. 3A, at blocks 116 and 118, the contractor's arrival at the insured property is monitored so that one or more automated reminder messages may be transmitted to the contractor if the contractor has not reported his arrival at the insured property in a specified period of time from either receipt of the notice of loss (block 110) or dispatch of the contractor to the insured property (block 114). Each reminder message is preferably a textual or audio alert notifying the contractor of an obligation to arrive at the insured property and/or complete a description of damage to the insured property. These reminder messages may comprise either a voice message or a text message transmitted to the contractor's telephone, an e-mail or instant message transmitted to the contractor's computer or handheld communication device (e.g., PDA), or a combination of any of the foregoing. One skilled in the art will appreciate the importance of monitoring a contractor's arrival at the insured property to verify that the contractor has arrived and begun the process of mitigating damage to the insured property in a timely manner.

In the exemplary embodiment, when the contractor arrives at the insured property, he calls the claims administrator and reports his date and time of arrival. The claims administrator then enters the reported date and time of arrival into the "Date Inspected" field on the "Claim Dates" page (FIG. 7). Alternatively, the contractor may directly access the "Claim Dates" page using a handheld communication device (e.g., PDA) or laptop computer and then directly enter his arrival date and time into the "Date Inspected" field. Preferably, the claimant also verifies the contractor's date and time of arrival by calling the telephone number provided by the claims administrator at the time of reporting the first notice of loss and entering the provided contractor arrival code via a telephone keypad. Upon receipt of the contractor arrival code, a date and time-stamped message is stored in the claims database server 28 indicating that the claimant has reported the contractor's arrival at the insured property. This date and time-stamped message may be used to verify the date and time of arrival reported by the contractor.

As discussed above, the "Claim Dates" page (FIG. 7) includes a "Shop Placement Date" field that indicates the date and time that the contractor was dispatched to the insured property. When the claims administrator enters a date and time into this data input field, it triggers the monitoring of the "Date Inspected" field (which represents the date and time that the contractor arrives at the insured property). By monitoring the "Date Inspected" field, it can be determined whether the contractor has reported his arrival at the insured property. If no date and time has been entered into the "Date Inspected" field within a specified period of time from the "Shop Placement Date" date and time, the application server retrieves a desired textual script from the claims database server 28 (which stores a plurality of textual scripts) and generates a .wav file based on the textual script. An example of a textual script for this situation is provided below:

[Contractor's name of business]—This is a CodeBlue Alert! Your initial Job Scope for [claim #] for [claimant's name] at [claimant's address] has not been uploaded to the CodeBlue website or called into the CodeBlue Command Center. Please have the lead technician on this claim call CodeBlue as soon as possible with this information. If you need assistance from the CodeBlue Support Team, call 715-555-5555. Thank you in advance for your prompt response to this notification!

It should be understood that the information in brackets is replaced by the relevant data stored in the claims database server 28. Of course, the textual script could simply state that the contractor must immediately report to the insured property to begin mitigation services. The application server then transmits the contractor's telephone number and the .wav file to the notification server 32, which automatically dials the telephone number through an interface with the public telephone network and plays the .wav file so as to transmit a voice message to the contractor (as described above).

In this embodiment, the voice message is transmitted to the contractor if no date and time has been entered into the "Date Inspected" field within 2½ hours from the "Shop Placement Date" date and time. This 2½ hour period of time provides sufficient time for the contractor to arrive at the insured property within the goal of two hours from the time of dispatch. Of course, it should be understood that other periods of time could also be used in accordance with the invention (e.g., any period of time between 1 hour and 5 hours). Optionally, additional voice message could be transmitted to the contractor wherein each subsequent voice message provides escalating urgency to the contractor. Preferably, if the period of time exceeds a maximum limit, the claims administrator is notified by e-mail or another communication means so that the claims administrator may either contact the contractor directly to inquire as to the contractor's arrival at the insured property or select and dispatch another contractor to the insured property.

Perform Initial Mitigation Services

Referring to FIG. 3A, at block 120, upon arrival at the insured property, the contractor immediately takes steps to mitigate further damage to the insured property. The initial mitigation steps may include determining the origin of loss and repairing any damage relating to the origin of loss. For example, if the origin of loss is a burst water pipe, the contractor will shut off the water to the pipe and may replace or repair the pipe if water service is immediately required. The initial mitigations steps may also include removal of standing water from the insured property using appropriate water removal equipment, as is known in the art. The initial mitigation steps taken by the contractor will, of course, vary depending upon the type of loss and the damage incurred at the insured property.

Obtain Documentation of Damage to Insured Property

Referring to FIG. 3A, at block 122, the contractor proceeds to obtain documentation on the damage to the insured property. In the exemplary embodiment, the contractor prepares a drawing or sketch of the floor plan of the insured property. The contractor also documents the damage to the insured property, such as by taking digital photographs of the origin of loss and of each affected room of the damaged property before any demolition occurs. Preferably, the contractor also has the capability to take thermal imaging photographs showing the relative moisture content in various damaged structural materials. The contractor may also take a digital photograph of the exterior of the structure. The contractor then uploads these documents and photographs to the claims administration web site 12 by accessing the "Flooring Diagrams" page (FIG. 18) and the "Photos & Docs" page (FIG. 19).

The "Flooring Diagrams" page includes data input fields titled "Add picture/doc" and "Description," as well as selection buttons labeled "Browse . . . " and "Add." Using a computer or handheld communication device (e.g., PDA), the contractor enters the filename of an electronic version (.pdf, .jpeg, .tif, etc.) of the floor plan document in the "Add picture/doc" field, either by using the "Browse . . . " button to browse the directories on his computer or handheld communication device (e.g., PDA) or by directly entering the filename in the "Add picture/doc" field. The contractor then enters a description of the floor plan document in the "Description" field. Then, the contractor selects the "Add" button to upload the file from the contractor's computer or handheld communication device (e.g., PDA) to the photos/documents database server 30. The "Flooring Diagrams" page is then automatically populated with a list of the floor plan document and any other flooring diagrams stored in the photos/documents database server 30. Each line of the list includes "Edit" and "Delete" buttons to enable a user to revise or delete information on that particular line.

The "Photos & Docs" page includes data input fields titled "File Type," "Description," and "File," as well as selection buttons labeled "Browse . . . " and "Add." Under the title "File can be viewed by:," are three checkboxes labeled "Contractor," "Client," and "Policyholder." The drop-down menu for the "File Type" field is pre-populated with the options "Certification Document," "Certification of Satisfaction." "Email Attachment," "Excel Document," "Insurance Document," "PDF Document," "Photo," "Policyholder signature," "Price List," "Psychrometric Document," "State Required License," "Subrogation," "Uploaded from JPP," "Word Document," and "Work Authorization."

To upload each of the digital photographs and/or thermal imaging photographs discussed above, the contractor selects "Photo" from the drop-down menu of the "File Type" field and enters a description of the photograph in the "Description" field. The contractor then enters the filename of the photograph in the "File" field, either by using the "Browse . . . " button to browse the directories on his computer or handheld communication device (e.g., PDA) or by directly entering the filename in the "File" field. Then, the contractor selects the "Add" button to upload the file from the contractor's computer or handheld communication device (e.g., PDA) to the photos/documents database server 30. The "Photos & Docs" page is then automatically populated with a list of the uploaded photograph and any other photographs and documents stored in the photos/documents database server 30. Each line of the list includes "Edit" and "Delete" buttons to enable a user to revise or delete information on that particular line. The "File can be viewed by:" checkboxes may be used by the claims administrator to permit or restrict access to various photographs and documents for the contractor, the insurance carrier, and the claimant.

Preferably, the contractor accesses the "Flooring Diagrams" page and the "Photos & Docs" page and uploads the documents and photographs to the claims administration web site 12 while the contractor is at the insured property. To do so, the contractor may use a handheld communication device (e.g., PDA) or a laptop computer having Internet access capabilities. Alternatively, in cases where the contractor does not have these capabilities, the contractor may upload the documents and photographs using a computer located at the contractor's shop.

It should be understood that the various photographs and documents displayed on the "Flooring Diagrams" page and the "Photos & Docs" page may be viewed by the insurance carrier and/or claims administrator in order to verify the origin of loss and assess the extent of damage to the insured property. With this information, the insurance carrier and/or claims administrator is able to determine whether the claimant's insurance policy covers the type of loss shown in the photographs and documents. Advantageously, this determination may be made simply by accessing the claims administration web site 12 and does not require that the insurance carrier and/or claims administrator be physically present at the insured property.

Collect Drying Chamber Data

Referring to FIG. 3A, at block 124, the contractor begins the restoration process by establishing one or more drying chambers within the insured property. A drying chamber is an area defined by the contractor that contains damaged property (i.e., damaged structural materials and/or contents). A drying chamber may be an entire level of a structure (such as a basement) or may be a portion of a level of a structure (such as a kitchen, bathroom, and family room located on the main floor of a structure). The drying chamber may be defined and enclosed by the structure itself (such as the walls, floor, and ceiling of a basement) or may be defined and enclosed through the use of temporary walls placed by the contractor to separate damaged property from undamaged property or to divide a large area into smaller drying chambers. Typically, the temporary walls are plastic sheeting attached to the existing structure in such a manner as to define and enclose the drying chamber.

Upon establishing the drying chambers, the contractor determines the category of water loss for the insured property and the class of water loss for each of the drying chambers within the insured property. The category and class of a water loss are preferably determined in accordance with the ANSI/IICRC S500-2006 standard, wherein the category indicates the type of water (i.e., category 1—clean water; category 2—contaminated water; category 3—grossly contaminated water) and the class indicates the amount of water (i.e., class 1—least amount of water, materials have absorbed little moisture; class 2—large amount of water, wet carpet, water wicked into walls less than 24 inches; class 3—greatest amount of water, water wicked into walls more than 24 inches from overhead ceiling; class 4—specialty drying situations, wet materials with low permeance/porosity).

Next, the contractor records dimension data associated with each of the drying chambers. Preferably, the dimension data comprises a width measurement, a length measurement, a height measurement, and a linear feet of wall measurement for each room within the drying chamber. Of course, if the drying chamber comprises an entire level of a structure (such as a basement), the level itself is a room such that the contractor will record a width measurement, a length measurement, a height measurement, and linear feet of wall measurement for the entire level.

In the exemplary embodiment, the contractor accesses the claims administration web site 12 and navigates to the "Room Dimensions" page (FIG. 13). In the "Category" field, the contractor selects the category of water loss (1, 2, or 3) for the insured property from the drop-down menu. The contractor also enters the date and time that the damage occurred at the insured property in the "Date Affected" and "Time Affected" fields (such as by using the pop-up calendar and drop-down menu provided adjacent these fields). Next, the contractor enters the date and time that he began to provide restoration services at the insured property in the "Date Started" and "Time Started" fields (such as by using the pop-up calendar and drop-down menu provided adjacent these fields).

The contractor then proceeds to enter data in the "Room Dimensions" section of the "Room Dimensions" page on a room-by-room basis. For each room, the contractor enters the name of the drying chamber in the "Drying Chamber" field. For example, a drying chamber may be defined as "main floor" or "basement." In the "Class" field, the contractor selects the class of water loss (1, 2, 3, 4) for the drying chamber from the drop-down menu. Next, the contractor enters the name of the room in the "Room" field, and enters the dimension data for that room in the "Width," "Length," "Height," and "Linear Feet Wall" fields. The data in the "One air mover every _ linear feet" field may be entered by the contractor or may be automatically calculated based on the class of water loss for that room. For example, for a class 1, 2, 3, and 4 water loss, the air movers are preferably spaced every 16 linear feet, 14 linear feet, 12 linear feet and 14 linear feet, respectively. With the room data entered, the contractor selects the "Add" button whereby the room data will be stored in the claims database server 28. It should be understood that the contractor then repeats the entry of room data for every room within every drying chamber.

The data in the "Total Linear Feet," "Total Square Feet," and "Total Cubic Feet" fields are automatically calculated based on the dimension data of all of the rooms within all of the drying chambers. The table at the bottom of the page is automatically populated with a list of all of the data stored in the claim database server 28 for every room within every drying chamber, along with automatically calculated linear wall feet, square feet, and cubic feet data for each room. The table includes "Edit" and "Delete" buttons for each room on the list to enable a user to revise or delete the data for any of the rooms.

Preferably, the contractor accesses the claims administration web site 12 and enters all of the data on the "Room Dimensions" page while the contractor is at the insured property. To do so, the contractor may use a handheld communication device (e.g., PDA) or a laptop computer having Internet access capabilities. Alternatively, in cases where the contractor does not have these capabilities, the contractor may record the data using other means and then enter the data on the "Room Dimensions" page at a later time (e.g., when the contractor returns to his shop). As another alternative, the contractor may provide the data via telephone or email to the claims administrator who then enters the data on the "Room Dimensions" page.

Collect Initial Psychrometric Data

Referring to FIG. 3A, at block 126, the contractor continues the restoration process by collecting initial psychrometric data. Preferably, the initial psychrometric data comprises temperature and relative humidity readings taken at various inspection locations both inside and outside the insured property. It will be seen that the contractor will also collect daily psychrometric data to enable the claims administrator and/or insurance carrier to monitor the progress of the restoration of the damaged property.

In the exemplary embodiment, the contractor accesses the claims administration web site 12 and navigates to the "Daily Humidity" page (FIGS. 16A-16D). As can be seen on FIG. 16A, this page includes a "Drying Chamber" field with a drop-down menu populated with the drying chambers that were defined and entered by the contractor on the "Room Dimensions" page (FIG. 13). The page also includes data input fields titled "Inspection Date," "Inspection Time," "Inspection Location," "Temperature," and "Relative Humidity (%)." The "Inspection Location" field includes a drop-down menu populated with an identifier for each dehumidifier selected by the contractor on the "Equipment Validation" page (FIG. 14), along with selections for "HVAC," "Inside (Wet)," "Outside," and "Unaffected Area." The page also includes two read-only fields titled "GPP" and "GD," as well as corresponding selection buttons titled "Calculate GPP" and "Add." The page also includes a list of inspection data for a particular drying chamber, as shown on the bottom of FIG. 16A.

Using a thermometer and a relative humidity meter (such as a hygrometer or psychrometer), the contractor collects temperature and relative humidity readings near every dehumidifier placed within a drying chamber. Preferably, the contractor takes the temperature and relative humidity readings near the exhaust port of each dehumidifier. In addition, the contractor collects temperature and relative humidity readings from the Heating Ventilation and Air Conditioning (HVAC) equipment located at the insured property, if any. For example, residential and commercial properties often include central heating and air conditioning systems, in which case the contractor can measure temperature and relative humidity at the return air inlet. The contractor also collects temperature and relative humidity readings from inside an affected area (i.e., wet or damaged) of the insured property, from inside an unaffected area (i.e., not damaged) of the insured property, and from an area outside the insured property (i.e., outdoors). Preferably, the contractor will take digital photographs showing the various temperature and relative humidity readings on the thermometer and relative humidity meter, respectively, for inclusion in the claim file. Most preferably, the contractor uploads these photographs to the claims administration web site 12 by accessing the "Photos & Docs" page (FIG. 19) (as described above).

As shown on FIG. 16A, the contractor first selects a drying chamber using the drop-down menu of the "Drying Chamber" field. The contractor also enters the date and time of collecting the temperature and relative humidity readings into the "Inspection Date" and "Inspection Time" fields (such as by using the pop-up calendar and drop-down menu provided adjacent these fields). Next, using the drop-down menu of the "Inspection Location" field, the contractor selects an inspection location and enters the temperature and relative humidity readings collected at that inspection location in the "Temperature" and "Relative Humidity (%)" fields.

The contractor then selects the "Calculate GPP" button whereby the specific humidity for that inspection location is automatically calculated based on the temperature and relative humidity readings for that inspection location (using standard psychrometric formulas known in the art). The calculated specific humidity is then displayed in units of grains of water per pound of air (GPP) in the "GPP" field. Alternatively, the contractor could collect specific humidity readings (rather than temperature and relative humidity readings) using specific humidity meters known in the art, in which case the specific humidity calculation would not be required.

Upon selection of the "Calculate GPP" button, the grain depression for each dehumidifier and HVAC system is automatically calculated based on the difference between the specific humidity of the ambient air and the specific humidity of the air exiting the dehumidifier or HVAC system (using standard psychrometric formulas known in the art). The calculated grain depression is then displayed in the "GD" field. Next, the contractor selects the "Add" button whereby all of the entered inspection data is stored in the claims database server 28. The list of inspection data (as shown on the bottom of FIG. 16A) is then automatically populated with all the inspection data stored in the claims database server 28 for the selected drying chamber (which is preferably arranged chronologically and by inspection location). It can be seen that the list of inspection data includes "Edit" and "Delete" buttons for each line of inspection data to enable a user to edit or delete the inspection data on that line. It should be understood that the contractor performs the above-described process for every drying chamber.

Preferably, the contractor accesses the claims administration web site 12 and enters the inspection data on the "Daily Humidity" page while the contractor is at the insured property. To do so, the contractor may use a handheld communication device (e.g., PDA) or a laptop computer having Internet access capabilities. Alternatively, in cases where the contractor does not have these capabilities, the contractor may enter the inspection data on the "Daily Humidity" page using a computer located at the contractor's shop. As another alternative, the contractor may call the claims administrator while at the insured property whereby the claims administrator enters the inspection data on the "Daily Humidity" page based on input from the contractor.

Figure 16B:
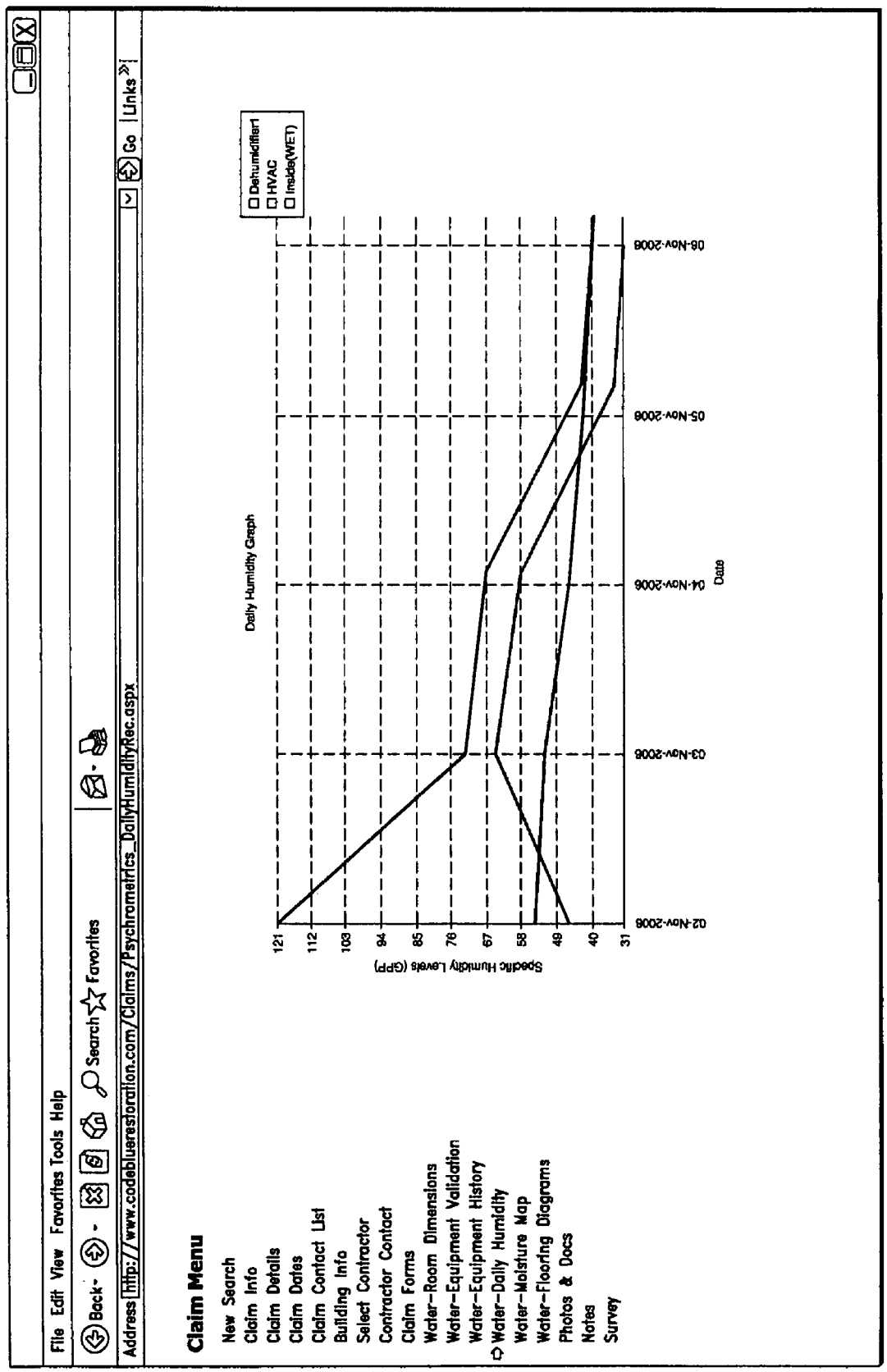
Figure 16C:
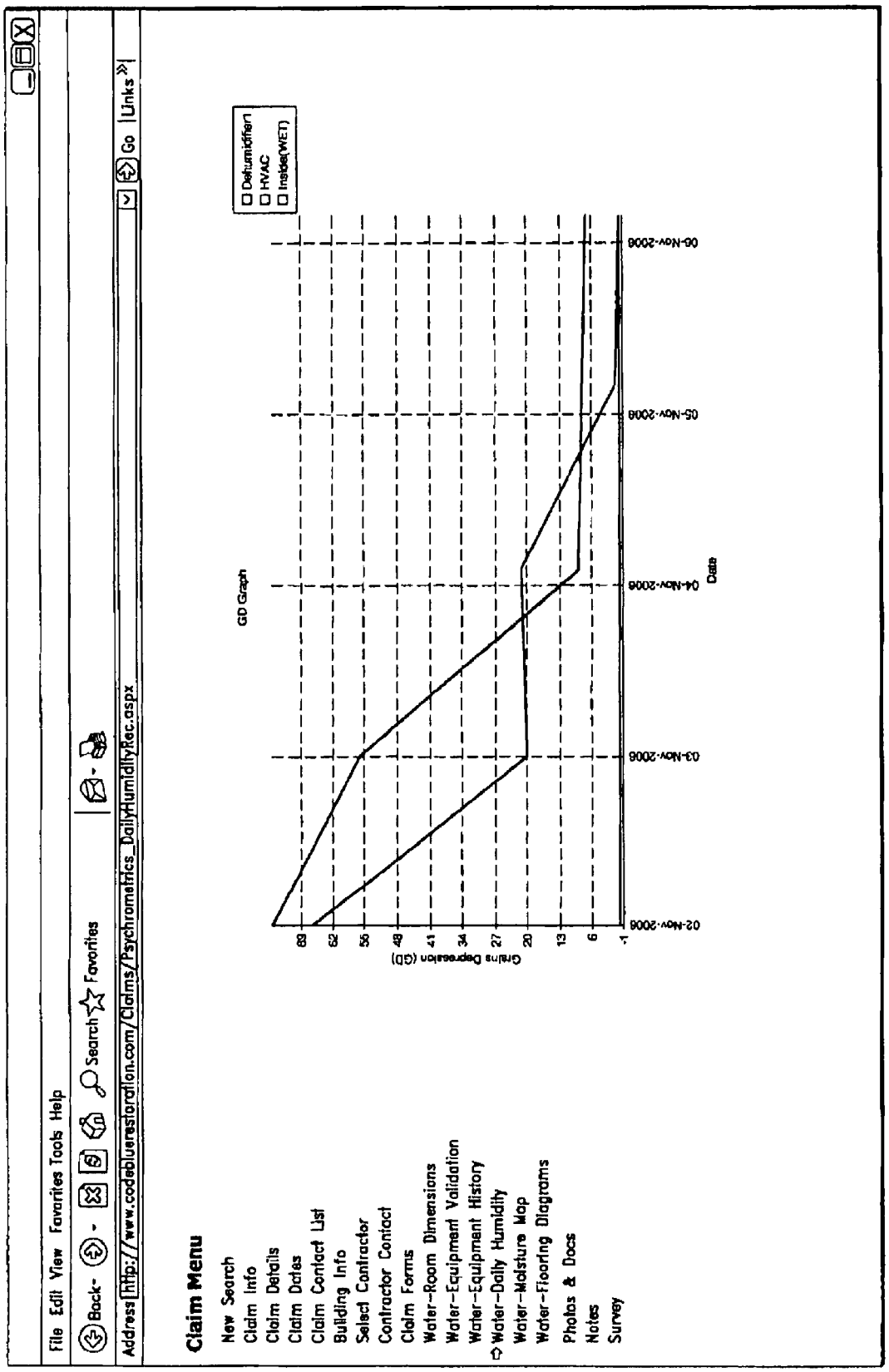
Figure 16D:
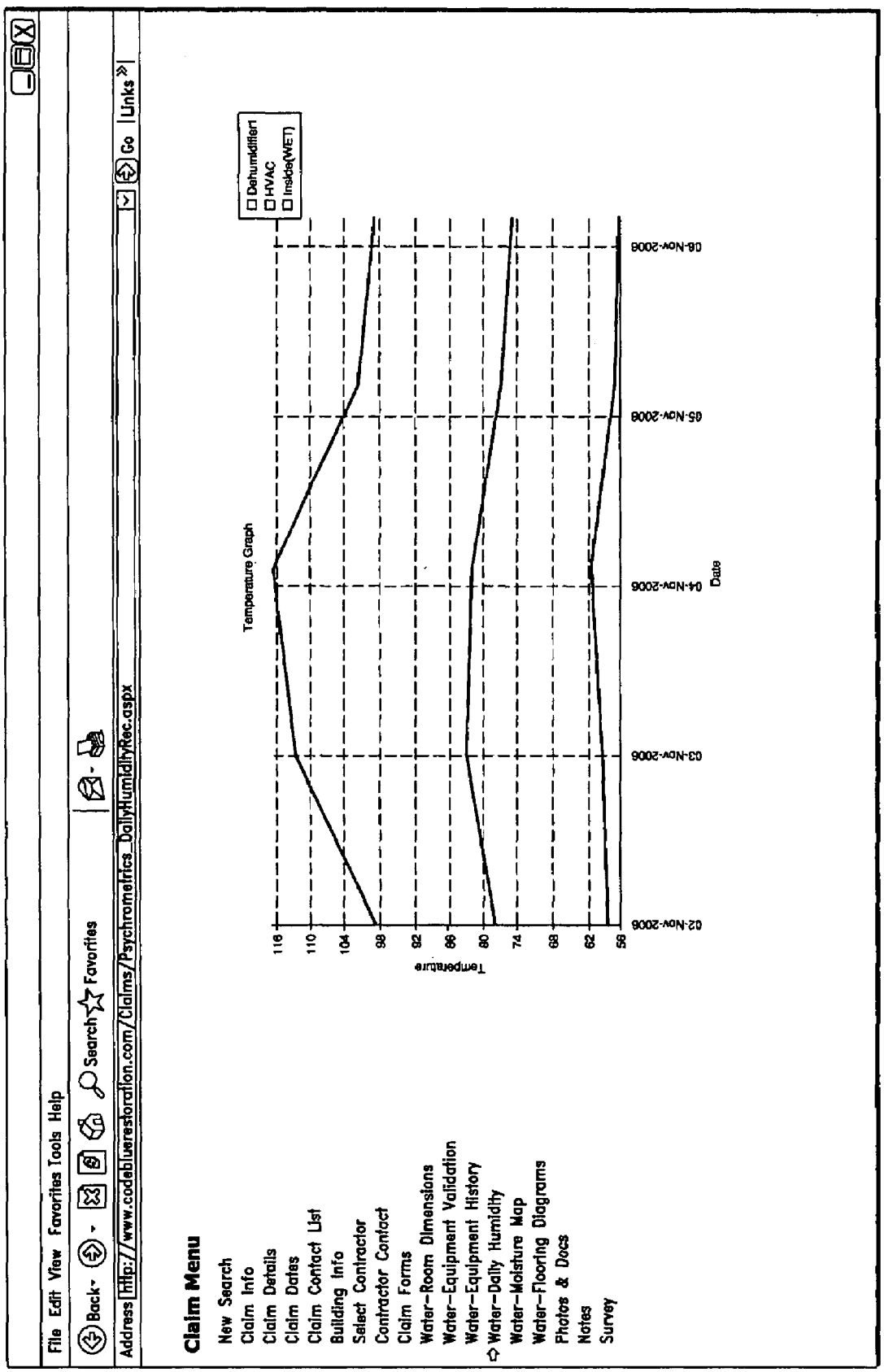

Finally, as shown on FIGS. 16B-16D, the "Daily Humidity" page includes a "Daily Humidity Graph," a "GD Graph," and a "Temperature Graph" that plot the specific humidity, grain depression and temperature data in relation to the inspection dates for various inspection locations. These graphs are automatically generated from the list of inspection data shown on the bottom of FIG. 16A. As will be described in greater detail below, these graphs may be analyzed by the contractor, the claims administrator and/or the insurance carrier to determine whether a drying chamber presents an acceptable drying environment, to assess the functionality of the restoration equipment, or to assess the living conditions within the insured property.

Collect Initial Moisture Content Data and Determine Target Values

Referring to FIG. 3A, at block 128, the contractor continues the restoration process by collecting initial moisture content data. Preferably, the initial moisture content data comprises moisture content readings from various damaged structural materials within the affected rooms of the insured property. It will be seen that the contractor will also collect daily moisture content data for comparison against target values for the moisture content readings. As such, the contractor (as well as the claims administrator and/or the insurance carrier) will be able to determine when the damaged structural materials have been restored to a pre-loss condition.

In the exemplary embodiment, the contractor accesses the claims administration web site 12 and navigates to the "Moisture Map" page (FIG. 17). This page includes data input fields for "Inspection Date," "Room," "Affected Location," "Affected Type," "Reading," and "Target." The "Room" field includes a drop-down menu populated with the names of the rooms that were defined and entered by the contractor on the "Room Dimensions" page (FIG. 13). The "Affected Location" field includes a drop-down menu pre-populated with the options "Subfloor," "Wall1," "Wall2," "Wall3," "Wall 4," "Wall1 Sill," "Wall2 Sill," "Wall3 Sill," "Wall4 Sill," "Flooring," "Floor Joist," "Rafter," "Wall Stud," "Header," "Insulation," "Ceiling," "Baseboard," and "Stairs." The "Affected Type" field includes a drop-down menu pre-populated with the options "Carpet," "Ceramic Tile," "Concrete," "Conventional Wood Framing," "Drywall," "Engineered Wood Plank," "Laminated Flooring," "Metal Framing," "Oriented Strand Board," "Paneling," "Particle Board," "Plaster," "Plywood," "Real Wood Plank," "Vinyl Composition Tile," and "Vinyl Flooring." This page also includes selection buttons labeled "Add" and "Preloss Conditions Certificate." At the bottom of the page is a list of moisture content data for all of the damaged structural materials within all of the affected rooms of the insured property.

Using a moisture meter (e.g., a penetrating meter or a non-penetrating meter), the contractor collects moisture content readings for all of the damaged structural materials within all of the affected rooms of the insured property. For any given room, these structural materials may comprise all or a subset of the options listed in the drop-down menu for the "Affected Location" field. In addition, the contractor will note the type of material for each of the damaged structural materials, which preferably comprises one of the options listed in the drop-down menu for the "Affected Type" field. Preferably, the contractor will take digital photographs showing the various moisture content readings on the moisture meter for inclusion in the claim file. Most preferably, the contractor uploads these photographs to the claims administration web site 12 by accessing the "Photos & Docs" page (FIG. 19) (as described above).

On the "Moisture Map" page (FIG. 17), the contractor enters the date that the moisture content data was collected in the "Inspection Date" field (such as by using the pop-up calendar provided adjacent this field). Then, for each of the moisture content readings collected in the affected rooms of the insured property, the contractor selects the appropriate room, location and material type from the drop-down menus of the "Room," "Affected Location" and "Affected Type" fields, respectively, and enters the moisture content reading in the "Reading" field. In this embodiment, the contractor also enters a desired target value for the moisture content reading in the "Target" field, which will vary depending on the type of moisture meter used to collect the moisture content readings. Alternatively, the "Target" field could be automatically populated with a predetermined target value based on the material type selected in the "Affected Type" field.

Next, the contractor selects the "Add" button whereby all of the entered moisture content data is stored in the claims database server 28. The list of moisture content data at the bottom of the page is then automatically populated with all the moisture content data stored in the claims database server 28 for the particular claim (which is preferably arranged chronologically by room and affected location). It can be seen that the list of moisture content data includes "Edit" and "Delete" buttons for each line of moisture content data to enable a user to edit or delete the moisture content data on that line.

Preferably, the contractor accesses the claims administration web site 12 and enters the moisture content data on the "Moisture Map" page while the contractor is at the insured property. To do so, the contractor may use a handheld communication device (e.g., PDA) or a laptop computer having Internet access capabilities. Alternatively, in cases where the contractor does not have these capabilities, the contractor may enter the moisture content data on the "Moisture Map" page using a computer located at the contractor's shop. As another alternative, the contractor may call the claims administrator while at the insured property whereby the claims administrator enters the moisture content data on the "Moisture Map" page based on input from the contractor.

Obtain Work Authorization

Referring to FIG. 3A, at block 130, the contractor obtains proper work authorization from the claimant with respect to the restoration and/or reconstruction of the damaged property (wherein the amount of restoration vs. reconstruction will depend on the category of water loss and the type of materials affected by the water loss). In the exemplary embodiment, the contractor obtains a "form" work authorization agreement from the "Claim Forms" page (FIG. 12), which provides a variety of different forms commonly used by the claims administrator, the contractors, and the insurance carriers in the course of processing and monitoring insurance claims.

The "Claim Forms" page includes data input fields titled "Email To:" and "Form Type," as well as a selection button labeled "Print," "Email" and "Preview." The drop-down menu of the "Form Type" field presents a pre-populated menu of forms, including an "Emergency Services Work Authorization Agreement," a "Certification of Completion and Satisfaction of Emergency Services," a "Certificate of Completion and Satisfaction of Reconstruction Services," a "Certificate of Returned to Pre-Loss Moisture Content Conditions," an "Emergency Services Cover letter," a "Reconstruction Estimate Cover Letter," a "Reconstruction Invoice Cover Letter," a "Survey," and a "Thank You Letter." Upon selection of one of these forms, a user can either print the form by selecting the "Print" button, e-mail the form by entering an e-mail address into the "Email To:" field and selecting the "Email button, or preview the form by selecting the "Preview" button.

In this case, the contractor selects the "Emergency Services Work Authorization Agreement" form from the drop-down menu and then selects the "Print" button to print the form. Preferably, the contractor is able to print the form on-site via either a handheld communication device (e.g., PDA) or a laptop computer connected to a printer. Alternatively, the contractor may print the form at the contractor's office prior to arrival at the insured property. Regardless of when the contractor prints the form, the claimant then signs and dates the "Emergency Services Work Authorization Agreement" form to thereby authorize restoration and/or reconstruction of the damaged property. Finally, the contractor uploads the signed "Emergency Services Work Authorization Agreement" to the claims administration web site 12 by accessing the "Photos & Docs" page (FIG. 19) (as will be described below).

Select and Place Restoration Equipment Within Insured Property

Referring to FIG. 3A, at block 132, the contractor now selects and places the appropriate type and quantity of restoration equipment in each drying chamber that will meet the restoration requirements for that drying chamber. Typically, the restoration requirements for a drying chamber comprise air movement requirements (e.g., a total number of air movers required for each room within the drying chamber, or, the CFM requirements for each room within the drying chamber) and dehumidification requirements (e.g., a total volume of water to be removed from the drying chamber in a specified period of time).

Figure 14:
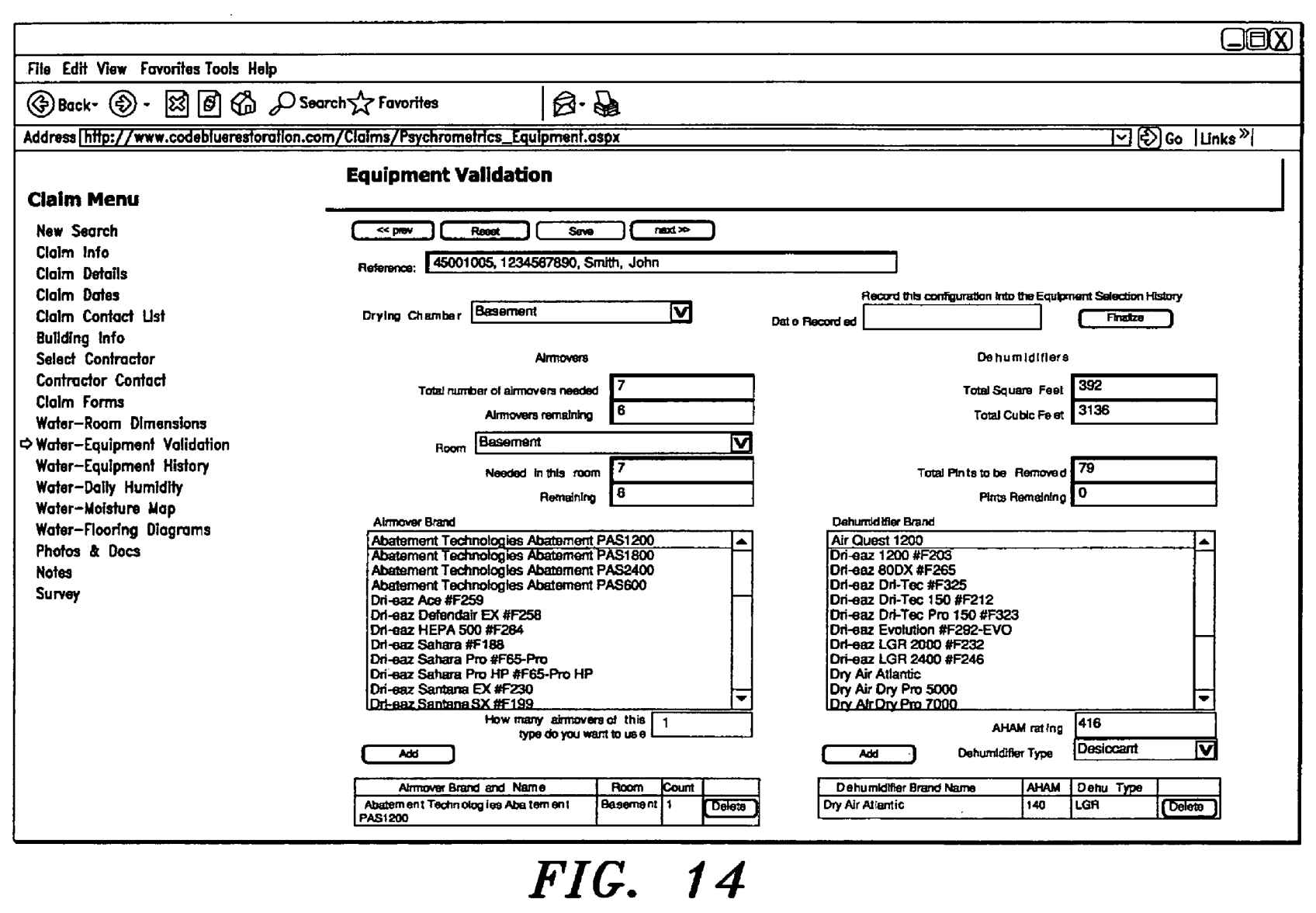

In the exemplary embodiment, the contractor accesses the claims administration web site 12 and navigates to the "Equipment Validation" page (FIG. 14). This page includes a "Drying Chamber" field with a drop-down menu populated with the drying chambers that were defined and entered by the contractor on the "Room Dimensions" page (FIG. 13). The page also includes two columns titled "Air movers" and "Dehumidifiers."

As can be seen, the "Air movers" column includes a "Total number of air movers needed" read-only field and an "Air movers remaining" read-only field, followed by a "Room" field with a drop-down menu populated with the names of the rooms defined for the selected "Drying Chamber," followed by a "Needed in this room" read-only field and a "Remaining" read-only field. Beneath these fields is a selection list titled "Air mover Brand," which includes a listing of commercially-available air movers identified by brand name and model number. The selection list of the exemplary embodiment includes the following air mover options: Abatement Technologies Abatement PAS600, Abatement Technologies Abatement PAS1200, Abatement Technologies Abatement PAS1800, Abatement Technologies Abatement PAS2400, Dri-eaz Ace #F259, Dri-eaz Sahara #F188, Dri-eaz Sahara Pro #F65-Pro, Dri-eaz Sahara Pro HP #F65-Pro HP, Dri-eaz Santana SX #F199, Dri-eaz Santana EX #F230, Dry Air Gale Force, Dry Air Force 9, Dry Air Clean Force, Dry Air Max Force, Dry Air Tempest, Dry Air Typhoon, Dry Air Twister, EuroClean ML2500, Phoenix Focus, Powerflite PD500, Powerflite F5 Powr Dryer, Powerflite Powr Dryer 350, Powerflite Powr Dryer 500, Powerflite Powr Dryer 750, Powerflite Powr Dryer 750DX. Pullman-Holt F500, Dri-eaz Defendair EX #F258, Dri-eaz HEPA 500 #F284, Injectidry Panel System, Phoenix Guardian Hepa, and Phoenix Mini Guardian Hepa. Beneath the "Air mover Brand" selection list is a table of air movers that have been already selected by the contractor. Of course, this table will initially be blank.

Using the drop-down menu of the "Drying Chamber" field, the contractor selects a drying chamber whereby the total number of air movers needed for that drying chamber are automatically calculated and displayed in the "Total number of air movers needed" field, as well as the "Air movers remaining" field. The contractor then uses the drop-down menu of the "Room" field to select a specific room within the selected drying chamber whereby the number of air movers needed for that room are automatically calculated and displayed in the "Needed in this room" field, as well as the "Remaining" field. Preferably, the total number of air movers needed for the drying chamber and the number of air movers needed for the selected room are calculated in accordance with the ANSI/IICRC S500-2006 standard, as is known in the art. Alternatively, one skilled in the art will appreciate that the air movement requirements may be based on the total CFM requirement for the drying chamber and the CFM requirement for the selected room (rather than the number of needed air movers as described).

Next, the contractor selects an air mover that the contractor has available for placement from the "Air mover Brand" list, enters the quantity in the "How many air movers of this type do you want to use" field, and then selects the "Add" button whereby the "Air movers remaining" and "Remaining" fields decrement by the selected quantity. Selection of the "Add" button also causes the selected air mover data to be stored in the claims database server 28. The table of air movers at the bottom of the "Air movers" column is then automatically populated with all the air movers stored in the claims database server 28 for the selected room. It can be seen that the table includes a "Delete" button for each selected air mover to enable a user to delete the air mover from the list. The contractor then repeats the air mover selection process for the selected room until the "Remaining" field reads zero. It should be understood that the contractor performs the above-described process for every room of every drying chamber.

The "Dehumidifiers" column includes a "Total Square Feet" read-only field and a "Total Cubic Feet" read-only field, followed by a "Total Pints to be Removed" read-only field and a "Pints Remaining" read-only field. Beneath these fields is a selection list titled "Dehumidifier Brand," which includes a listing of commercially-available dehumidifiers identified by brand name and model number. The selection list of the exemplary embodiment includes the following dehumidifier options: Air Quest 1200, Dry Air Atlantic, Dry Air Dry Pro 5000, Dry Air Dry Pro 7000, Dri-eaz 1200 #F203, Dri-eaz 80DX #F265, Dri-eaz Evolution #F292-EVO, Dri-eaz LGR 2000 #F232, Dri-eaz LGR 2400 #F246, Dri-eaz Dri-Tec 150 #F212, Dri-eaz Dri-Tec Pro 150 #F323, Dri-eaz Dri-Tec #F325, EBAC Orion 10270GR, EBAC Triton 11393GR, Phoenix 200 Max, Phoenix 300, Trailer Mounted Desiccant, Hydro-X, Vac-Pac, Water Claw, Flood Pro, Tes, Water Out, and Dry Pro. Beneath the "Dehumidifier Brand" selection list is a table of dehumidifiers that have been already selected by the contractor. Of course, this table will initially be blank.

Using the drop-down menu of the "Drying Chamber" field, the contractor selects a drying chamber whereby the total square feet and total cubic feet for that drying chamber are automatically calculated and displayed in the "Total Square Feet" and "Total Cubic Feet" fields, respectively, based on the dimension data entered into the various fields of the "Room Dimension" page (FIG. 13). In addition, the total pints of water to be removed from the drying chamber are automatically calculated and displayed in the "Total pints to be Removed" field, as well as the "Pints Remaining" field. Preferably, the total pints of water to be removed from the drying chamber is calculated in accordance with the ANSI/IICRC S500-2006 standard, as is known in the art.

Next, the contractor selects a dehumidifier that the contractor has available for placement from the "Dehumidifier Brand" list whereby the "AHAM rating" field is automatically populated (in pints per day) based on data for the selected dehumidifier retrieved from the claims database server 28. The contractor also selects the type of dehumidifier from a drop-down menu of the "Dehumidifier Type" field (typically "LGR"), and then selects the "Add" button whereby the "Pints Remaining" decrements by the AHAM rating for the selected dehumidifier. Selection of the "Add" button also causes the selected dehumidifier data to be stored in the claims database server 28. The table of dehumidifiers at the bottom of the "Dehumidifiers" column is then automatically populated with all the dehumidifiers stored in the claims database server 28 for the selected drying chamber. It can be seen that the table includes a "Delete" button for each selected dehumidifier to enable a user to delete the dehumidifier from the list. The contractor then repeats the dehumidifier selection process for the drying chamber until the "Pints Remaining" field reads zero. It should be understood that the contractor performs the above-described process for every drying chamber.

The contractor then places the selected air movers and dehumidifiers in the appropriate rooms and drying chambers (assuming, of course, that the contractor has not already placed the selected equipment throughout the equipment selection process). The contractor then enters the date that the selected equipment was placed in the rooms and drying chambers in the "Date Recorded" field and selects the "Finalize" button. Selection of the "Finalize" button causes the equipment selection data for that date to be automatically populated into the "Equipment History" page (FIG. 15). As can be seen, the "Equipment History" page displays a chronological list of selected and placed restoration equipment for each drying chamber. Each line on the list includes a "Delete" button to enable the claim administrator to delete the restoration equipment on that particular line. As will be described in greater detail below, the contractor may add or remove restoration equipment during the restoration process and enter this information on the "Equipment Validation" page (FIG. 14). These changes will be reflected on the "Equipment History" page.

Preferably, the contractor accesses the claims administration web site 12 and selects the restoration equipment on the "Equipment Validation" page while the contractor is at the insured property. To do so, the contractor may use a handheld communication device (e.g., PDA) or a laptop computer having Internet access capabilities. Alternatively, in cases where the contractor does not have these capabilities, the contractor may select the restoration equipment on the "Equipment Validation" page using a computer located at the contractor's shop. As another alternative, the contractor may call the claims administrator while at the insured property whereby the claims administrator selects the restoration equipment on the "Equipment Validation" page based on input from the contractor.

Finally, the contractor will preferably take digital photographs of the selected restoration equipment standing alone and/or as placed within the various rooms of the drying chambers for inclusion in the claim file. Most preferably, the contractor uploads these digital photographs to the claims administration web site 12 by accessing the "Photos & Docs" page (FIG. 19) (as described above).

Monitor Contractor's Submission of Work Authorization and Initial Inspection Data Referring to FIG. 3A, at blocks 134 and 136, the contractor's submission of the work authorization (block 130), documentation of damage to the insured property (block 122), drying chamber data (block 124), restoration equipment selections (block 132), initial psychrometric data (block 126) and initial moisture content data (block 128) is monitored so that one or more automated reminder messages may be transmitted to the contractor if the contractor has not submitted all or a portion of this information in a specified period of time from dispatch of the contractor to the insured property (block 114). Each reminder message is preferably a textual or audio alert notifying the contractor of an obligation to submit this information. These reminder messages may comprise either a voice message or a text message transmitted to the contractor's telephone, an e-mail or instant message transmitted to the contractor's computer or handheld communication device (e.g., PDA), or a combination of any of the foregoing.

In the exemplary embodiment, as discussed above, the "Claim Dates" page (FIG. 7) includes a "Shop Placement Date" field that indicates the date and time that the contractor was dispatched to the insured property. When the claims administrator enters a date and time into this data input field, it triggers the monitoring of the various data input fields on the "Room Dimension" page (FIG. 13), the "Equipment Validation" page (FIG. 14), the "Daily Humidity" page (FIG. 16A), the "Moisture Map" page (FIG. 17), the "Flooring Diagrams" page (FIG. 18) and the "Photos & Does" page (FIG. 19). By monitoring these data input fields, it can be determined whether the contractor has submitted the required information. If no data has been entered into one or more of these data input fields within a specified period of time from the "Shop Placement Date" date and time, the application server retrieves a desired textual script from the claims database server 28 (which stores a plurality of textual scripts) and generates a .wav file based on the textual script. An example of a textual script for this situation is provided below:

> [Contractor's name of business]—This is a CodeBlue Alert! A signed work authorization, room dimensions, equipment validation, psychrometric readings, moisture content readings, flooring diagram, and photos have not been uploaded to the CodeBlue website for [claim #] for [claimant's name] at [claimant's address]. If this information is not uploaded to the CodeBlue website [required response time], then this will affect your ranking and ability to receive future claims! Please upload this information as soon as possible! Call the CodeBlue Support Team at 715-555-5555 with any questions! Thank you in advance for your prompt response to this notification!

It should be understood that the information in brackets is replaced by the relevant data stored in the claims database server 28. The application server then transmits the contractor's telephone number and the .wav file to the notification server 32, which automatically dials the telephone number through an interface with the public telephone network and plays the .wav file so as to transmit a voice message to the contractor (as described above).

In this embodiment, the voice message is transmitted to the contractor if all of the required information has not been entered into the various data input fields within 18 hours, 22 hours, and 24 hours from the "Shop Placement Date" date and time (i.e., the voice message may be transmitted to the contractor up to three different times). In these cases, the "[required response time]" in the textual script comprises "within the next 6 hours" at the 18 hour point, "within the next 2 hours" at the 22 hour point, and "immediately" at the 24 hour point. Of course, it should be understood that other periods of time could also be used in accordance with the invention (e.g., any period of time between 2 hours and 24 hours). Preferably, if the period of time exceeds a maximum limit, the claims administrator is notified by e-mail or another communication means so that the claims administrator may contact the contractor directly to inquire as to the contractor's submission of the required information.

Collect Daily Inspection Data

Figure 3B:
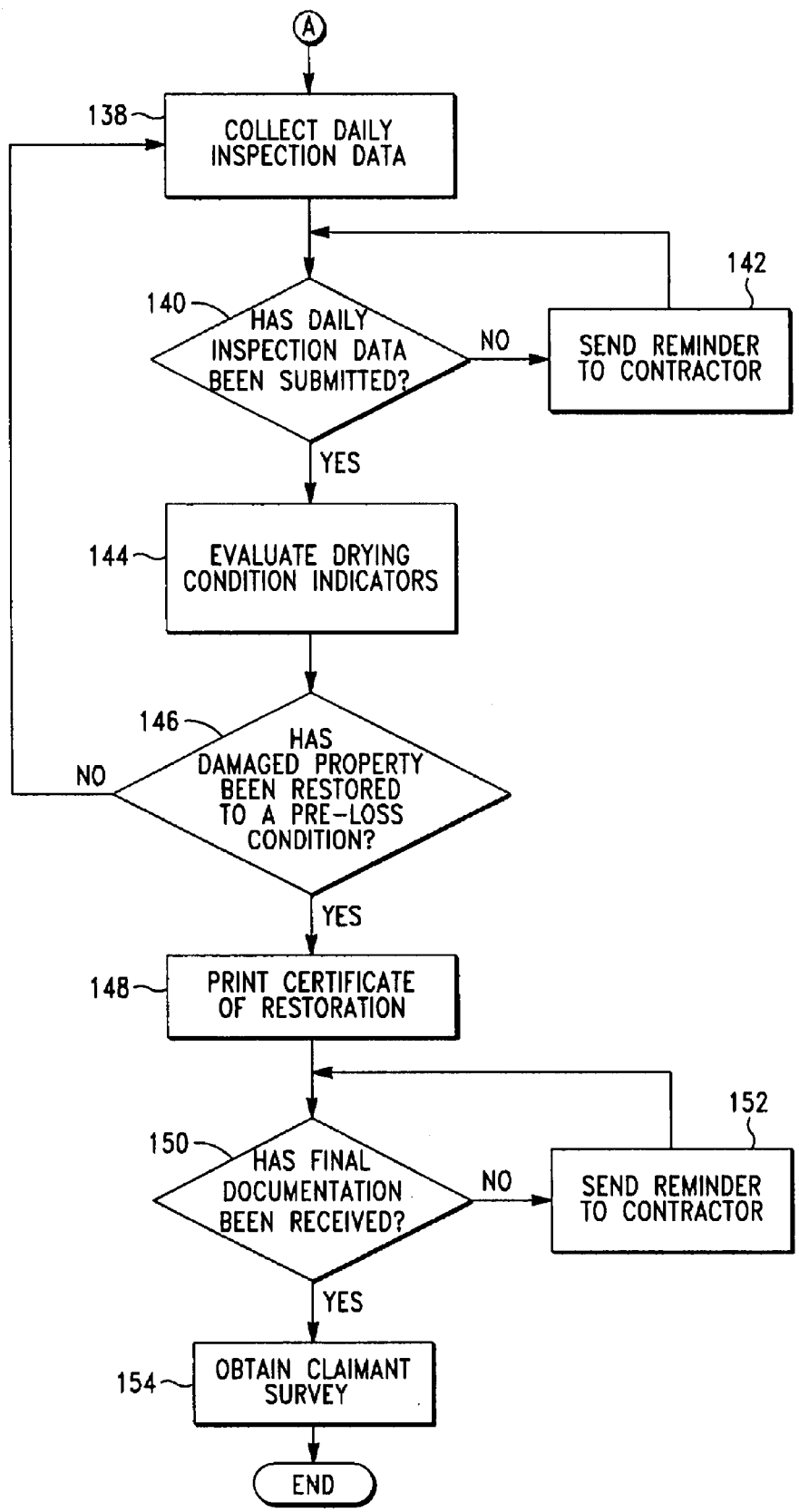

Referring to FIG. 3B, at block 138, after the restoration equipment has been operating within the drying chambers of the insured property for a period of time (e.g., a day), the contractor returns to the insured property for the purpose of collecting daily psychrometric data and daily moisture content data. In addition, the contractor analyzes the restoration equipment operating within the drying chambers and makes any necessary changes to the equipment configuration.

In the exemplary embodiment, the contractor accesses the claims administration web site 12 and navigates to the "Daily Humidity" page (FIGS. 16A-16D) to enter the daily psychrometric data and then navigates to the "Moisture Map" page (FIG. 17) to enter the daily moisture content data. It should be understood that the process of entering the daily psychrometric data in the data input fields of the "Daily Humidity" page is the same as the process described above for the entry of the initial psychrometric data. Similarly, the process of entering the daily moisture content data in the data input fields of the "Moisture Map" page is the same as the process described above for the entry of the initial moisture content data.

Next, the contractor navigates to the "Equipment Validation" page (FIG. 14) and selects a drying chamber from the drop-down menu of the "Drying Chamber" field. If there are no changes to the restoration equipment for that drying chamber, the contractor selects the "Finalize" button whereby the equipment selection data for that date is automatically populated into the "Equipment History" page (FIG. 15). If the contractor has added any restoration equipment within the drying chamber, the contractor adds such equipment via the "Add" selection buttons (as described above). On the other hand, if the contractor has removed any restoration equipment from the drying chamber, the contractor deletes such equipment via the "Delete" selection buttons (as described above). The contractor then selects the "Finalize" button whereby the equipment selection data for that date is automatically populated into the "Equipment History" page. It should be understood that this process is repeated for each of the drying chambers within the insured property.

Finally, the contractor may find it desirable to take one or more photographs to further document the restoration process. If so, the contractor will navigate to the "Photos & Docs" page (FIG. 19) and upload the photographs to the claims administration web site 12 (as described above). It should be noted that the photographs may comprise digital photographs of the damaged property, thermal imaging photographs showing the relative moisture content in various damaged structural materials, or even digital photographs showing various temperature, relative humidity, and moisture content readings on the thermometer, relative humidity meter and moisture meter, respectively.

Monitor Contractor's Submission of Daily Inspection Data

Referring to FIG. 3B, at blocks 140 and 142, the contractor's submission of the daily psychrometric and moisture content data and validation of the restoration equipment operating within the drying chambers (block 138) is monitored so that one or more automated reminder messages may be transmitted to the contractor if the contractor has not submitted all or a portion of this information by a specified time deadline. Each reminder message is preferably a textual or audio alert notifying the contractor of an obligation to submit this information. These reminder messages may comprise either a voice message or a text message transmitted to the contractor's telephone, an e-mail or instant message transmitted to the contractor's computer or handheld communication device (e.g., PDA), or a combination of any of the foregoing.

In the exemplary embodiment, various data input fields on the "Equipment Validation" page (FIG. 14), the "Daily Humidity" page (FIG. 16A), and the "Moisture Map" page (FIG. 17) are monitored to determine whether the contractor has submitted the required information. If no data has been entered into one or more of these data input fields by a specified time deadline, the application server retrieves a desired textual script from the claims database server 28 (which stores a plurality of textual scripts) and generates a .wav file based on the textual script. An example of a textual script for this situation is provided below:

> [Contractor's name of business]—This is a CodeBlue Alert! The following information should be uploaded to the CodeBlue website before the end of the day each day until mitigation is complete for [claim #] for [claimant's name] at [claimant's address]: equipment validation showing any equipment added or removed from the loss site, psychrometric readings, moisture content readings, and any additional photos or notes regarding the status of this claim. If this information is not uploaded daily it will affect your ranking and ability to receive future claims. Call the CodeBlue Support Team at 715-555-5555 with any questions. Thank you in advance for your prompt response to this notification!

It should be understood that the information in brackets is replaced by the relevant data stored in the claims database server 28. The application server then transmits the contractor's telephone number and the .wav file to the notification server 32, which automatically dials the telephone number through an interface with the public telephone network and plays the .wav file so as to transmit a voice message to the contractor (as described above).

In this embodiment, the voice message is transmitted to the contractor if all of the required information for the current day has not been entered into the various data input fields by 3:00 p.m. Then, the voice message is transmitted to the contractor again if all of the required information for the current day has not been entered into the various data input fields by 5:00 p.m. (i.e., close of business day). Of course, it should be understood that other time deadlines could also be used in accordance with the invention. Preferably, if the required information has not been entered by a specified date and time, the claims administrator is notified by e-mail or another communication means so that the claims administrator may contact the contractor directly to inquire as to the contractor's submission of the required information.

Evaluate Drying Condition Indicators

Referring to FIG. 3B, at block 144, the contractor, the claims administrator and/or the insurance carrier (i.e., a user) are able to evaluate "drying condition indicators" to determine whether the drying chamber presents an acceptable drying environment. In the exemplary embodiment, these drying condition indicators comprise the various graphs shown on the "Daily Humidity" page, as shown on FIGS. 16B-16D. As discussed above, these graphs comprise a "Daily Humidity Graph" (FIG. 16B), a "GD Graph" (FIG. 16C) and a "Temperature Graph" (FIG. 16D) that plot the specific humidity, grain depression and temperature data in relation to the inspection dates for various inspection locations. The "GD Graph," of course, only includes data for the dehumidifiers and HVAC system. It can be seen that these graphs provide a visual representation of the list of inspection data shown on the bottom of FIG. 16A.

For example, in viewing the "Daily Humidity Graph," the specific humidity values within a drying chamber should preferably decrease at a certain rate. If the specific humidity values are not decreasing as rapidly as expected, it may be caused by high specific humidity outside of the insured property. Displaying the specific humidity values for multiple inspection locations on the same graph allows a user to easily make this determination. Of course, if the specific humidity values outside of the insured property are not high, then the user may determine that the drying chamber does not present an acceptable drying environment. In this case, the restoration equipment within the drying chamber may be adjusted to correct this problem.

As another example, viewing the "GD Graph" allows a user to easily determine that a dehumidifier is not functioning properly (i.e., has a high grain depression value). When viewed in conjunction with the "Temperature Graph," however, the user may spot an ambient temperature increase that accounts for the high grain depression value. As yet another example, viewing the "Temperature Graph" allows a user to easily spot high temperature values within an unaffected area of an insured property (i.e., outside the drying chamber). If so, the user may contact the claimant to determine if the claimant prefers to stay in a hotel during the restoration process.

Thus, the "Daily Humidity Graph," the "GD Graph," and the "Temperature Graph" may be used to determine whether a drying chamber presents an acceptable drying environment, as well as to assess the functionality of the restoration equipment and the living conditions within the insured property. Of course, one skilled in the art will appreciate that these graphs may be used for other purposes as well.

Determine Whether Damaged Property Has Been Restored to a Pre-Loss Condition and Print Certificate of Restoration Referring to FIG. 3B, at block 146 and 148, the contractor makes a determination as to whether the damaged property has been restored to a pre-loss condition. To do so, the contractor accesses the "Moisture Map" page (FIG. 17) and compares the moisture content reading for each of the affected locations to the corresponding target value. If the moisture content readings for the affected locations have not reached their target values, then the restoration equipment is kept in place and the process of blocks 138-146 is repeated the next day. Of course, if some (but not all) of the moisture content readings for the affected locations have reached their target values, then the contractor may decide to remove certain restoration equipment from a particular drying chamber. This equipment change will be reflected on the "Equipment Validation" page (FIG. 14) (as discussed above).

Figure 12:
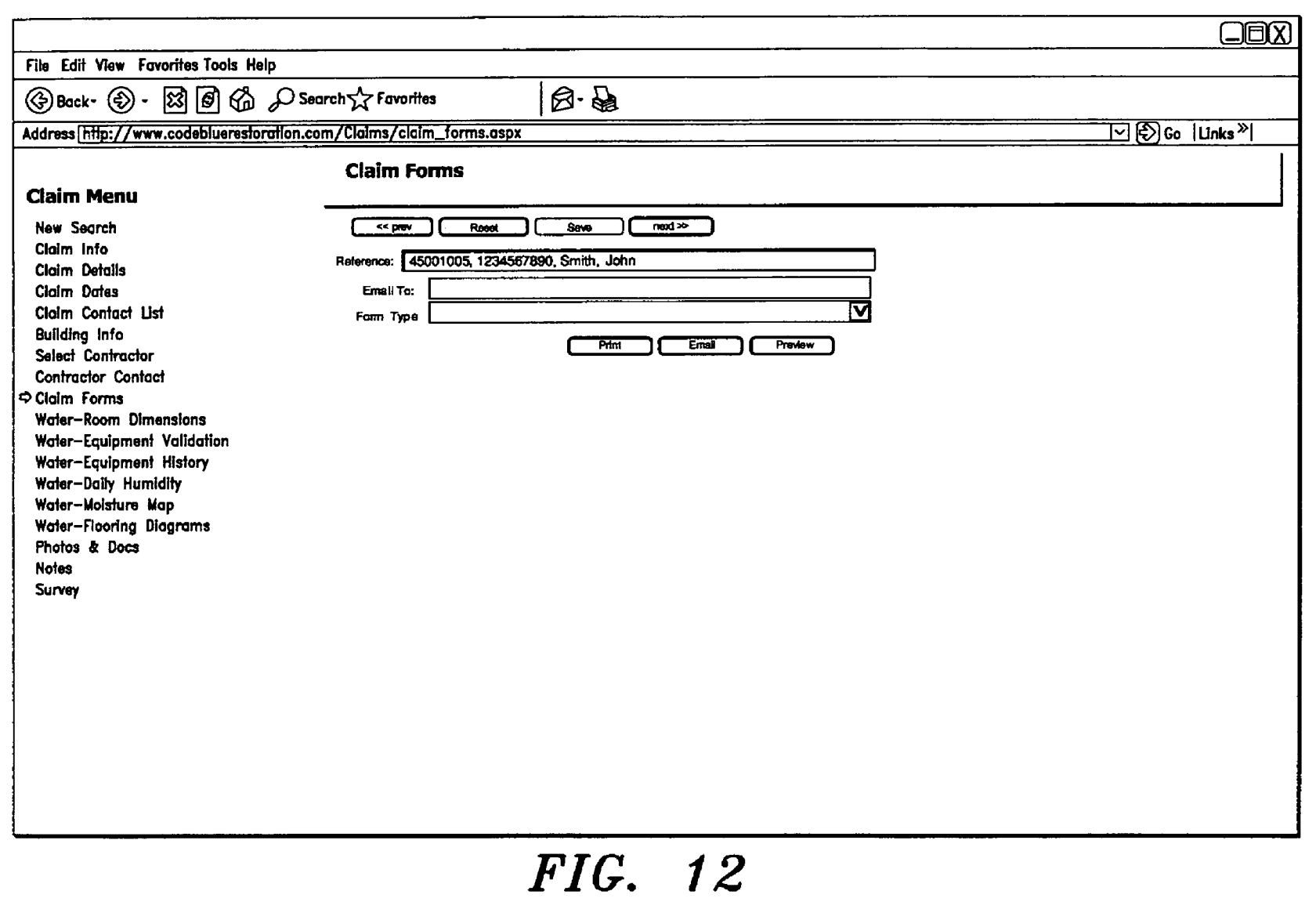

However, if all of the moisture content readings for all of the affected locations have reached their target values, then the damaged property is considered to be restored to its pre-loss condition. At that point, the contractor selects the "Pre-loss Conditions Certificate" button on the "Moisture Map" page (FIG. 17) whereby the final moisture content readings and corresponding target values are automatically populated into a "Certificate of Returned to Pre-Loss Moisture Content Conditions" form located on the "Claim Forms" page (FIG. 12). The contractor then navigates to the "Claim Forms" page and selects the "Certificate of Returned to Pre-Loss Moisture Content Conditions" form from the drop-down menu and then selects the "Print" button to print the form. Preferably, the contractor is able to print the form on-site via either a handheld communication device (e.g., PDA) or a laptop computer connected to a printer. Alternatively, the contractor may print the form at the contractor's office at a later time. Regardless of when the contractor prints the form, the contractor and the claimant both sign and date the "Certificate of Returned to Pre-Loss Moisture Content Conditions" form to thereby certify that the damaged property has been restored to its pre-loss condition. Finally, the contractor uploads the signed "Certificate of Returned to Pre-Loss Moisture Content Conditions" form to the claims administration web site 12 by accessing the "Photos & Docs" page (FIG. 19) (as described above).

Preferably, the contractor takes digital and/or thermal imaging photographs sufficient to show that the damaged property has been restored it its pre-loss condition. These photographs may comprise digital photographs of the "restored" property, thermal imaging photographs showing the relative moisture content in the "restored" structural materials, and digital photographs showing the final moisture content readings on the moisture meter. The contractor will then navigate to the "Photos & Docs" page and upload the photographs to the claims administration web site 12 (as described above) so that they become part of an "evidence file" of the claim (along with the signed "Certificate of Returned to Pre-Loss Moisture Content Conditions"). It can be appreciated that this "evidence file" may be used at a later time should the claimant (or another third party) attempt to argue that the damaged property was not sufficiently restored it its pre-loss condition.

Finally, it should be noted that the selection of the "Preloss Conditions Certificate" button on the "Moisture Map" page (FIG. 17) causes the "Date Completed" field of the "Claim Dates" page (FIG. 7) to be automatically populated with the current date and time (i.e., the date and time that the "Preloss Conditions Certificate" button was selected).

Monitor Contractor's Submission of Final Documentation

Referring to FIG. 3B, at blocks 150 and 152, the contractor's submission of final documentation is monitored so that one or more automated reminder messages may be transmitted to the contractor if the contractor has not submitted all or a portion of the final documentation within a specified period of time from completion of the restoration services. This final documentation may comprise a variety of different documents, such as a signed "Certificate of Returned to Pre-Loss Moisture Content Conditions" (discussed above), a signed "Certification of Completion and Satisfaction of Emergency Services" and/or "Certificate of Completion and Satisfaction of Reconstruction Services" (which are other forms on the "Claim Forms" page (FIG. 12)), and a final invoice for the restoration services. Each reminder message is preferably a textual or audio alert notifying the contractor of his obligation to submit final documentation on the claim. This reminder messages may comprise either a voice message or a text message transmitted to the contractor's telephone, an e-mail or instant message transmitted to the contractor's computer or handheld communication device (e.g., PDA), or a combination of any of the foregoing.

In the exemplary embodiment, the "Date Completed" field of the "Claim Dates" page (FIG. 7) is monitored and an automated reminder message is immediately transmitted to the contractor upon completion of the restoration services. To do so, the application server retrieves a desired textual script from the claims database server 28 (which stores a plurality of textual scripts) and generates a .wav file based on the textual script. An example of a textual script for this situation is provided below:

[Contractor's name of business]—This is a CodeBlue Alert! Regarding [claim #] for [claimant's name] at [claimant's address], your CodeBlue Emergency Services Invoice is due within 12 hours of completion of mitigation. All affected materials must be returned to pre-loss conditions and a signed Certificate of Returned to Pre-Loss Moisture Content Conditions and a signed Certificate of Completion/Satisfaction should be uploaded with your Emergency Services Invoice to the CodeBlue website as soon as possible. If these are not uploaded within the next 12 hours then it will affect your ranking and ability to receive future claims. Call the CodeBlue Support Team at 715-555-55555 with any questions. Thank you in advance for your prompt response to this notification!

It should be understood that the information in brackets is replaced by the relevant data stored in the claims database server 28. The application server then transmits the contractor's telephone number and the .wav file to the notification server 32, which automatically dials the telephone number through an interface with the public telephone network and plays the .wav file so as to transmit a voice message to the contractor (as described above).

If the contractor has not submitted all or a portion of the final documentation within a specified period of time from the "Date Completed" field date and time (as determined by monitoring the "Description" field on the "Photos & Docs" page for specific terms), the application server retrieves another textual script from the claims database server 28 (which stores a plurality of textual scripts) and generates a .wav file based on the textual script. An example of a textual script for this situation is provided below:

[Contractor's name of business]—This is a CodeBlue Alert! Regarding [claim #] for [claimant's name] at [claimant's address], the CodeBlue Emergency Services Invoice, a signed Certificate of Returned to Pre-Loss Moisture Content Conditions and a signed Certificate of Completion/Satisfaction must be uploaded to the CodeBlue website as soon as possible or it will affect your ranking and ability to receive future claims. Call the CodeBlue Support Team at 715-555-5555 with any questions. Thank you in advance for your prompt response to this notification!

It should be understood that the information in brackets is replaced by the relevant data stored in the claims database server 28. The application server then transmits the contractor's telephone number and the .wav file to the notification server 32, which automatically dials the telephone number through an interface with the public telephone network and plays the .wav file so as to transmit a voice message to the contractor (as described above).

In this embodiment, the voice message is transmitted to the contractor if all of the final documentation has not been submitted within 12 hours from the "Date Completed" field date and time. Of course, it should be understood that other periods of time could also be used in accordance with the invention (e.g., any period of time up to 24 hours). Optionally, additional voice message could be transmitted to the contractor wherein each subsequent voice message provides escalating urgency to the contractor. Preferably, if the period of time exceeds a maximum limit, the claims administrator is notified by e-mail or another communication means so that the claims administrator may contact the contractor directly to inquire as to the contractor's submission of the final documentation.

Preferably, each time an automated reminder message is transmitted to the contractor (as described above with respect to various types of messages), information relating to the message (e.g., the contractor name, the contractor's time zone, the contractor's telephone number, the contractor's e-mail address, the textual script of the message, and the status of the message) is stored in the claims database server 28 and automatically populated to an "Alerts History" page (not shown). It should be understood that various other types of messages may be transmitted to the contractor based on any desired "start" dates and times and "stop" dates and times. It should also be understood that the transmission of the various messages may be triggered by other types of indicators and need not be based on any particular dates and times. One skilled in the art will appreciate that the automated reminder system described herein provides a means to monitor the performance of hundreds or thousands of contractors with little or no involvement on the part of the claims administrator during the restoration process.

Obtain Claimant Survey

Referring to FIG. 3B, at block 154, after the restoration services have been completed, the claims administrator provides the claimant with a survey for the purpose of obtaining the claimant's satisfaction with the claims administrator, the contractor, and the overall restoration and claims process. In the exemplary embodiment, the claims administrator transmits an e-mail to the claimant with a hyperlink to a "Survey" page (FIGS. 21A and 21B) of the claims administration web site 12. The "Survey" page displays a series of seven questions to be answered or completed by the claimant. Specifically, question 1 asks the claimant to rate his satisfaction with the claims administrator, questions 2-5 ask the claimant to rate his satisfaction with various aspects of the contractor's performance, question 6 asks the claimant to rate his satisfaction with the overall restoration and claims process, and question 7 allows the claimant to provide general comments about the process. Below each question are options labeled "a. Extremely Satisfied," "b. Very Satisfied," "c. Satisfied," "d. Unsatisfied," and "e. Very Unsatisfied." Each option (a-e) includes a selection button that allows the claimant to select one of the available options. A text input field below question 7 allows the claimant to enter text comments as described above.

Upon completion of the survey, the claimant selects the "Save" button whereby the survey data is stored in the claims database server 28. As described above, information received from claimant surveys may be considered as a factor in determining the ranking of a contractor. Upon storing the survey data in the database, the completed survey is displayed on the "Survey" page as shown on FIG. 21C (in which the seven questions are presented along with the claimant's selected ratings and comments). The "Survey" page of FIG. 21C is "read-only" such that a user may not modify the survey data displayed on the page.

It should be understood that the survey could be provided to the claimant in other forms. For example, the contractor could provide a hard copy of the survey to the claimant upon completion of the restoration services. Also, the claims administrator could mail a hard copy of the survey to the claimant. In either case, upon completion of the survey, the claimant would mail a hard copy of the completed survey to the claims administrator who would manually enter the survey data into the "Survey" page. In addition, the claimant could return the survey answers in the e-mail itself (i.e., the e-mail with the hyperlink to the "Survey" page).

Throughout the entire process described above with respect to blocks 112-154, the claims administrator preferably enters detailed notes related to the processing of the insurance claim. The notes entered and stored may include reminders of tasks to be completed, comments on various aspects of the claim processing, or any other information that relates to the claim. The entered notes are stored in the claims database server 28 and are automatically populated into a notes list so as to provide a detailed diary of the claim. In addition, the entered notes may be emailed to a desired recipient.

In the exemplary embodiment, the "Notes" page (FIG. 20) includes data input fields titled "To," "From," "Attachment" and "Standard Notes," with a large text entry field positioned under the "Standard Notes" field. Selection buttons labeled "Browse" and "Insert Note" are positioned next to the "Attachment" and "Standard Notes" fields, respectively, with selection buttons labeled "Send Email" and "Add Note" positioned under the large text entry field. Checkboxes labeled "Contractor," "Client," "Policyholder," and "Confidential" are positioned along the side and at the bottom of the large text entry field.

Using the "Notes" page, the claims administrator enters the text for the desired note into the large text entry field. Text can be directly entered into the field, or, the claims administrator can use the drop-down menu of the "Standard Notes" field to select from numerous canned or boilerplate notes. Selecting a boilerplate note from the drop-down menu and selecting the associated "Insert Note" button populates the large text entry field with the boilerplate note. The claims administrator can then edit the boilerplate note as desired. The claims administrator can also attach a file to a note by using the "Attachment" field and associated "Browse" button to locate and attach a file from their local computer. The "Contractor," "Client," and "Policyholder" checkboxes allow the claims administrator to select which users will be able to view the note once it has been entered into the claims database server 28. The "Confidential" checkbox allows the claims administrator to indicate that the note is proprietary to the claims administrator. Of course, selecting the "Confidential" checkbox automatically unchecks the "Contractor," "Client," and "Policyholder" checkboxes.

With a note entered in the large text entry field and any files optionally attached, the claims administrator selects the "Add Note" button whereby the note is stored within the claims database server 28. The note is also automatically populated to the notes list at the bottom of the page, along with a date and time stamp of when the entry was made and a record of who made the entry. The "File" column of the notes list indicates any files attached to the note (as described above). It can be seen that each line of the notes list includes an "Edit" button that allows the claims administrator to edit information on that line.

In addition to storing a note, the claims administrator can also email the note using the "To" and "From" fields and selection of the "Send Email" button. After entering the desired text in the large text entry field and attaching any files, as described above, the claims administrator enters the email address of a desired recipient(s) in the "To" field and enters his own email address in the "From" field (so that the recipient can identify the sender). Selection of the "Send Email" button (instead of the "Add Note" button) causes the note and any attached files to be e-mailed to the recipient(s), and, causes the note to be stored in the claims database server 28 and populated to the notes list at the bottom of the page. In the case of the claims administrator using the "Email" button instead of the "Add Note," the email addresses of the recipient(s) and the sender are appended to the text displayed in the "Note" column of the notes list. Thus, the text displayed indicates that the note was also sent as an email.

System Configuration of Salvage Management Web Site

Figure 22:
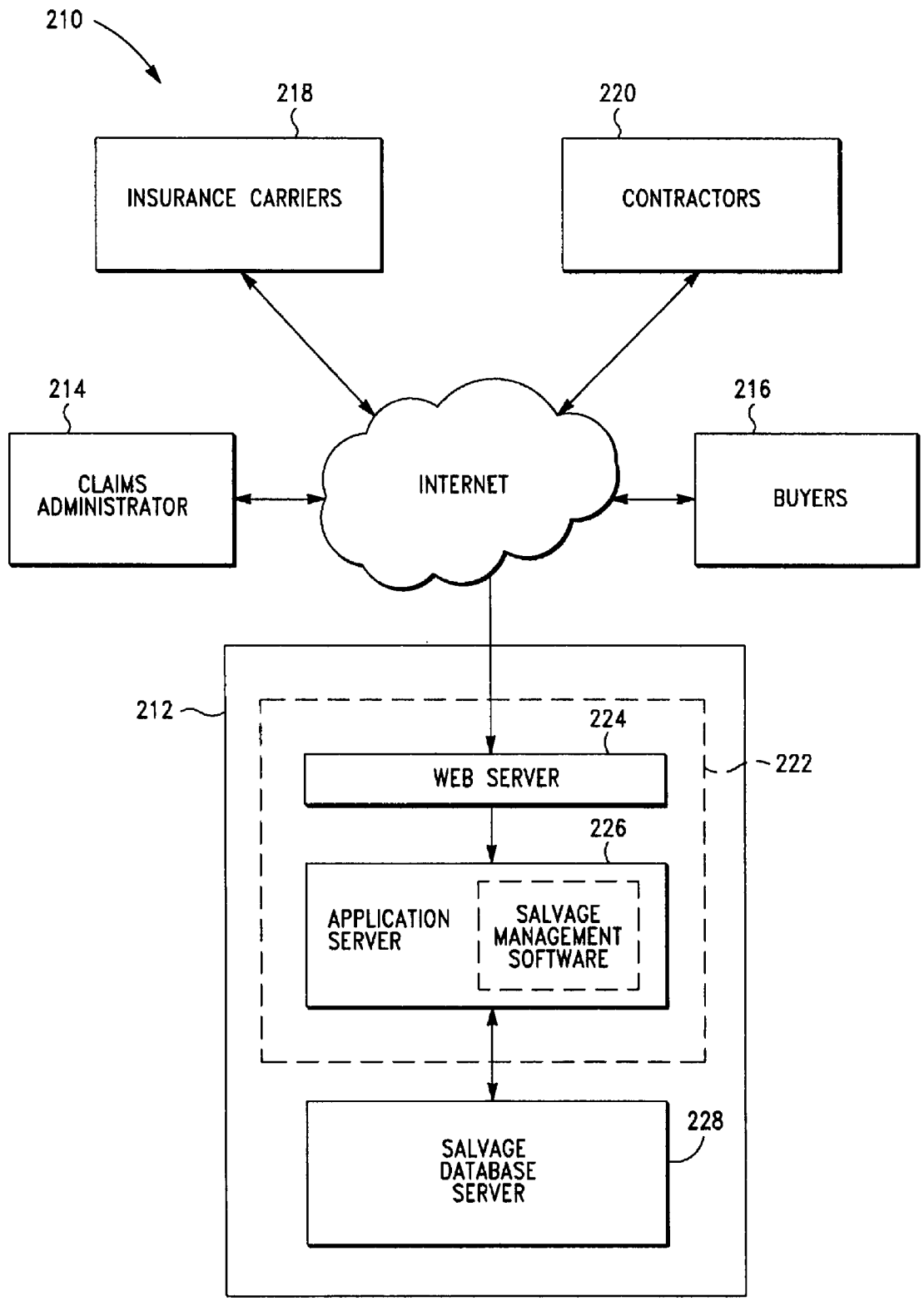
FIG. 22 shows a block diagram of an exemplary system for managing the sale of salvage items in accordance with the present invention.

Referring to FIG. 22, an exemplary system for managing the sale of items salvaged from insured properties in accordance with the present invention is shown generally as reference numeral 210. The system 210 includes a salvage management web site 222 (similar to the claims administration web site 12) that is operated by a claims administrator 214 responsible for managing the salvage of damaged contents associated with numerous insurance claims (preferably the same entity as the claims administrator 14 discussed above).

The site 212 is accessible by a plurality of different users via the Internet, although other communication networks known in the art could also be used.

Users of the salvage management web site 222 generally include the claims administrator 214 (i.e., the operator of the site who is responsible for the management and sale of salvage items), a plurality of buyers 216 (i.e., the purchasers of salvage items), a plurality of insurance carriers 218 (i.e., the issuers of insurance policies covering the salvage items), and a plurality of contractors 220 (i.e., vendors and/or shops responsible for handling the salvage items and/or performing all or part of the restoration services at the insured properties, as described above). Of course, it should be understood that each of these users may include a plurality of individual users. These users are exemplary of the users involved in the management and sale of salvage items associated with a typical insurance claim. Of course, it should be understood that the management and sale of a particular salvage item may not involve all of these users or may users other than those depicted in FIG. 22.

The salvage management web site 212 includes a server system 222 comprising a web server 224 coupled to an application server 226. The web server 224 is connected to the internet and includes a user interface that presents web pages to the users, and, includes functionality for the users to submit data into various data input fields displayed on the web pages (which will be described in greater detail below). It should be understood that while one application sever is depicted in FIG. 22, additional application servers may be used depending on the number of users accessing the site 212.

The application server 226 runs a salvage management software application (shown in phantom lines) that provides capabilities for managing the collection and sale of salvage items. In this embodiment, the salvage management software application comprises a single computer program written in the Visual Studio C#.net programming language. Of course, a suite of computer programs and/or other programming languages could also be used. One skilled in the art will appreciate that users are able to utilize the capabilities of the salvage management software application via the user interface of the web server 224.

The application server 226 is coupled to a salvage database server 228, which stores salvage data for a plurality of salvage items associated with a plurality of insurance claims. Preferably, the salvage data for each insurance claim is stored in the salvage database server 228 in association with a claim identifier that is unique to that insurance claim. In addition, the salvage data for each salvage item is preferably stored in the salvage database server 228 in association with an item identifier that is unique to that salvage item. A variety of different types of salvage data may be stored for each salvage item of each insurance claim, including data related to the type and condition of the salvage item, data related to the physical location of the salvage item, data related to the contractor assigned to handle the salvage item, data related to the insurance carrier responsible for insuring the salvage item, data related to the posting and sale of the salvage item, and data related to a buyer of the salvage item. It should be understood that the server system 222 controls the storage of the various salvage data in the salvage database server 228.

The salvage database server 228 also stores data related to various users of the site 212, including contractors available to collect, handle, store and ship/deliver the salvage items. As described above, the contractors are preferably required to submit detailed information about their services and capabilities in order to become a member of the "restoration contractor network" (including their availability to provide salvage item services in particular zip codes). All of this detailed information is stored in the salvage database server 228 and is used to select the appropriate contractor for a particular salvage claim, as will be described in greater detail below. It should be noted that the contractor data stored in the salvage database server 228 is substantially similar to the contractor data stored in the claims database server 28 (described above), although there may be slight differences due to the fact that some contractors may provide salvage services (but not mitigation/restoration services) and some contractors may provide mitigation/restoration services (but not salvage services).

In this embodiment, the web server 224, the application server 226, and the salvage database server 228 are all co-located in the same geographic location. It should be understood, however, that one or more of these servers could be located in a different geographic location with appropriate connections to the other servers.

Methodology of Managing the Sale of Salvage Items

An exemplary method for managing the sale of salvage items in connection with the management of an insurance claim in accordance with the present invention will now be described with reference to blocks 310-328 of the process flow diagram shown in FIG. 23. It should be noted that a brief description of the entire salvage process will now be provided, followed by a more detailed description with further reference to the various forms and web pages presented by the salvage management site 212.

Figure 23:
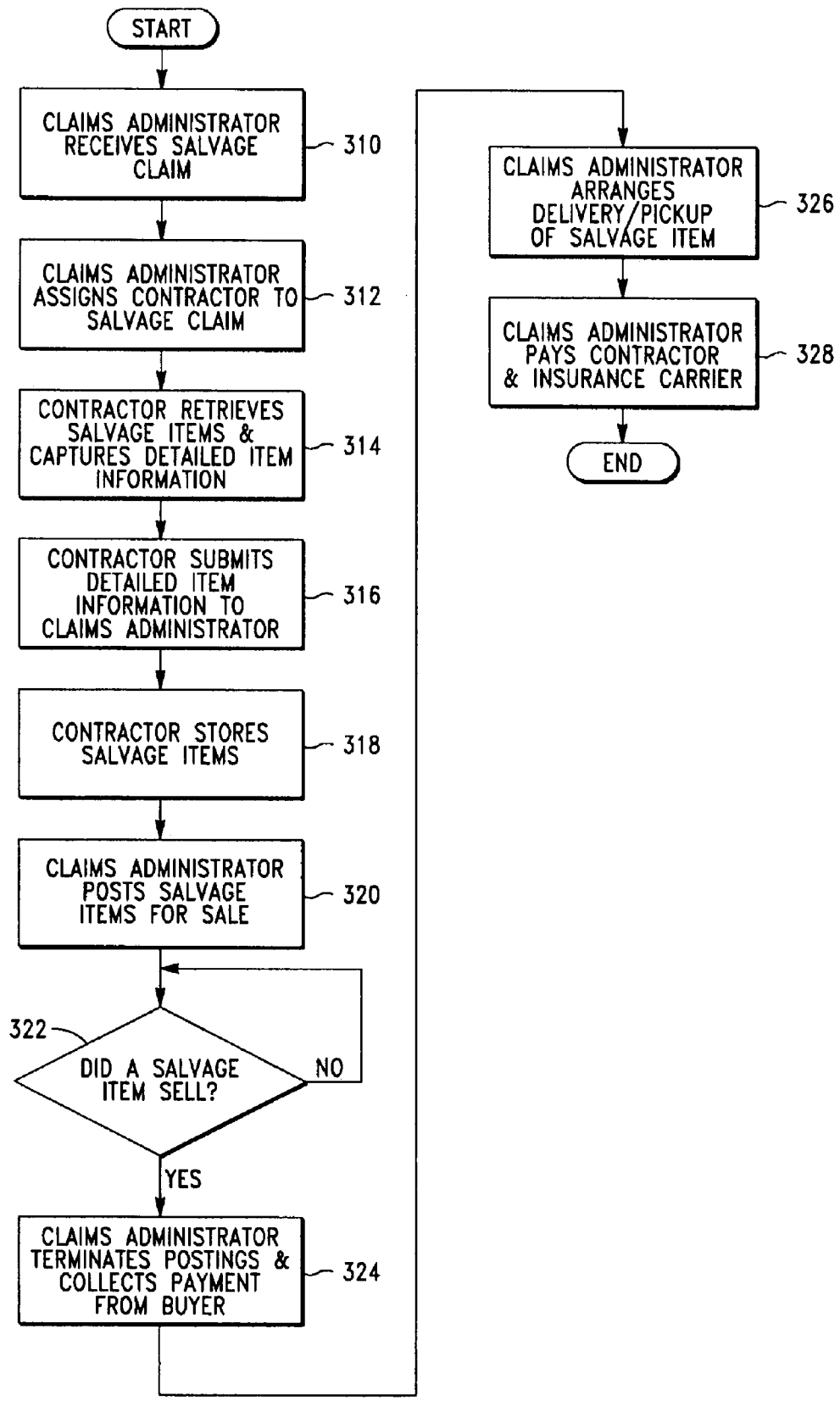
FIG. 23 shows a process flow diagram of an exemplary method for managing the sale of salvage items in accordance with the present invention.

Looking to block 310 of FIG. 23, the salvage process begins with the submission of a salvage claim (i.e., a list of salvage items) to the claims administrator. The salvage claim will typically be submitted by either an insurance carrier or a contractor already assigned to provide mitigation and/or restoration services at an insured property (as described above). The claims administrator enters the salvage items into the salvage database server 228, and, at block 312, the claims administrator assigns a contractor to the salvage claim (if not already assigned). The contractor is preferably a member of the "restoration contractor network" (as described above) and is assigned to the salvage claim based on the zip code in which the salvage items are located and the ranking of the contractor (as will be described below).

At block 314, the assigned contractor retrieves the salvage items from the insured property, cleans the items (if necessary), captures detailed information about the salvage items, and provides the detailed information to the claims administrator at block 316. The detailed information about each salvage item is further entered into the salvage database server 228. At block 318, the contractor stores the salvage items at the contractor's warehouse, shop, or other storage facility. At block 320, after reviewing the detailed information provided by the contractor and entering it into the salvage database server 228, the claims administrator posts the salvage items for sale through one or more sales venues, such as online auction sites and classified listings.

At block 322, the claims administrator monitors the sales postings to determine if any of the salvage items have been sold. If a salvage item has been sold, at block 324 the claims administrator terminates the "for-sale" postings and listings for that particular salvage item, and collects payment (including applicable taxes) for the salvage item from the buyer. At block 326, the claims administrator arranges delivery or pickup of the salvage item from the storage facility. At block 328, the claims administrator disburses a portion of the proceeds of the sale to the contractor and the insurance carrier, with the claims administrator maintaining records of the various payments for tax purposes.

Looking in more detail at block 310, in a first exemplary method, an insurance carrier receives a list of items for salvage from a claimant (i.e., policyholder) in relation to a loss suffered at an insured property. Using an "Insurance Submission Form" provided by the claims administrator, as shown in FIG. 24, the insurance carrier enters information about the salvage items based upon a description provided by the claimant, or in some cases, based upon a first-hand description of the salvage items provided by the insurance carrier's own insurance adjuster. Using the "Insurance Submission Form" as shown in FIG. 24, the insurance carrier enters a description of each salvage item, provides information about the location of the salvage items, and enters information related to the insurance policy covering the salvage items.

As seen in FIG. 24, the "Insurance Submission Form" includes fields for entering a description of a salvage item, the quantity of the item, an estimated replacement cost value (RCV) of the item, an estimated actual cash value (ACV) of the item, the original purchase price of the item (if known), and any comments or special instructions regarding the item (for example, noting damage to the item). The insurance carrier enters information for each salvage item into the appropriate fields of the form, if that information is known. For instance, the insurance carrier may not have information regarding the original purchase price of the salvage item if that information was not provided by the claimant. Also, the insurance carrier will typically choose to enter a value for only one of the RCV or ACV fields, but not both. The "Insurance Submission Form" also includes fields for attaching digital photographs or electronic documents related to the salvage item. In cases where the form will be submitted to the claims administrator electronically, the insurance carrier can attach the photographs or documents by selecting the "Attach Photo" button and selecting a file to attach to one of the photo fields.

The "Insurance Submission Form" also includes fields for entering the name, address and contact information for either a claimant or a contractor (depending upon who has physical possession of the salvage items). In most cases, the salvage items will be located at the insured property site, in which case the insurance carrier would provide the claimant's name, address and contact information in the "Pickup from Insured" fields. In other cases, as will be described in greater detail below, a contractor may have already retrieved and warehoused the salvage items, in which case the contractor's name, address and contact information would be provided in the "Pickup from Contractor" fields. The form also includes fields for the insurance carrier to provide information related to the insurance carrier's claim number, the date of loss, the name of the claimant, the name of the adjuster assigned to the claim, and the date that the salvage items will be available for pickup by a contractor.

Upon completion of the "Insurance Submission Form," the insurance carrier submits the form to the claims administrator. The form may be submitted to the claims administrator in hard copy form via hand delivery, mail or facsimile, or electronically via e-mail or web site upload. Preferably, the form is submitted to the claims administrator electronically, and most preferably the form is uploaded to the salvage management web site 212. In cases where the form is submitted to the claims administrator in hard copy form, any attached files (as described above) would of course not be included.

Figure 25:
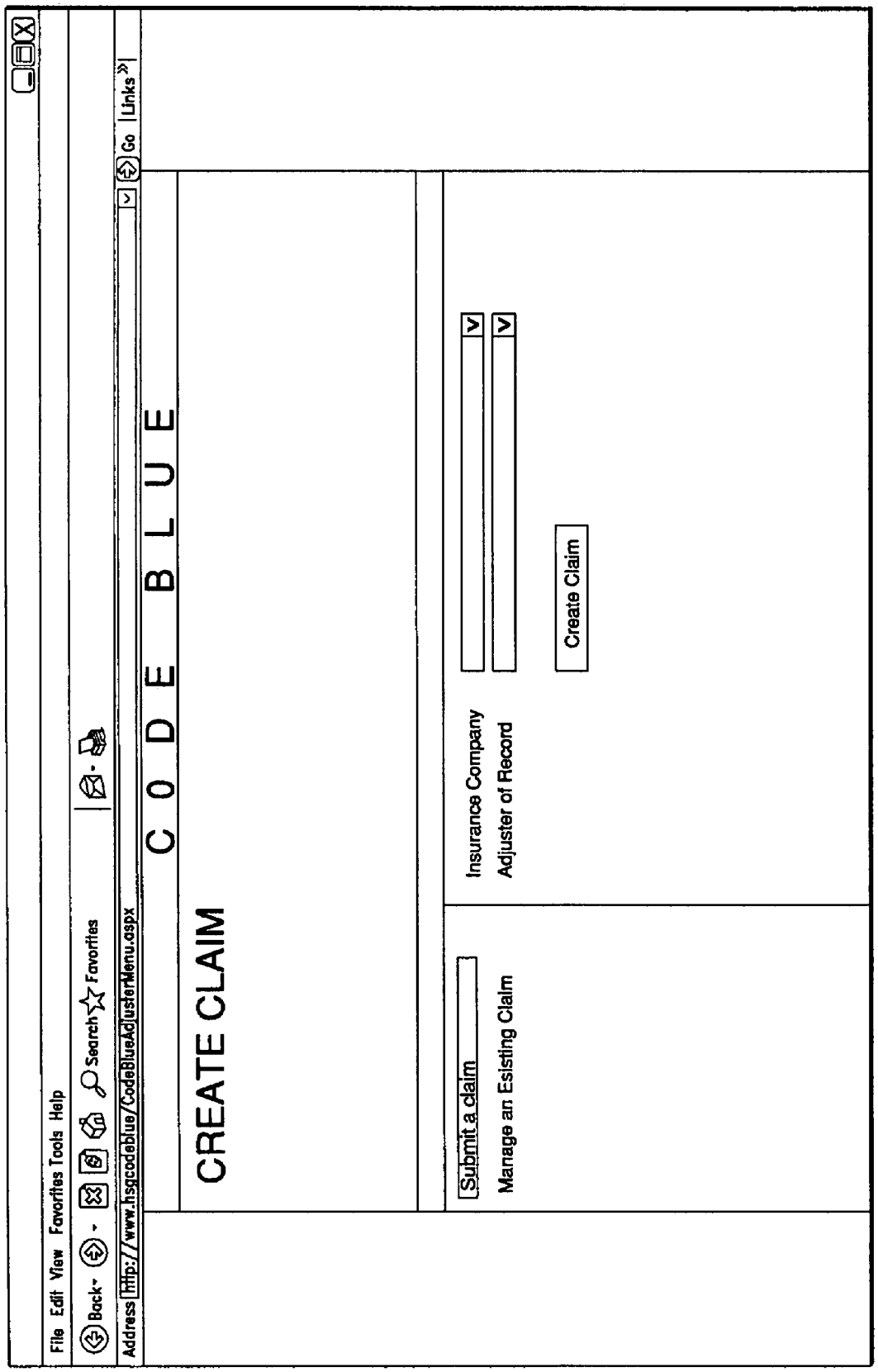
FIG. 25 shows a "screen capture" depiction of a "Create Claim" page for the salvage management web site shown in FIG. 22.

Upon receipt of a completed "Insurance Submission Form," the claims administrator reviews the information for completeness. In cases where the form is received in a hard copy form, the claims administrator accesses the "Create Claim" web page as shown in FIG. 25. Access to this web page requires the claims administrator to log into the salvage management web site 212 using a user identifier and password (in a manner similar to that described above with respect to the claims administration web site 12). At the "Create Claim" page, the claims administrator enters insurance carrier and adjuster information for the salvage claim using drop-down menus populated with the names of existing clients (i.e., insurance carrier). The claims administrator then selects the "Create Claim" button whereby the salvage claim is assigned an identification number in the salvage database server 228 and the "Claim Information" page shown in FIG. 26 is presented.

The "Claim Information" page includes data entry fields mirroring those on the "Insurance Submission Form" (as described above), including fields for entering the policyholder's (i.e., claimant's) first name and last name, the insurance carrier's name (via a drop-down menu), a claim number, and a policy number. The bottom half of the page includes fields for entering detailed information about each salvage item, including product name, product model number, description, category 1, category 2, manufacturer, manufacturer's website, available date, product condition, product quantity, and weight. The category 1 and category 2 fields include drop-down menus populated with common categories or classifications of goods (such as "home and garden" and "furniture"). The page further includes a field for inserting or uploading a product image file (such as a digital photograph) with a corresponding field for entering a description of that image. Using the "Insurance Submission Form" provided by the insurance carrier, the claims administrator enters the information about each salvage item into the data input field on the "Claim Information" page. If specific information is not known, those fields are either left blank or the claims administrator can contact the insurance carrier or claimant for further information about the item. The claims administrator then selects the "Submit" button whereby all of the data for each salvage item is stored in the salvage database server 228.

In cases where the "Insurance Submission Form" is received by the claims administrator in an electronic format, the claims administrator accesses the form and transfers the information from the form to the corresponding fields on the "Claim Information" page (either by manual typing or by cutting/pasting), and the saves each item to the salvage database server 228 by selecting the "Submit" button (as described above). Preferably, the salvage management software application is operable to automatically transfer data from the fields on the "Insurance Submission Form" to corresponding fields in the salvage database server 228 using data transfer techniques known in the art. For example, the automatic transfer of data may include parsing the data to separate the information into multiple fields as required. Most preferably, the salvage management software application is operable to automatically detect that an "Insurance Submission Form" has been uploaded or otherwise transmitted to the salvage management web site 212 or transmitted to the claims administrator via email, and automatically transfers the data from the form to the salvage database server 228.

With the initial information on the salvage items entered into the salvage database server 228, at block 312, the claims administrator selects a contractor to handle the salvage claim in a manner similar to that described above with respect to the selection of a contractor for the performance of mitigation/restoration services. Preferably, the claims administrator selects a contractor from within the "restoration contractor network" (as described above) who is available to provide salvage services within the zip code in which the salvage items are located and who has a suitable ranking, as based on a plurality of weighted factors. Some of these factors relate to the contractor's capabilities regardless of past performance, including: (1) the coverage area of the contractor; (2) the contractor's number of employees; (3) the contractor's number of vehicles; and (4) the contractor's hours of operation. Other factors relate to the past performance of the contractor in providing salvage services, including: (1) information received on the contractor from claimant surveys; (2) the average time from assignment to customer contact; (3) the average time from assignment to item pickup; (4) the average time for the contractor to return required documentation; (5) the quality of the contractor's documentation; (6) the attitude or ease of use of the contractor; and (7) the contractor's availability to provide delivery services. Of course, one skilled in the art will appreciate that other factors could also be considered in accordance with the invention.

Upon selection of a contractor, the claims administrator transmits a copy of the "Insurance Submission Form" to the contractor via facsimile, e-mail, or other delivery method. Then, at block 314, the contractor travels to the insured property site and retrieves the salvage items listed on the form. For each salvage item, the contractor cleans the item (if necessary) and obtains additional documentation on the item, such as taking additional digital photographs of the item and providing detailed information on the condition of the item.

Figure 28:
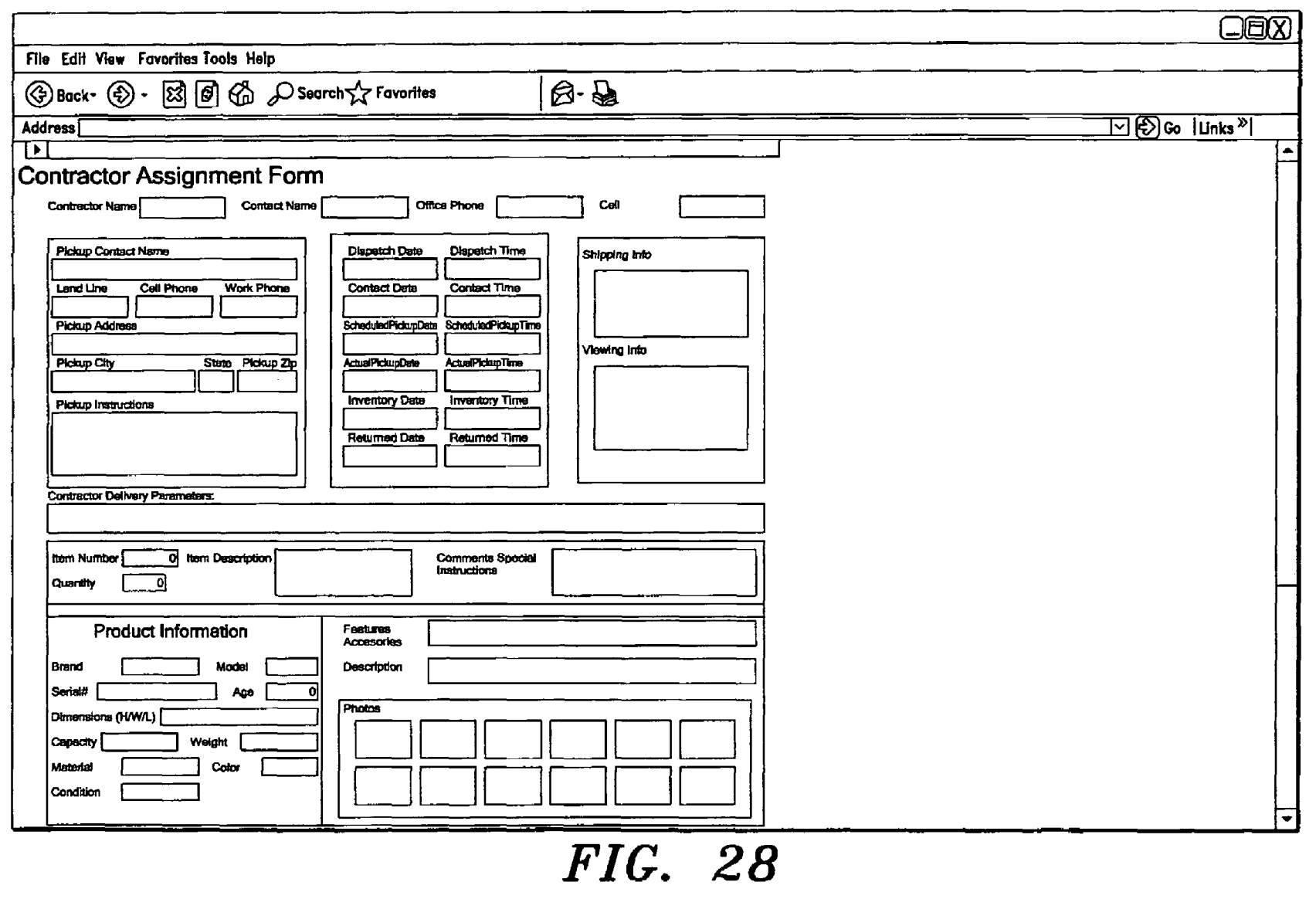

Looking to FIG. 28, the "Contractor Assignment Form" is used by the contractor to enter detailed information about the salvage items in a manner similar to that described above with respect to the "Insurance Submission Form." Specifically, it can be seen that the "Contractor Assignment Form" includes sections for the entry of contractor contact information, item pickup information, various date and time information, contractor shipping and viewing information, contractor delivery information, and detailed item information for each salvage item.

The contractor contact information section includes fields for the entry of the contractor's business name, the name of a contact person at the contractor's office, an office phone number, and a cell phone number. The item pickup section includes fields for the entry of specific information about where to pickup the salvage item, including a contact name, address, phone number, and any special pickup instructions. While the salvage items are typically located at the insured property, the item pickup information allows the contractor to enter specific pickup information obtained directly from the claimant or property owner.

The date and time section includes fields for the entry of the first notification of availability of the item (i.e., dispatch date and time), when the contractor contacted the claimant to arrange pickup of the item (i.e., contact date and time), the scheduled date and time for the contractor to pickup the item (i.e., scheduled pickup date and time), the actual date and time that the contractor picked up the item (i.e., actual pickup date and time), when the contractor placed the item in his storage facility (i.e., inventory date and time), and when an item was returned to the claimant upon his decision to keep the item (i.e., returned date and time).

The "Shipping Info" field allows the contractor to enter information about shipping methods that he can provide (e.g., truck delivery, pick-up at warehouse only, etc.). The "Viewing Info" field allows the contractor to enter information about when the salvage item will be available for viewing or inspection at the contractor's storage facility.

The "Contractor Delivery Parameters" field allows the contractor to enter any special requirements or restrictions on the delivery of the salvage item, such as item weight limits or delivery distance limits.

The detailed item information section includes fields for entry of an item identifying number, the quantity of an item, a general item description, and any comments or special instructions about the item. Additional fields allow entry of even more detailed information, including the brand, model number, serial number, age, dimensions, capacity, weight, material, color, and condition of the item. Of course, not every field is applicable to every item, those in applicable fields are left blank. The "Features/Accessories" field allows the contractor to identify any special features for an item and/or note any accessories included with the item. The "Description" field allows the contractor to provide any other additional description of the item. The "Photos" field allows the contractor to attach any digital photographs of the item.

Not every field of the "Contractor Assignment Form" will be applicable to every salvage item, in which case the contractor will typically leave those fields blank. Likewise, in some cases, the contractor may simply choose not to provide information for a particular field. The primary purpose of the "Contractor Assignment Form" is to obtain detailed information about the salvage item and the availability of that item so that the item can be properly identified to potential buyers and properly priced by the claim administrator. It is not required that the contractor enter information in every field of the form for every salvage item.

At block 316, the contractor submits the detailed item information for all of the salvage items to the claims administrator using the "Contractor Assignment Form." As with the "Insurance Submission Form," the "Contractor Assignment Form" may be submitted to the claims administrator in hard copy form via hand delivery, mail or facsimile, or electronically via e-mail or web site upload. Preferably, the form is submitted to the claims administrator electronically, and most preferably the form is uploaded to the salvage management web site 212. In cases where the form is submitted to the claims administrator in hard copy form, any attached files (as described above) would of course not be included.

Upon receipt of the "Contractor Assignment Form," the claims administrator enters the detailed item information into the salvage database server 228 (as described above), either adding new information or updating existing information as appropriate. Preferably, the salvage management software application is operable to automatically transfer data from the fields on the "Contractor Assignment Form" to corresponding fields in the salvage database server 228 using data transfer techniques known in the art. For example, the automatic transfer of data may include parsing the data to separate the information into multiple fields as required. Most preferably, the salvage management software application is operable to automatically detect that a "Contractor Assignment Form" has been uploaded or otherwise transmitted to the salvage management web site 212 or transmitted to the claims administrator via email, and automatically transfers the data from the form to the salvage database server 228.

At block 318, upon completion of documentation of the salvage items, the contractor transports the items from the insured property site to a storage facility, such as a warehouse or shop maintained by the contractor. Of course, in some cases, a contractor may already be assigned to an insured property (e.g., if the contractor previously performed mitigation/restoration services at the insured property) and may receive the salvage items directly from the claimant without having received a copy of an "Insurance Submission Form."

In those cases, the contractor may use the "Contractor Assignment Form" to record initial and detailed information about the salvage items and submit the "Contractor Assignment Form" to the claims administrator. In that case, the "Contractor Assignment Form" would be processed by the claims administrator in a manner similar to that described for the "Insurance Submission Form." In other cases, either the contractor or the insurance carrier may, instead of using the forms as described, directly enter data into the "Claim Information" page of FIG. 26 by accessing the salvage management web site 212. Thus, the initial salvage item description and the detailed information for that item may be obtained in various ways and in various sequences within the scope of the present invention. The steps described in blocks 310-318 of FIG. 23 as just described are not required to be performed sequentially, but may be performed in other sequences, or may be combined.

At block 320 of FIG. 23, the claims administrator accesses new items posted to the salvage database server 228 which, as described above, have typically been entered by the claims administrator based on information received from an insurance carrier and/or a contractor. The claims administrator reviews all of the data entered for a salvage item and verifies that item is properly categorized. Based on the type of item and its condition, the claims administrator assigns a sales price to the salvage item and stores that sale price in the salvage database server 228 along with an indicator designating that the item is "for sale." Typically, the claims administrator will assign a sales price to the salvage item based on historical data (i.e., by manually reviewing similar items in the salvage database server 228), although an automated pricing software application could also be used.

As will be described in greater detail below, the salvage items designated as "for sale" will be displayed on a web page of the salvage management web site 222 so that potential buyers can view and purchase the items. In addition to, or instead of, posting the items for sale on the salvage management web site 222, the claims administrator may determine that an item is suitable for posting on other online sale sites (such as eBay or Craigslist, either as an auction or fixed-price sale), is suitable for posting on specialized web sites (such as college campus classified advertising sites), is suitable for posting through conventional advertising (such as newspapers or specialized advertising publications), or is suitable for sale thorough a specialized dealer (such as in the case of firearms or antiques). These and other sales venues, in any desired combinations, may be chosen by the claims administrator.

In the case of selling a salvage item through conventional advertising or a specialized dealer, the claims administrator provides a description of the salvage item and the sale price to the appropriate person or entity. In the case of online sites or electronic advertising mediums (such as eBay, Craigslist, or online classified advertising), the salvage management software application is preferably operable to parse, format, or otherwise translate the item description information from the salvage database server 228 into the appropriate format for uploading or transmitting directly to the selected site. Most preferably, the salvage management software application is operable to include boilerplate "barker" information and text to the description of the item being uploaded or transmitted based on recognition of keywords in the name or description of the salvage item. The salvage management software application is also operable to insert contact information for the claims administrator into the listing being transmitted or uploaded, including the claims administrator's twenty-four hour contact telephone number, through which potential buyers can contact the claims administrator for additional information on the salvage item.

Figure 27:
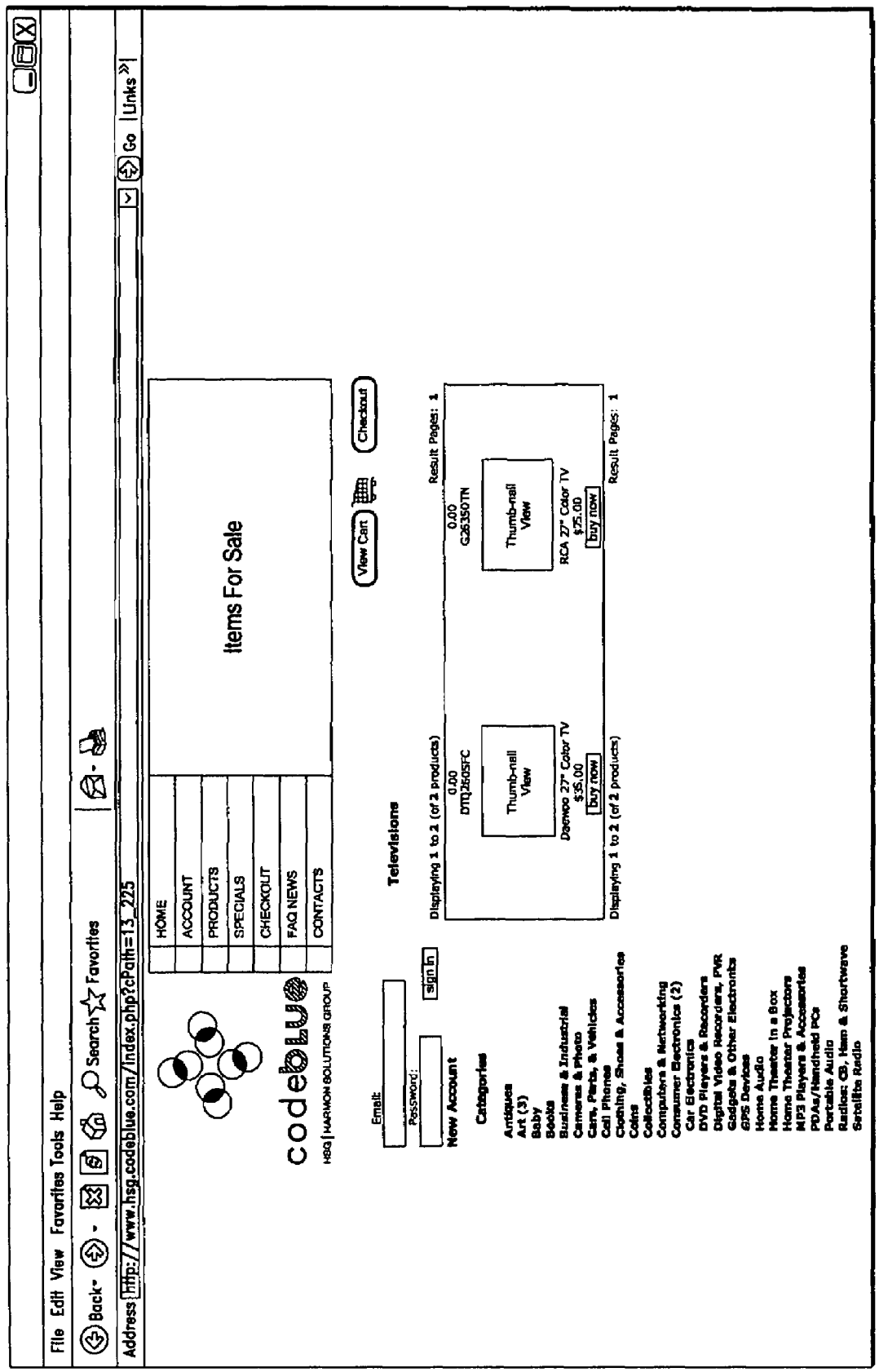
FIG. 27 shows a "screen capture" depiction of an "Items For Sale" page for the salvage management web site shown in FIG. 22.

As shown in FIG. 27, with a salvage item designated as "for sale" as described above, the salvage management software application populates a web page on the salvage management web site 222 with a listing of the item, along with all items in the salvage database server 228 designated as "for sale." Potential buyers of the items access the salvage management web site 222 through the Internet, and can navigate or browse through the items for sale using the "Categories" hyperlinks along the left-hand side of the page. As can be seen, the item listings include a description and photo(s) of the item, and preferably include information about shipping or pickup of the item.

Registration is required to purchase items from the salvage management web site 222. Accordingly, a "sign in" button allows new buyers to register with the salvage management web site 222. Existing users can sign in using their email address and password. Once registered and signed-in, buyers can purchase items using the "buy now" button adjacent a displayed item, which adds the item to the user's virtual shopping cart. To view the virtual shopping cart or to finalize a purchase of an item, the registered buyer may select the "View Cart" or "Checkout" buttons displayed on the page. Payment information for the item may be any known type of electronic or physical payment, including PayPal, electronic bank draft, check, money order, or credit card. Upon completion of the transaction, data related to the sale of the item is stored in the salvage database server 228.

With the item listed for sale on the salvage management web site 222 and/or listed on other web sites or through other advertising means, at block 322 of FIG. 23, the claims administrator monitors the status of the item listings to determine when the item has been sold. If a buyer purchases the item through the salvage management web site 222, an e-mail notification is sent to the claims administrator. If the salvage item is listed on other web sites, or through other advertising means, the claims administrator monitors electronic communications from the web site (e.g., eBay) for notification of the sale, or, in the case of sale through specialized dealers, maintains contact with the dealer to track sale information. In cases where the item is advertised in classified type advertising means, potential buyers contact the claims administrator directly via telephone or e-mail. In those cases, the claims administrator receives payment information directly from the buyer and enters that information into the salvage database server 228.

At block 324 of FIG. 23, when the claims administrator determines that an item has been sold, the claims administrator withdraws any duplicative listings for the same item on other listing services or web sites, and verifies that payment has been received from the buyer. Regardless of the channel through which the item sold, the claims administrator verifies that payment for that item was received, whether in the form of PayPal, electronic bank draft, check, money order, cash payment, or credit card. In collecting payment, the claims administrator also collects any sales or use taxes required by local taxing authorities, usually as determined by the physical location of the salvage item, as well as any shipping costs for delivering the item to the buyer.

Upon verification of receipt of payment from the buyer, at block 326, the claims administrator contacts the contractor in possession of the item to arrange pick-up, delivery or shipping of the item. In many cases, the buyer will go to the contractor's storage facility to pick-up the item. In other cases, particularly in the case of large or bulky items, the contractor will deliver the item to the buyer using the contractor's transportation. In other cases, the claims administrator will instruct the contractor to ship the item through commercial shippers, such as United Parcel Service, Federal Express, or the United States Post Office. In any case, any shipping or delivery charges are collected by the claims administrator from the buyer as part of the sales transaction. As with all of the other data related to the salvage item, the claims administrator stores the data and information related to the sale in the salvage database server 228.

At block 328 of FIG. 23, with the item sold and delivered to the buyer, the claims administrator distributes proceeds from the sale of the salvage item to the contractor and insurance carrier according to agreed-upon terms. The claims administrator may also access the salvage management web site 222 to generate financial reports for the sale of each item, or for the sales of all items associated with a particular contractor or insurance carrier. Using this financial data, the claims administrator also issues a year-end IRS Form 1099 reporting miscellaneous income to every contractor paid in relation to the sale of a salvage item. As can be seen, the method of the present invention permits an insurance carrier to recover value for the salvage items without having to take physical possession of the items and without having to handle the sales transactions.

While the present invention has been described and illustrated hereinabove with reference to an exemplary embodiment, it should be understood that various modifications could be made to this embodiment without departing from the scope of the invention. Therefore, the invention is not to be limited to the specific embodiment described and illustrated hereinabove, except insofar as such limitations are included in the following claims.

The invention claimed is:

1. A system for monitoring a contractor assigned to perform restoration services at an insured property, comprising:
   a database server; a server system coupled to the database server, wherein the server system: generates a deadline by which the contractor is required to perform a contractor action, wherein the contractor action comprises one of the following:
   arriving at the insured property, obtaining initial inspection information on the insured property, obtaining daily inspection information on the insured property, and preparing final documentation on the insured property; provides a user interface that includes functionality for a user to submit a notice of completion for the contractor action; stores the notice of completion for the contractor action in the database server in association with a claim identifier; and initiates transmission of at least one automated reminder message to the contractor if the notice of completion is not submitted by the deadline for the contractor action, wherein the automated reminder message comprises an alert notifying the contractor of an obligation to perform the contractor action.

2. The system of claim 1, wherein the deadline for arriving at the insured property comprises a specified period of time after a date and time that the contractor is dispatched to the insured property.

3. The system of claim 2, wherein the specified period of time is between one hour and five hours.

4. The system of claim 2, wherein the user interface includes functionality for the user to submit the date and time that the contractor is dispatched to the insured property.

5. The system of claim 4, wherein the user comprises either a claim administrator or an insurance carrier.

6. The system of claim 2, wherein the notice of completion comprises submission of a date and time that the contractor arrives at the insured property.

7. The system of claim 6, wherein the user interface includes functionality for the user to submit the date and time that the contractor arrives at the insured property.

8. The system of claim 7, wherein the user comprises either a claim administrator or the contractor.

9. The system of claim 7, wherein a contractor arrival code is provided to a claimant, and wherein a date and time that the contractor arrival code is received from the claimant is utilized to verify the date and time that the contractor arrives at the insured property as submitted by the user.

10. The system of claim 6, wherein the automated reminder message comprises a textual or audio alert notifying the contractor of an obligation to arrive at the insured property and complete a description of damage to the insured property.

11. The system of claim 1, wherein the deadline for obtaining initial inspection information on the insured property comprises a specified period of time after a date and time that the contractor is dispatched to the insured property.

12. The system of claim 11, wherein the specified period of time is between two hours and twenty-four hours.

13. The system of claim 11, wherein the user interface includes functionality for the user to submit the date and time that the contractor is dispatched to the insured property.

14. The system of claim 13, wherein the user comprises either a claim administrator or an insurance carrier.

15. The system of claim 11, wherein the notice of completion comprises submission of the initial inspection information on the insured property.

16. The system of claim 15, wherein the user interface includes functionality for the user to submit the initial inspection information on the insured property.

17. The system of claim 16, wherein the user comprises the contractor.

18. The system of claim 15, wherein the automated reminder message comprises a textual or audio alert notifying the contractor of an obligation to submit the initial inspection information on the insured property.

19. The system of claim 1, wherein the deadline for obtaining daily inspection information on the insured property comprises a specified time on each inspection date.

20. The system of claim 19, wherein the notice of completion comprises submission of the daily inspection information on the insured property.

21. The system of claim 20, wherein the user interface includes functionality for the user to submit the daily inspection information on the insured property.

22. The system of claim 21, wherein the user comprises the contractor.

23. The system of claim 21, wherein the automated reminder message comprises a textual or audio alert notifying the contractor of an obligation to submit the daily inspection information on the insured property.

24. The system of claim 1, wherein the deadline for obtaining final documentation on the insured property comprises a specified period of time after a date and time that the contractor completes the restoration services at the insured property.

25. The system of claim 24, wherein the specified period of time is between zero hours and twenty-four hours.

26. The system of claim 24, wherein the user interface includes functionality for the user to submit the date and time that the contractor completes the restoration services at the insured property.

27. The system of claim 26, wherein the user comprises either a claim administrator or the contractor.

28. The system of claim 24, wherein the notice of completion comprises submission of the final documentation on the insured property.

29. The system of claim 28, wherein the user interface includes functionality for the user to submit the final documentation on the insured property.

30. The system of claim 29, wherein the user comprises the contractor.

31. The system of claim 28, wherein the automated reminder message comprises a textual or audio alert notifying the contractor of an obligation to submit the final documentation on the insured property.

32. The system of claim 1, wherein the automated reminder message comprises one or more of the following: a voice message, a text message, an e-mail, and an instant message.

33. The system of claim 1, wherein the server system initiates transmission of a plurality of automated reminder messages to the contractor until submission of the notice of completion.

34. The system of claim 33, wherein the user interface presents a web page that displays the transmitted automated reminder messages.

35. An automated method for monitoring a contractor assigned to perform restoration services at an insured property comprising:
using a server system to:
generate a deadline by which the contractor is required to perform a contractor action, wherein the contractor action comprises one of the following:
arriving at the insured property, obtaining initial inspection information on the insured property, obtaining daily inspection information on the insured property, and preparing final documentation on the insured property:
provide a user interface that includes functionality for a user to submit a notice of completion for the contractor action;
initiate transmission of at least one automated reminder message to the contractor if the notice of completion is not submitted by the deadline for the contractor action, wherein the automated reminder message comprises an alert notifying the contractor of an obligation to perform the contractor action; and
using a database server to store the notice of completion for the contractor action in association with a claim identifier.

36. The method of claim 35, wherein the deadline for arriving at the insured property comprises a specified period of time after a date and time that the contractor is dispatched to the insured property.

37. The method of claim 36, wherein the specified period of time is between one hour and five hours.

38. The method of claim 36, wherein the user interface includes functionality for the user to submit the date and time that the contractor is dispatched to the insured property.

39. The method of claim 38, wherein the user comprises either a claim administrator or an insurance carrier.

40. The method of claim 36, wherein the notice of completion comprises submission of a date and time that the contractor arrives at the insured property.

41. The method of claim 40, wherein the user interface includes functionality for the user to submit the date and time that the contractor arrives at the insured property.

42. The method of claim 41, wherein the user comprises either a claim administrator or the contractor.

43. The method of claim 41, wherein a contractor arrival code is provided to a claimant, and wherein a date and time that the contractor arrival code is received from the claimant is utilized to verify the date and time that the contractor arrives at the insured property as submitted by the user.

44. The method of claim 36, wherein the automated reminder message comprises a textual or audio alert notifying the contractor of an obligation to arrive at the insured property and complete a description of damage to the insured property.

45. The method of claim 35, wherein the deadline for obtaining initial inspection information on the insured property comprises a specified period of time after a date and time that the contractor is dispatched to the insured property.

46. The method of claim 45, wherein the specified period of time is between two hours and twenty-four hours.

47. The method of claim 45, wherein the user interface includes functionality for the user to submit the date and time that the contractor is dispatched to the insured property.

48. The method of claim 47, wherein the user comprises either a claim administrator or an insurance carrier.

49. The method of claim 45, wherein the notice of completion comprises submission of the initial inspection information on the insured property.

50. The method of claim 49, wherein the user interface includes functionality for the user to submit the initial inspection information on the insured property.

51. The method of claim 50, wherein the user comprises the contractor.

52. The method of claim 49, wherein the automated reminder message comprises a textual or audio alert notifying the contractor of an obligation to submit the initial inspection information on the insured property.

53. The method of claim 35, wherein the deadline for obtaining daily inspection information on the insured property comprises a specified time on each inspection date.

54. The method of claim 53, wherein the notice of completion comprises submission of the daily inspection information on the insured property.

55. The method of claim 54, wherein the user interface includes functionality for the user to submit the daily inspection information on the insured property.

56. The method of claim 55, wherein the user comprises the contractor.

57. The method of claim 55, wherein the automated reminder message comprises a textual or audio alert notifying the contractor of an obligation to submit the daily inspection information on the insured property.

58. The method of claim 35, wherein the deadline for obtaining final documentation on the insured property comprises a specified period of time after a date and time that the contractor completes the restoration services at the insured property.

59. The method of claim 58, wherein the specified period of time is between zero hours and twenty-four hours.

60. The method of claim 58, wherein the user interface includes functionality for the user to submit the date and time that the contractor completes the restoration services at the insured property.

61. The method of claim 60, wherein the user comprises either a claim administrator or the contractor.

62. The method of claim 58, wherein the notice of completion comprises submission of the final documentation on the insured property.

63. The method of claim 62, wherein the user interface includes functionality for the user to submit the final documentation on the insured property.

64. The method of claim 63, wherein the user comprises the contractor.

65. The method of claim 62, wherein the automated reminder message comprises a textual or audio alert notifying the contractor of an obligation to submit the final documentation on the insured property.

66. The method of claim 35, wherein the automated reminder message comprises one or more of the following: a voice message, a text message, an e-mail, and an instant message.

67. The method of claim 35, further comprising initiating transmission of a plurality of automated reminder messages to the contractor until submission of the notice of completion.

68. The method of claim 67, wherein the user interface presents a web page that displays the transmitted automated reminder messages.

* * * * *